United States Patent
Fujimori et al.

(10) Patent No.: US 6,854,848 B2
(45) Date of Patent: Feb. 15, 2005

(54) OPTICAL DEVICE AND PROJECTOR

(75) Inventors: Motoyuki Fujimori, Suwa (JP); Yoshiyuki Yanagisawa, Matsumoto (JP); Taisuke Uehara, Chino (JP); Toshiaki Hashizume, Okaya (JP); Masashi Kitabayashi, Horigane-mura (JP); Nobuo Watanabe, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 99 days.

(21) Appl. No.: 10/189,432

(22) Filed: Jul. 8, 2002

(65) Prior Publication Data

US 2003/0071975 A1 Apr. 17, 2003

(30) Foreign Application Priority Data

| Aug. 8, 2001 | (JP) | 2001-240449 |
| Aug. 8, 2001 | (JP) | 2001-240976 |
| Aug. 9, 2001 | (JP) | 2001-242680 |
| Jun. 6, 2002 | (JP) | 2002-166053 |

(51) Int. Cl.[7] .................. G03B 21/00; G02F 1/1335; G02F 1/00
(52) U.S. Cl. .............. 353/20; 349/5; 348/750; 348/758; 348/759
(58) Field of Search .............. 353/20, 31, 37, 353/84, 100, 119, 122; 348/750, 751, 758–59, 766; 349/5, 8, 9

(56) References Cited

U.S. PATENT DOCUMENTS

| 5,868,485 A | 2/1999 | Fujimori et al. |
| 6,053,616 A | 4/2000 | Fujimori et al. |

FOREIGN PATENT DOCUMENTS

| EP | 0 803 754 A1 | 10/1997 |
| EP | 1 041 828 A2 | 10/2000 |
| JP | 8-304739 | 11/1996 |
| JP | A 10-10994 | 1/1998 |
| JP | 2000-221587 | 8/2000 |
| JP | A 2000-221588 | 8/2000 |
| JP | A 2000-258859 | 9/2000 |
| JP | A 2000-259094 | 9/2000 |

Primary Examiner—Russell Adams
Assistant Examiner—Michael Dalakis
(74) Attorney, Agent, or Firm—Oliff & Berridge, PLC

(57) ABSTRACT

The invention provides a structure to attach a liquid crystal panel to a prism, which enables further enhancements in cooling capabilities. The structure includes a storing member fixed on a base and holding a holding frame, where a liquid crystal panel is held. Erected pieces to form a space to receive the holding frame are formed protruding on both left and right sides at the light incident side. Protrusions to form an air path with a cross-dichroic prism are formed on both left and right sides on the light emitting side. The liquid crystal panel is attached to the cross-dichroic prism through a holding member having an opening at a portion corresponding to the panel face of the liquid crystal panel.

73 Claims, 49 Drawing Sheets

OPTICAL DEVICE AND PROJECTOR

BACKGROUND OF THE INVENTION

1. Field of Invention

The present invention relates to an optical device where a light modulating device to modulate color light according to image information and a color synthesizing optical element to synthesize color light modulated by the light modulating device are integrally formed. The invention also relates to a projector employing the optical device.

2. Description of Related Art

Structures for attaching liquid crystal panels and prisms in a projector are disclosed in, for example, Japanese Unexamined Patent Application Publication No. 2000-221587, Japanese Unexamined Patent Application Publication No. 2000-221588, and so forth. As disclosed in these publications, liquid crystal panels are stored within a panel frame and attached to a prism, thereby implementing measures to enhance the ease-of-assembly and the reliability of this part. Also, in the related art, cooling of the liquid crystal panel has been achieved by a structure that is almost completely dependent on an air path provided between the panel frame and prism.

SUMMARY OF THE INVENTION

However, reduction in size and increased luminance of projectors have recently become popular, and the thermal density within devices has increased as compared to related art arrangements, so heat dissipation measures within the projector, and particularly cooling of the liquid crystal panels, cannot be sufficiently carried out with structures primarily depending on only air paths for cooling the liquid crystal panels, and accordingly it has been difficult to fully exhibit the capabilities of the liquid crystal panels.

The present invention addresses or solves the above problems, and accordingly, the invention provides an optical device that is capable of further enhancements in cooling capabilities, thereby contributing to reduced size, high luminance, and high reliability, of projectors.

A projector according to a first aspect of the present invention includes an optical device integrally provided with a plurality of light modulating devices to modulate a plurality of color lights for each color light according to image information, and a color synthesizing optical element to synthesize each color light modulated at the light modulating devices, including: a holding frame to hold the light modulating devices, having an opening for a portion corresponding to an image formation region of the light modulating devices; a base fixed to at least one end of a pair of end faces intersecting with an optical flux incident end face of the color synthesizing optical element; and a holding member disposed between the holding frame and a side face of the base. The base and the holding member are configured of a thermal-conductive metal or thermal-conductive resin. The light modulating devices are fixed to a side face of the base by the holding frame and the holding member.

According to such a present invention, the base and the holding member are configured of a thermal-conductive metal or thermal-conductive resin with excellent thermal conductivity, so the heat generated at the light modulating devices can be dissipated through and in the order of the holding member and the base. Accordingly, malfunctions due to high temperatures of the light modulating devices can be reduced or prevented, while greatly enhancing the cooling capabilities of the light modulating devices.

Also, due to improved cooling capabilities of the light modulating devices, light fluxes from the light source can be increased, thereby increasing the brightness of the image projected on a screen.

Further, in the event of using a fan to cool the optical device, the fan can be reduced in size.

The description of "fixed to the base side face" means that the holding member is fixed to the base side face without position adjusting members such as spacers or pins being introduced therein. Accordingly, cases where a sapphire substrate or metal plate or the like to enhance thermal dissipation is introduced between the base side face and holding member are also encompassed by the first aspect of the present invention.

With the optical device according to the first aspect of the present invention, the thermal conductivity of the thermal-conductive metal or thermal-conductive resin is preferably 3 W/(m·K) or higher.

According to such a configuration, the heat generated at the light modulating devices can be speedily dissipated through the above heat conducting path. Also, the material of the holding member and the base can be freely set within a range satisfying the conditions of 3 W/(m·K) or higher, so materials meeting demands can be used. Accordingly, at the time of designing the optical device, materials can be optimized according to the demanded capabilities and the like.

With the optical device according to the first aspect of the present invention, holes are preferably formed in at least two places of the holding frame, with the holding member including a rectangular plate-shaped member with an opening formed at a position corresponding to the opening of the holding frame, and protruding portions to be inserted into the holes in the holding frame, provided protruding from the rectangular plate-shaped member.

According to such a configuration, the heat of the light modulating devices can escape through the protruding portions, so heat dissipation can be further enhanced.

With the optical device according to the first aspect of the present invention, the holding member preferably comprises a rectangular plate-shaped member with an opening formed at a position corresponding to the opening of the holding frame, and erected pieces with a general L-shape when viewed from the front, which are positioned at the corner portions of the rectangular plate-shaped member and erected extending along the edge of the rectangular plate-shaped member, and holds the perimeter of the holding frame.

According to such a configuration, the heat of the light modulating devices can escape through the L-shaped erected piece, so heat dissipation can be further enhanced.

In this case, the erected pieces are preferably erected at the four corners of the rectangular plate-shaped member.

According to such a configuration, the heat of the light modulating devices can uniformly escape through the erected pieces of the four corners, so the effects of external force applied to the light modulating devices by heat can be alleviated, and accordingly, the light modulating devices can be held in a stable manner.

Also, in this case, the erected pieces may be provided along at a pair of mutually parallel sides of the rectangular plate-shaped member, having generally the same length as the sides of the rectangular plate-shaped member.

According to such a configuration, the contact portion between the heat modulating devices and the holding member can be made larger, so heat dissipation capabilities can be further enhanced.

With the optical device according to the first aspect of the present invention, the holding member preferably includes an engaging groove for engaging with a plate-shaped optical element, or a supporting face for fixing an optical element.

According to such a configuration, the heat of the optical element can be dissipated to the holding member. Accordingly, increased temperature of the optical element can be alleviated, thereby reducing or preventing deterioration due to heat.

Also, as for optical elements, polarizing plates, phase difference plates, optically-compensating plates, condenser lenses, and so forth, can be given.

With the optical device according to the first aspect of the present invention, first supporting face to fix a first optical element and a second supporting face to fix a second optical element are preferably formed on the holding member, with the first supporting face and the second supporting face being configured so that the out-of-plane directional positions differ one from another.

According to such a configuration, the heat of the optical element can be dissipated to the holding member. Accordingly, increased temperature of the optical element can be alleviated, thereby reducing or preventing deterioration due to heat. Further, the first supporting face and the second supporting face are configured so that the out-of-plane directional positions differ one from another, so multiple optical elements are supported by the holding member at different positions. Accordingly, in the event that a fan is used to cool the optical elements, an air path is formed between the optical elements, so the optical elements can be efficiently cooled.

Also, as for optical elements, polarizing plates, phase difference plates, optically-compensating plates, condenser lenses, and so forth, can be given.

With the optical device according to the first aspect of the present invention, the base preferably has a recessed portion formed at a portion of an end face where the holding member is fixed by adhesion.

According to such a configuration, this recessed portion can be used as a channel to cool air in the event of using a fan to cool the optical device. Accordingly, the optical device can be efficiently cooled.

With the optical device according to the first aspect of the present invention, the holding frame, the holding member, and the base, are preferably fixed by an adhesive agent having thermal conductivity. According to such a configuration, adhesive agent introduced between the members assists thermal conduction between the members, so that dissipation capabilities can be further enhanced.

Now, the adhesive agent is preferably constituted containing a metal material. Using such an adhesive agent further promotes thermal conduction between the members, since the metal material in the adhesive agent is sandwiched between the members so as to thermally connect the members.

With the optical device according to the first aspect of the present invention, the base is preferably fixed to only one of a pair of end faces intersecting with an optical flux incident end face of the color synthesizing optical element, with a linking member to link the holding members facing one another being provided near the other of the end faces, the linking member being configured of a thermal-conductive metal or thermal-conductive resin.

According to such a configuration, not only heat dissipation from the holding member to the base due to thermal transfer, but also heat dissipation from the holding member to the linking member is enabled. Accordingly, the cooling capabilities of the optical modulating devices can be further enhanced.

Also, at this time, at least two of the base, the holding member, and the linking member, are preferably formed integrally. According to such a configuration, thermal dissipation from the holding member to the base and from the holding member to the linking member becomes smoother, enabling the cooling capabilities of the optical modulating devices to be further enhanced.

With the optical device according to the first aspect of the present invention, the holding frame is preferably configured of a thermal-conductive metal or thermal-conductive resin.

According to such a configuration, the thermal conductivity of the holding frame introduced between the light modulating devices and the holding member can be increased, so heat dissipating capabilities can be further enhanced.

Also, at this time, the holding frame preferably includes a recessed frame member to store the light modulating devices, and a supporting plate to press and fix stored light modulating devices.

According to such a configuration for the holding frame, the area of contact between the light modulating devices and the holding frame increases. Accordingly, the heat generated at the light modulating devices can be efficiently dissipated to the holding frame, so the cooling efficiency of the light modulating devices can be enhanced. The area of contact between the light modulating devices and the holding frame increases, so the heat dissipation capabilities can be further enhanced.

With the optical device according to the first aspect of the present invention, the light modulating devices preferably include a pair of substrates, and a light-transmitting dust-proof plate fixed to at least one of the pair of substrates, with the thermal conductivity of the light-transmitting dust-proof plate being higher than the thermal conductivity of the substrate.

Providing this light-transmitting dust-proof plate having higher thermal conductivity to the light modulating devices reduces or prevents adhesion of dust to the substrates of the light modulating devices themselves, and also enables heat dissipation from the surface of the light modulating devices, so cooling efficiency of the light modulating devices can be further enhanced. Accordingly, deterioration in image quality due to dust adhering to the substrates themselves of the light modulating devices, and deterioration in image quality due to deterioration of the capabilities of the light modulating devices due to heat, can be achieved, and the image quality of optical equipment, such as a projector employing such an optical device, can be enhanced.

With the optical device according to the first aspect of the present invention, a light-transmitting plate with higher thermal conductivity than that of material forming the color synthesizing optical element is preferably provided between the holding member and the base side face, with the light-transmitting plate and the base being joined in a thermally-conductible manner.

According to such a configuration, a more efficient heat conducting path including the holding member, light-transmitting plate, and base, can be configured, so even in the event that the color synthesizing optical element is configured of a material with relatively low thermal conductivity, high thermal discharge capabilities can be maintained. Sapphire, crystal, quartz, or the like, which have higher thermal conductivity than general glass can be used for such a light-transmitting plate.

Further, at this time, the light-transmitting plate and the base may be joined with a thermal-conducting adhesive agent, or may be joined with a thermal-conducting sheet or spacer members or the like formed of a thermal-conducting material introduced therebetween. Thus, the heat dissipating capabilities of the heat conducting path can be enhanced by joining the light-transmitting plate and the base with a thermal-conducting adhesive agent or the like having excellent thermal conductivity.

With the optical device according to the first aspect of the present invention, preferably the base may be connected to a heat dissipating device to perform forced cooling.

As described above, the heat generated at the light modulating devices is discharged to the base through the holding member. Hence, connecting a heat dissipating device to perform forced cooling to the base enables the cooling efficiency of the light modulating devices to be further enhanced.

A projector according to the second aspect of the present invention includes an optical device integrally provided with a plurality of light modulating devices to modulate a plurality of color lights for each color light according to image information, and a color synthesizing optical element to synthesize each color light modulated at the light modulating devices, including: a holding frame to hold the light modulating devices, having an opening for a portion corresponding to an image formation region of the light modulating devices; a holding member directly fixed to an optical flux incident end face of the color synthesizing optical element; and a base fixed to at least one end of a pair of end faces intersecting with an optical flux incident end face of the color synthesizing optical element. The base and the holding member are configured of a thermal-conductive metal or thermal-conductive resin. The holding frame is directly fixed to the holding member.

According to such a present invention, the base and the holding member are configured of a thermal-conductive metal or thermal-conductive resin with excellent thermal conductivity, so the heat generated at the light modulating devices can be dissipated in the order of the holding member, color synthesizing optical element, and the base, thereby greatly enhancing the cooling capabilities of the light modulating devices.

Further, in the event of using a fan to cool the optical device, the fan can be reduced in size.

The description of "directly fixed to so-and-so" means that the members are fixed one to another without position adjusting members such as spacers or pins being introduced therebetween. Thus, cases wherein a sapphire substrate or metal plate or the like to enhance thermal dissipation is introduced therebetween are also encompassed by the second aspect of the present invention.

With the optical device according to the second aspect of the present invention, a thermal conductivity of the thermal-conductive metal or thermal-conductive resin is preferably 3 W/(m·K) or higher.

According to such a configuration, the heat generated at the light modulating devices can be speedily dissipated through the above heat conducting path. Also, the material of the holding member and the base can be freely set within a range satisfying the conditions of 3 W/(m·K) or higher, so materials meeting demands can be used. Accordingly, at the time of designing the optical device, materials can be optimized according to the demanded capabilities and the like.

With the optical device according to the second aspect of the present invention, holes are preferably formed in at least two places of the holding frame, with the holding member including a rectangular plate-shaped member with an opening formed at a position corresponding to the opening of the holding frame, and protruding portions to be inserted into the holes in the holding frame, provided protruding from the rectangular plate-shaped member.

According to such a configuration, the heat of the light modulating devices can escape through the protruding portions, so heat dissipation can be further enhanced.

With the optical device according to the second aspect of the present invention, the holding member preferably comprises a rectangular plate-shaped member with an opening formed at a position corresponding to the opening of the holding frame, and erected pieces with a general L-shape when viewed from the front, which are positioned at the corner portions of the rectangular plate-shaped member and erected extending along the edge of the rectangular plate-shaped member, and holds the perimeter of the holding frame.

According to such a configuration, the heat of the light modulating devices can escape through the L-shaped erected piece, so heat dissipation can be further enhanced.

In this case, the erected pieces are preferably erected at the four corners of the rectangular plate-shaped member.

According to such a configuration, the heat of the light modulating devices can uniformly escape through the four erected pieces on the corners, so the effects of external force applied to the light modulating devices by heat can be alleviated, and accordingly, the light modulating devices can be held in a stable manner.

Also, in this case, the erected pieces may be provided along a pair of mutually parallel sides of the rectangular plate-shaped member, having generally the same length as the sides of the rectangular plate-shaped member.

According to such a configuration, the contact portion between the heat modulating devices and the holding member can be made larger, so heat dissipation capabilities can be further enhanced.

With the optical device according to the second aspect of the present invention, the holding member preferably includes a supporting face to fix an optical element.

According to such a configuration, the heat of the optical element can be dissipated to the holding member. Accordingly, increased temperature of the optical element can be alleviated, thereby reducing or preventing deterioration due to heat.

Also, as for optical elements, polarizing plates, phase difference plates, optically-compensating plates, condenser lenses, and so forth, can be given.

With the optical device according to the second aspect of the present invention, a first supporting face to fix a first optical element and a second supporting face to fix a second optical element are preferably formed on the holding member, with the first supporting face and the second supporting face being configured so that the out-of-plane directional positions differ one from another.

According to such a configuration, the heat of the optical element can be dissipated to the holding member. Accordingly, increased temperature of the optical element can be alleviated, thereby reducing or preventing deterioration due to heat. Further, the first supporting face and the second supporting face are configured so that the out-of-plane directional positions differ one from another, so multiple optical elements are supported by the holding member at different positions. Accordingly, in the event that a fan is used to cool the optical elements, an air path is formed between the optical elements, so the optical elements can be efficiently cooled.

Also, as for optical elements, polarizing plates, phase difference plates, optically-compensating plates, condenser lenses, and so forth, can be given.

With the optical device according to the second aspect of the present invention, the color synthesizing optical element and the base, the color synthesizing optical element and the holding frame, and the holding member and the holding member, are each preferably fixed by a thermal-conductive adhesive agent.

According to such a configuration, adhesive agent introduced between the members assists thermal conduction between the members, so that dissipation capabilities can be further enhanced.

Also, in this case, the adhesive agent is preferably constituted containing a metal material. Using such an adhesive agent further promotes thermal conduction between the members, since the metal material in the adhesive agent is sandwiched between the members so as to thermally connect the members.

With the optical device according to the second aspect of the present invention, the holding frame is preferably configured of a thermal-conductive metal or thermal-conductive resin.

According to such a configuration, the thermal conductivity of the holding frame introduced between the light modulating devices and the holding member can be increased, so heat dissipating capabilities can be further enhanced.

Also, at this time, the holding frame preferably includes a recessed frame member to store the light modulating devices, and a supporting plate to press and fix stored light modulating devices.

According to such a configuration for the holding frame, the area of contact between the light modulating devices and the holding frame increases. Accordingly, the heat generated at the light modulating devices can be efficiently dissipated to the holding frame, so the cooling efficiency of the light modulating devices can be enhanced.

With the optical device according to the second aspect of the present invention, the light modulating devices preferably include a pair of substrates, and a light-transmitting dust-proof plate fixed to at least one of the pair of substrates, with the thermal conductivity of the light-transmitting dust-proof plate being higher than the thermal conductivity of the substrate.

Thus, providing the light-transmitting dust-proof plate having higher thermal conductivity to the light modulating devices reduces or prevents adhesion of dust to the substrates of the light modulating devices themselves, and also enables heat dissipation from the surface of the light modulating devices, so cooling efficiency of the light modulating devices can be further enhanced. Accordingly, deterioration in image quality due to dust adhering to the substrates themselves of the light modulating devices, and deterioration in image quality due to deterioration of the capabilities of the light modulating devices due to heat, can be achieved, and the image quality of optical equipment, such as a projector employing such an optical device, can be enhanced.

With the optical device according to the second aspect of the present invention, a light-transmitting plate with higher thermal conductivity than that of the material forming the color synthesizing optical element is preferably provided on the light incident end face of the color synthesizing optical element, with the light-transmitting plate and the base being joined in a thermally-conductible manner.

According to such a configuration, a more efficient heat conducting path including the holding member, light-transmitting plate, and base, can be configured, so even in the event that the color synthesizing optical element is configured of a material with relatively low thermal conductivity, high thermal dissipation capabilities can be maintained. Sapphire, crystal, quartz, or the like, which have higher thermal conductivity than general glass can be used for such a light-transmitting plate.

Further, at this time, the light-transmitting plate and the base may be joined with a thermal-conducting adhesive agent, or may be joined with a thermal-conducting sheet or spacer members or the like formed of a thermal-conducting material introduced therebetween. Thus, the heat dissipating capabilities of the heat conducting path can be enhanced by joining the light-transmitting plate and the base with a thermal-conducting adhesive agent or the like having excellent thermal conductivity.

With the optical device according to the second aspect of the present invention, the base is preferably connected to a heat dissipating device to perform forced cooling.

As described above, the heat generated at the light modulating devices is discharged to the base through the holding member. Hence, connecting a heat dissipating device to perform forced cooling to the base enables the cooling efficiency of the light modulating devices to be further enhanced.

A projector according to the third aspect of the present invention includes an optical device integrally provided with a plurality of light modulating devices to modulate a plurality of color lights for each color light according to image information, and a color synthesizing optical element to synthesize each color light modulated at the light modulating devices, including: a holding frame to hold the light modulating devices, having an opening for a portion corresponding to an image formation region of the light modulating devices; a holding member directly fixed to an optical flux incident end face of the color synthesizing optical element having erected pieces formed so as to cover the side edge of the holding frame, and supporting pieces to support the face of the holding frame at the color synthesizing optical element side; spacers disposed between the holding frame and the erected piece of the holding member; and a base fixed to at least one end of a pair of end faces intersecting with an optical flux incident end face of the color synthesizing optical element. The base and the holding member are configured of thermal-conductive metal or thermal-conductive resin. The holding frame is fixed to the holding member by the spacers.

According to this, the holding member and the base are configured of a thermal-conductive metal or thermal-conductive resin with excellent thermal conductivity, so the heat generated at the light modulating devices can be dissipated in the order of the holding member and the base so as to escape, thereby greatly enhancing the cooling capabilities of the light modulating devices.

Further, in the event of using a fan for cooling the optical device, the fan can be reduced in size.

The description of "directly fixed to so-and-so" means that the members are fixed one to another without position adjusting members such as spacers or pins being introduced therebetween. Thus, cases wherein a sapphire substrate or metal plate or the like to enhance thermal dissipation is introduced therebetween are also encompassed by the third aspect of the present invention.

With the optical device according to the third aspect of the present invention, the thermal conductivity of the thermal-conductive metal or thermal-conductive resin is preferably 3 W/(m·K) or higher.

According to such a configuration, the heat generated at the light modulating devices can be speedily dissipated through the above heat conducting path. Also, the material of the holding member and the base can be freely set within a range satisfying the conditions of 3 W/(m·K) or higher, so materials meeting demands can be used. Accordingly, at the time of designing the optical device, materials can be optimized according to the demanded capabilities and the like.

With the optical device according to the third aspect of the present invention, the holding member preferably includes a protruding portion at a face of contact with the color synthesizing optical element, with a partial gap being formed between the color synthesizing optical element and the holding member by the color synthesizing optical element and the protruding portion.

According to such a configuration, the gap forms an air path to cool the light modulating devices and the optical elements, such as the polarizing plate and the like disposed in the vicinity thereof, so deterioration of the light modulating devices and the optical elements disposed in the vicinity thereof due to heat can be reduced or prevented, thereby contributing to enhanced image quality.

With the optical device according to the third aspect of the present invention, the color synthesizing optical element and the base, the color synthesizing optical element and the holding member, and the holding member and the holding frame, are each preferably fixed by a thermal-conductive adhesive agent.

According to such a configuration, adhesive agent introduced between the members assists thermal conduction between the members, so that dissipation capabilities can be further enhanced.

Also, in the event that the holding member and the holding frame are fixed by a thermal-conductive adhesive agent, the gap between the erected piece and the perimeter of the holding frame is preferably filled with a thermal-conductive adhesive agent.

According to such a configuration, the area of connection between the holding frame and holding member is widened, so the heat generated at the light modulating devices can be speedily dissipated to the holding member, further enhancing the cooling efficiency of the light modulating devices.

Also, in this case, the thermal-conductive adhesive agent is preferably constituted containing a metal material. Using such an adhesive agent further promotes thermal conduction between the members, since the metal material in the adhesive agent is sandwiched between the members so as to thermally connect the members.

With the optical device according to the third aspect of the present invention, the holding frame is preferably configured of a thermal-conductive metal or thermal-conductive resin.

According to such a configuration, the thermal conductivity of the holding frame introduced between the light modulating devices and the holding member can be increased, so heat dissipating capabilities can be further enhanced.

Also, at this time, the holding frame preferably includes a recessed frame member to store the light modulating devices, and a supporting plate to press and fix stored light modulating devices.

According to such a configuration for the holding frame, the area of contact between the light modulating devices and the holding frame increases. Accordingly, the heat generated at the light modulating devices can be efficiently dissipated to the holding frame, so the cooling efficiency of the light modulating devices can be enhanced.

With the optical device according to the third aspect of the present invention, the light modulating devices preferably include a pair of substrates, and a light-transmitting dust-proof plate fixed to at least one of the pair of substrates, with the thermal conductivity of the light-transmitting dust-proof plate being higher than the thermal conductivity of the substrate.

Thus, providing the light-transmitting dust-proof plate having higher thermal conductivity to the light modulating devices prevents adhesion of dust to the substrates of the light modulating devices themselves, and also enables heat dissipation from the surface of the light modulating devices, so cooling efficiency of the light modulating devices can be further enhanced. Accordingly, deterioration in image quality due to dust adhering to the substrates themselves of the light modulating devices, and deterioration in image quality due to deterioration of the capabilities of the light modulating devices due to heat, can be achieved, and the image quality of optical equipment, such as a projector employing such an optical device, can be enhanced.

With the optical device according to the third aspect of the present invention, a light-transmitting plate with higher thermal conductivity than that of the material forming the color synthesizing optical element is preferably provided on the light incident end face of the color synthesizing optical element, with the light-transmitting plate and the base being joined in a thermally-conductible manner.

According to such a configuration, a more efficient heat conducting path including the holding member, light-transmitting plate, and base, can be configured, so even in the event that the color synthesizing optical element is configured of a material with relatively low thermal conductivity, high thermal dissipation capabilities can be maintained. Sapphire, crystal, quartz, or the like, which have higher thermal conductivity than general glass can be used for such a light-transmitting plate.

Further, at this time, the light-transmitting plate and the base may be joined with a thermal-conducting adhesive agent, or may be joined with a thermal-conducting sheet or spacer members or the like formed of a thermal-conducting material introduced therebetween. Thus, the heat dissipating capabilities of the heat conducting path can be enhanced by joining the light-transmitting plate and the base with a thermal-conducting adhesive agent or the like having excellent thermal conductivity.

With the optical device according to the third aspect of the present invention, the base is preferably connected to a heat dissipating device for performing forced cooling.

As described above, the heat generated at the light modulating devices is discharged to the base through the holding member. Hence, connecting a heat dissipating device to perform forced cooling to the base enables the cooling efficiency of the light modulating devices to be further enhanced.

A projector according to the fourth aspect of the present invention includes an optical device integrally provided with a plurality of light modulating devices to modulate a plurality of color lights for each color light according to image information, and a color synthesizing optical element to synthesize each color light modulated at the light modulating devices, including: a holding frame to hold the light modulating devices, having an opening for a portion corresponding to an image formation region of the light modulating devices; a base fixed to at least one end of a pair of end faces intersecting with an optical flux incident end face of the color synthesizing optical element; a holding member directly fixed to the base, having an erected piece formed so as to cover the side edge of the holding frame, and a supporting piece to support the face of the holding frame at the side of the color synthesizing optical element; and spacers disposed between the holding frame and the erected piece of the holding member. The base and the holding member are configured of a thermal-conductive metal or thermal-conductive resin. The holding frame is fixed to the holding member by the spacers.

According to such a present invention, the base and the holding member are configured of a thermal-conductive metal or thermal-conductive resin having excellent thermal conductivity, so the heat generated at the light modulating devices can be dissipated in the order of the holding member and the base so as to escape. Accordingly, malfunctions due to high temperatures of the light modulating devices can be reduced or prevented, while greatly enhancing the cooling capabilities of the light modulating devices.

Also, due to enhanced cooling capabilities of the light modulating devices, light fluxes from the light source can be increased, thereby increasing the brightness of the image projected on a screen.

Further, in the event of using a fan to cool the optical device, the fan can be reduced in size.

The description of "fixed to the base side face" means that the holding member is fixed to the base side face without position adjusting members such as spacers or pins being introduced therein. Accordingly, cases wherein a sapphire substrate or metal plate or the like to enhance thermal dissipation is introduced between the base side face and holding member are also encompassed by the first aspect of the present invention.

With the optical device according to the fourth aspect of the present invention, the thermal conductivity of the thermal-conductive metal or thermal-conductive resin is preferably 3 W/(m·K) or higher.

According to such a configuration, the heat generated at the light modulating devices can be speedily dissipated through the above heat conducting path. Also, the material of the holding member and the base can be freely set within a range satisfying the conditions of 3 W/(m·K) or higher, so materials meeting demands can be used. Accordingly, at the time of designing the optical device, materials can be optimized according to the demanded capabilities and the like.

With the optical device according to the fourth aspect of the present invention, preferably the base has a recessed portion formed at a portion of an end face where the holding member is fixed by adhesion.

According to such a configuration, in the event that a fan is used to cool the optical device, this recessed portion can be used as an air path for cooling air. Accordingly, the optical device can be efficiently cooled.

With the optical device according to the fourth aspect of the present invention, the holding frame, the holding member, and the base, are each preferably fixed by a thermal-conductive adhesive agent. According to such a configuration, adhesive agent introduced between the members assists thermal conduction between the members, so that dissipation capabilities can be further enhanced.

Also, in this case, the gap between the erected piece and the holding frame is preferably filled with a thermal-conductive adhesive agent. According to such a configuration, the area of connection between the holding frame and holding member is widened, so the heat generated at the light modulating devices can be speedily dissipated to the holding member, further enhancing the cooling efficiency of the light modulating devices.

Here, the adhesive agent is preferably constituted containing a metal material. Using such an adhesive agent further promotes thermal conduction between the members, since the metal material in the adhesive agent is sandwiched between the members so as to thermally connect the members.

With the optical device according to the fourth aspect of the present invention, the base is preferably fixed to only one of a pair of end faces intersecting with an optical flux incident end face of the color synthesizing optical element, with a linking member to link the holding members facing one another being provided near the other of the end faces, and the linking member being configured of a thermal-conductive metal or thermal-conductive resin.

According to such a configuration, not only heat dissipation from the holding member to the base due to thermal transfer, but also heat dissipation from the holding member to the linking member is enabled. Accordingly, the cooling capabilities of the optical modulating devices can be further enhanced.

Also, at this time, at least two of the base, the holding member, and the linking member, are preferably formed integrally. According to such a configuration, thermal dissipation from the holding member to the base and from the holding member to the linking member becomes smoother, enabling the cooling capabilities of the optical modulating devices to be further enhanced.

Also, at this time, the holding frame preferably includes a recessed frame member to store the light modulating devices, and a supporting plate to press and fix stored light modulating devices.

According to such a configuration of the holding frame, the area of contact between the light modulating devices and the holding frame increases. Accordingly, the heat generated at the light modulating devices can be efficiently dissipated to the holding frame, so the cooling efficiency of the light modulating devices can be enhanced.

With the optical device according to the fourth aspect of the present invention, the light modulating devices preferably include a pair of substrates, and a light-transmitting dust-proof plate fixed to at least one of the pair of substrates, with the thermal conductivity of the light-transmitting dust-proof plate being higher than the thermal conductivity of the substrate.

Thus, providing the light-transmitting dust-proof plate having higher thermal conductivity to the light modulating devices reduces or prevents adhesion of dust to the substrates of the light modulating devices themselves, and also enables heat dissipation from the surface of the light modulating devices, so cooling efficiency of the light modulating devices can be further enhanced. Accordingly, deterioration in image quality due to dust adhering to the substrates themselves of the light modulating devices, and deterioration in image quality due to deterioration of the capabilities of the light modulating devices due to heat, can be achieved, and the image quality of optical equipment such as a projector employing such an optical device can be enhanced.

With the optical device according to the fourth aspect of the present invention, a light-transmitting plate with higher thermal conductivity than that of the material forming the color synthesizing optical element is preferably provided on the light incident end face of the color synthesizing optical element, with the light-transmitting plate and the base being joined in a thermally-conductible manner.

According to such a configuration, a more efficient heat conducting path including the holding member, light-transmitting plate, and base, can be configured, so even in the event that the color synthesizing optical element is configured of a material with relatively low thermal conductivity, high thermal discharge capabilities can be maintained. Sapphire, crystal, quartz, or the like, which have higher thermal conductivity than general glass can be used for such a light-transmitting plate.

Further, at this time, the light-transmitting plate and the base may be joined with a thermal-conducting adhesive agent, or may be joined with a thermal-conducting sheet or spacer members or the like formed of a thermal-conducting material introduced therebetween. Thus, the heat dissipating capabilities of the heat conducting path can be enhanced by joining the light-transmitting plate and the base with a thermal-conducting adhesive agent or the like having excellent thermal conductivity.

With the optical device according to the fourth aspect of the present invention, the base is preferably connected to a heat dissipating device to perform forced cooling.

As described above, the heat generated at the light modulating devices is discharged to the base through the holding member. Hence, connecting a heat dissipating device to perform forced cooling to the base enables the cooling efficiency of the light modulating devices to be further enhanced.

The optical devices according to the first through fourth aspects of the present invention described above may be employed in a projector including a projecting lens to project images formed by the optical device. Employing the optical device according to the present invention in such a projector enhances cooling capabilities of light modulating devices, so malfunctions due to high temperatures of the light modulating devices can be reduced or prevented, and accordingly, high image quality can be maintained. Also, light fluxes from the light source can be increased, thereby enabling increasing the brightness of the image projected on a projecting face such as a screen. Further, in the event of using a fan to cool the optical device, the fan can be reduced in size, so the size of the projector can be reduced, as well.

Further, in the event that the projector includes an optical parts housing to store a plurality of optical elements making up an optical system, the optical parts housing is preferably configured of thermal-conductive material, and the base fixed to the optical parts housing. Further, in the event that the optical device and the optical parts housing are stored in an external case, the external case is preferably configured of thermal-conductive material, with the optical parts housing being joined with the external case in a thermally-conductible manner. According to such a configuration, the heat reaching the base through the holding member can be dissipated by thermal conduction to the optical parts housing, and in some instances, sequentially to the external case, so the cooling capabilities of the light modulating devices can be greatly enhanced. Accordingly, the cooling capabilities of the light modulating devices within the device are greatly enhanced, thereby achieving reduced size, high luminance, and high reliability, of projectors.

DETAILED DESCRIPTION OF PREFERRED EMBODIMENTS

First Embodiment

The first embodiment according to the present invention will be described below with reference to the drawings.

(1. Primary Construction of Projector)

Figure 1:
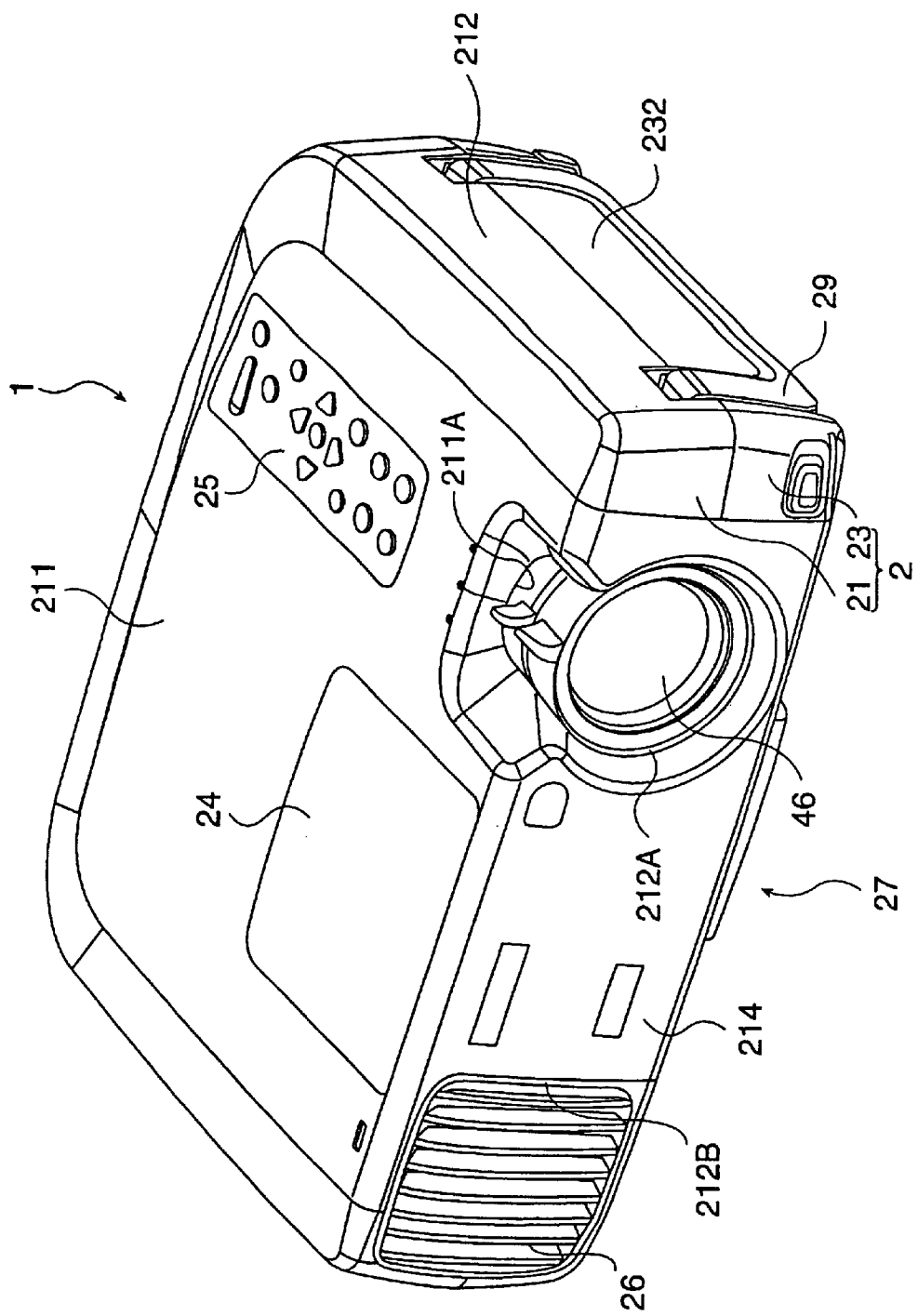
FIG. 1 is an overall perspective view viewing from above a projector according to an embodiment of the present invention.
Figure 2:
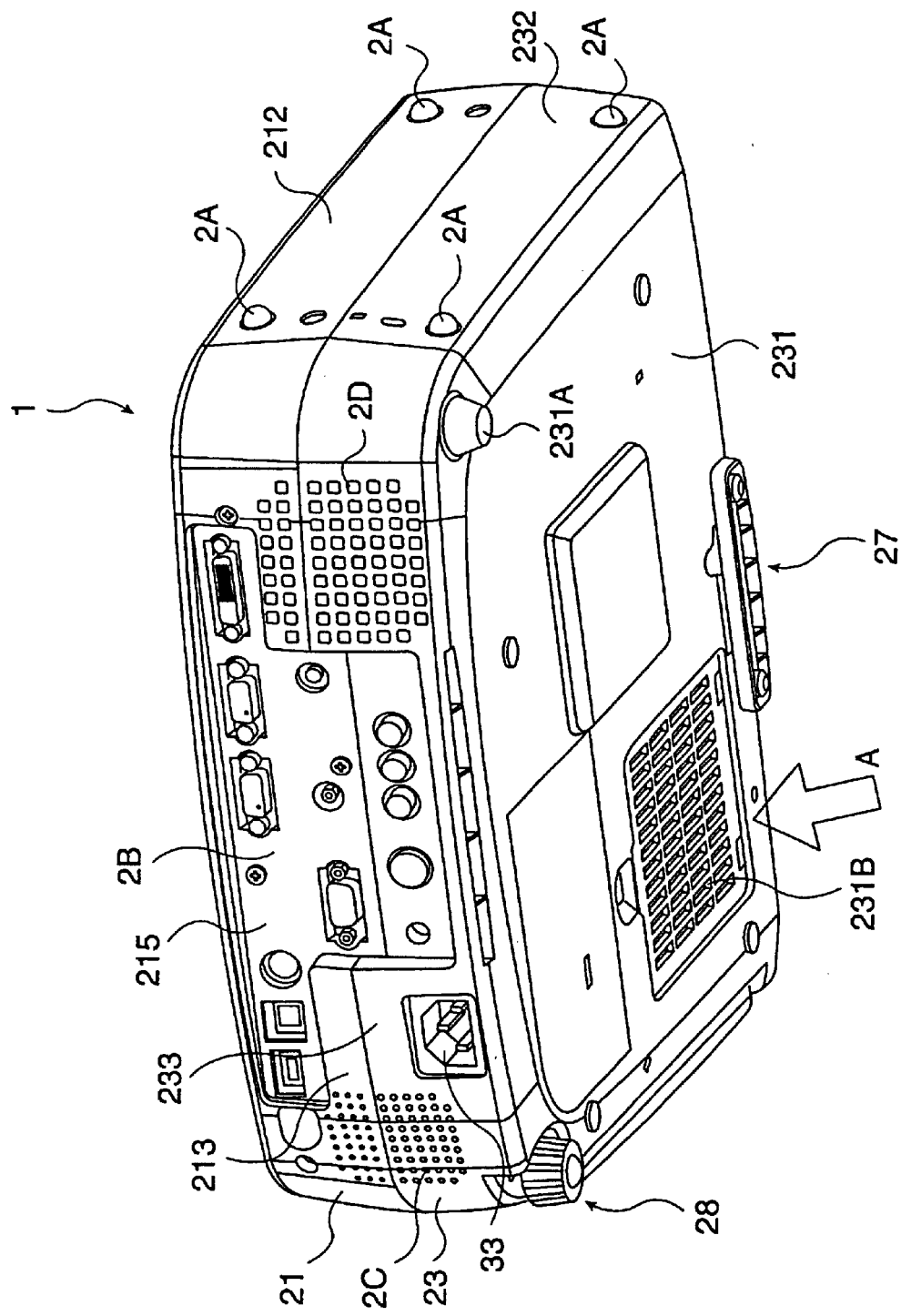
FIG. 2 is a an overall perspective view viewing from below a projector according to an embodiment of the present invention.
Figure 3:
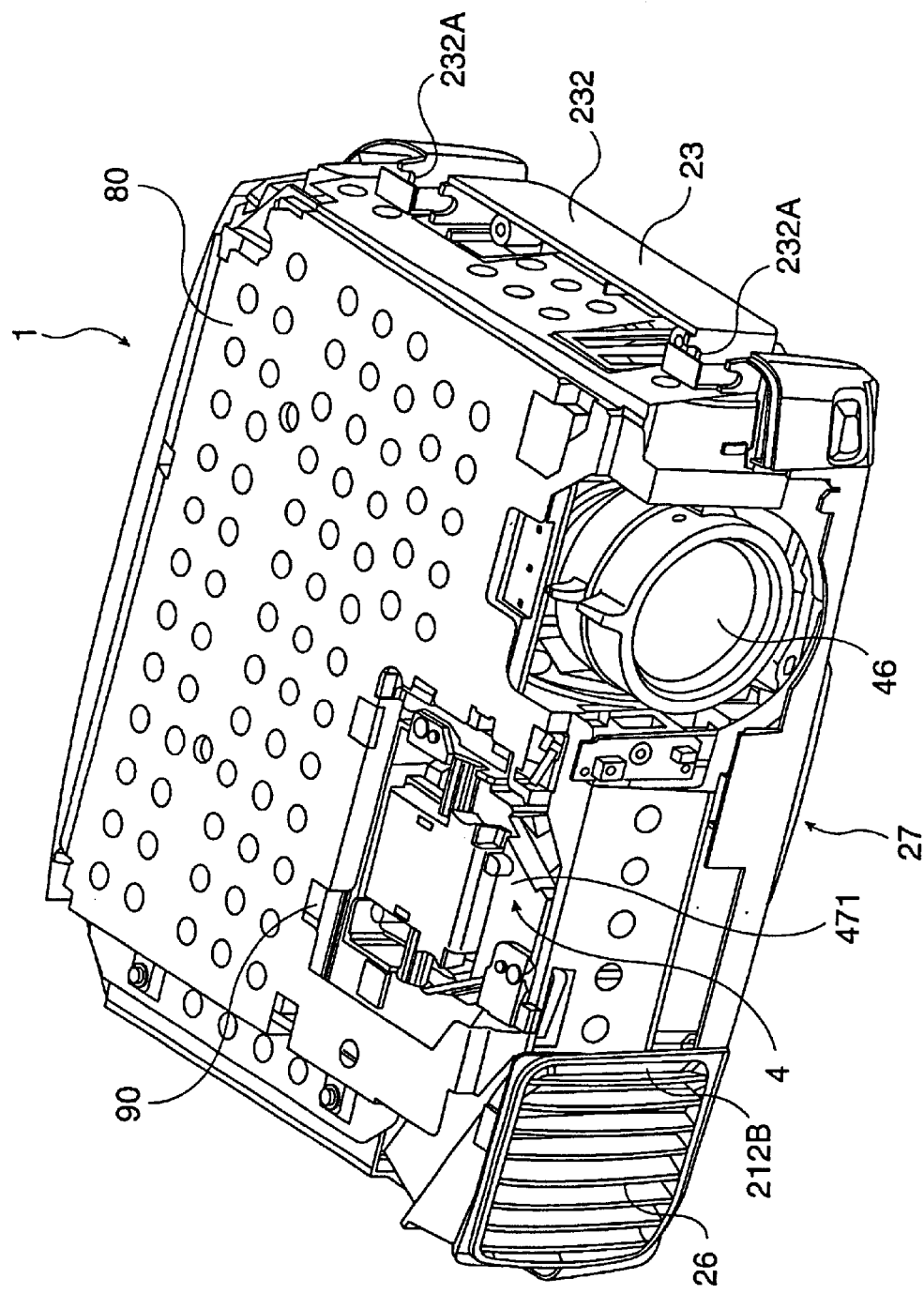
FIG. 3 is a perspective view illustrating the inside of a projector relating to an embodiment of the present invention, and specifically is a diagram wherein the upper case of the projector has been removed from the state shown in FIG. 1.
Figure 4:
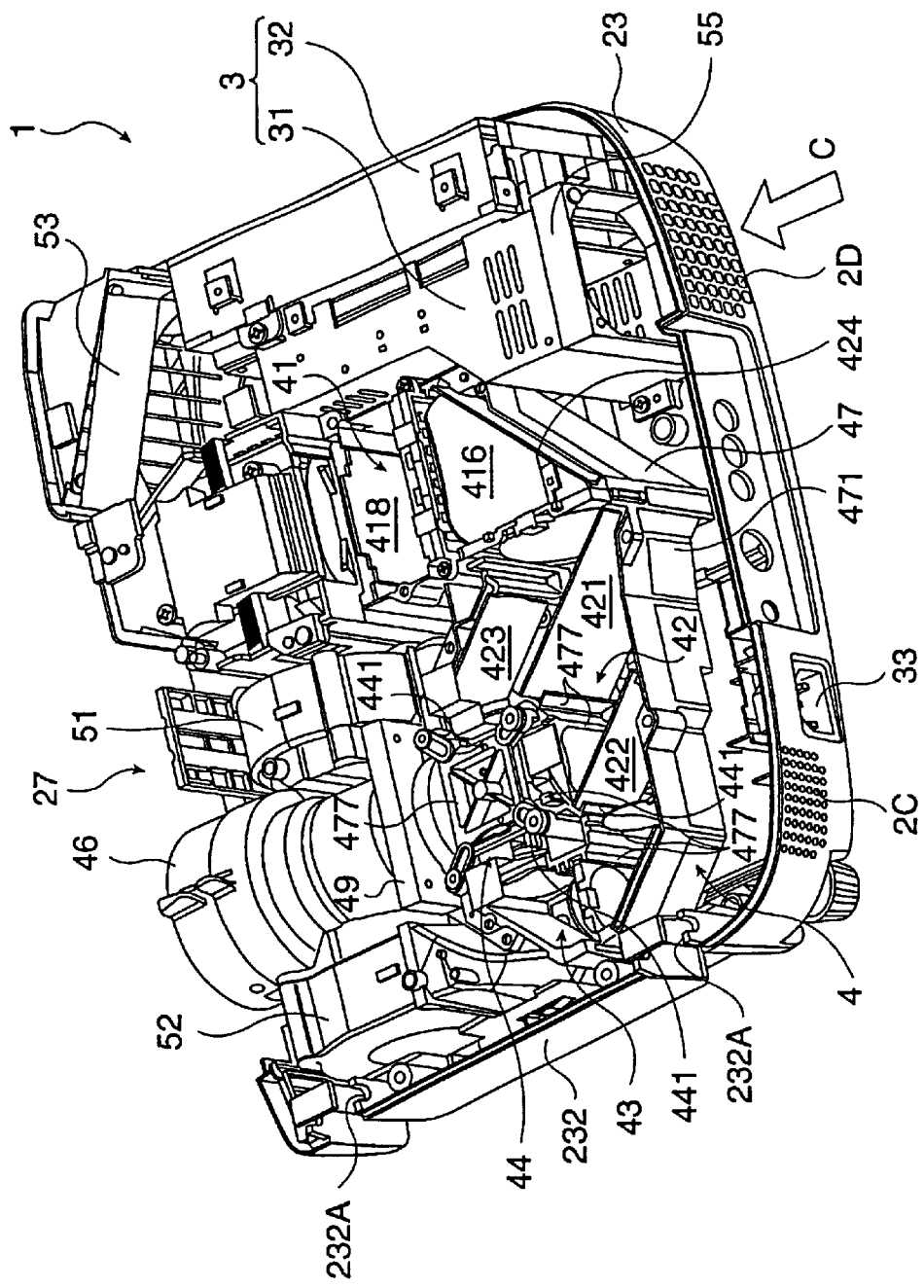
FIG. 4 is a perspective view illustrating the inside of a projector relating to an embodiment of the present invention, and specifically is a diagram wherein the shield plate, driver board, and upper housing have been removed from the state shown in FIG. 3.
Figure 5:
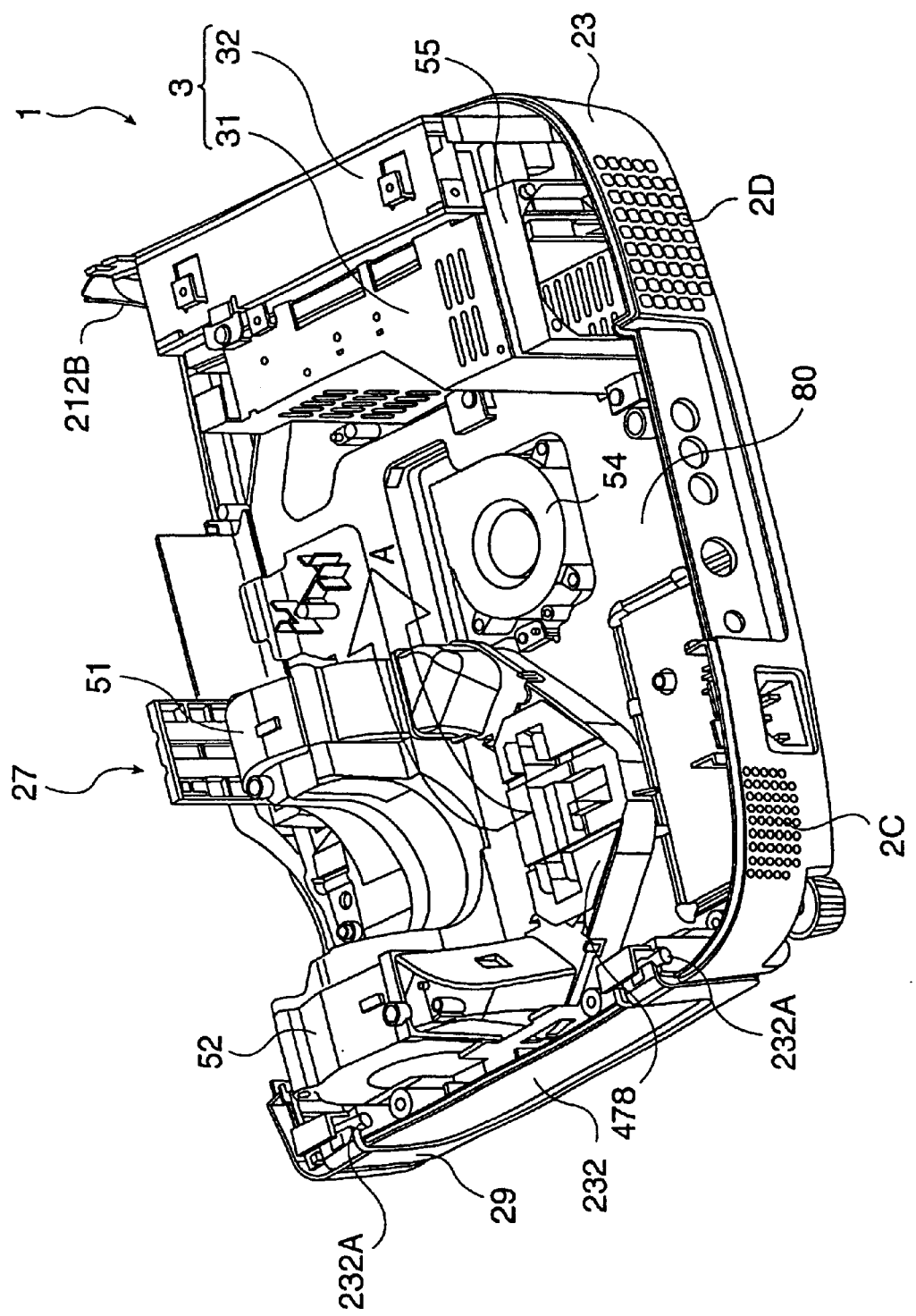
FIG. 5 is a perspective view illustrating the inside of a projector relating to an embodiment of the present invention, and specifically is a diagram wherein the optical unit has been removed from the state shown in FIG. 4.

FIG. 1 is an overall perspective view of a projector 1 according to the first embodiment as viewed from above, FIG. 2 is an overall perspective view of the projector 1 as viewed from below, and FIG. 3 through FIG. 5 are perspective views of the interior of the projector 1. Specifically, FIG. 3 shows an upper case 21 of the projector 1 has been removed from the state shown in FIG. 1, FIG. 4 shows a shield plate 80, driver board 90, and upper housing 472 removed from the state shown in FIG. 3 as viewed from the rear side, and FIG. 5 shows an optical unit 4 has been removed from the state shown in FIG. 4. Elements 4, 21, 80, 90, and 472, which make up the projector, will be described below in detail.

In FIG. 1 through FIG. 5, the projector 1 has an external case 2, an electric power source unit 3 stored in the external case 2, and an optical unit 4 disposed in the external case 2 as well, having a U-shaped form on the flat, with an overall generally rectangular parallelepiped shape.

The external case 2 is configured of an upper case 21 and a lower case 23, each formed of a thermal conductive material. The cases 21 and 23 are mutually fixed by screws.

Examples of thermal-conductive materials configuring the external case 2 include lightweight and superbly thermal-conductive metals, such as Al, Mg, Ti, alloys thereof, carbon steel, brass, stainless steel, and so forth, or resins with carbon filler, such as carbon fiber, carbon nano-tubes, etc., mixed in (polycarbonate, polyphenylene sulfide, liquid crystal resin, or the like).

Also, the external case does not need to be made all of the same material, and arrangements may be made where a part of the external case is formed of resin and the other part formed of metal. For example, the upper case 21 may be formed of resin, and the lower case formed of metal.

The upper case 21 is formed of an upper portion 211, a side portion 212 provided on the perimeter thereof, a back portion 213, and a front portion 214.

A lamp cover 24 is detachably attached to the front side of the upper portion 211, by fitting in. Also, a notch portion 211A is provided to the side of the lamp cover 24 at the upper portion 211 with the upper portion of a projecting lens 46 exposed therefrom, so that zoom operation and focusing operation of the projecting lens 46 can be performed manually by levers. An operating panel 25 is provided at the back side of the notch portion 211A.

The front portion 214 has a round hole opening 212A which connects to the notch portion 211A of the upper case 21, and the projecting lens 46 is positioned corresponding to the round hole opening 212A. A vent 212B formed to the lower case 23 side is positioned at the opposite side of the round hole opening 212A on the front portion 214. The vent 212B is positioned to the front of the internal electric power source unit 3. A venting louver 26 is provided which vents cooling air to the direction away from the image projection region, i.e., to the left side in FIG. 1, and also has light shielding functions (the venting louver 26 is actually attached to the lower case 23 ).

The lower case 23 is formed of a bottom portion 231 and a side portion 232 and a back portion 233 provided on the perimeter thereof.

A position adjusting mechanism 27 to perform positioning of the projected image by adjusting the inclination of the entire projector 1 is provided at the front side of the bottom portion 231. Also, a position adjusting mechanism 28 to adjust the inclination of the projector 1 in a different direction is provided at one corner portion of the rear side of the bottom portion 231, with a rear foot 231A provided at the other corner. The rear foot 231A is not capable of positional adjustment. Further, an air inlet 231B to cool air is provided on the bottom portion 231.

An attaching portion 232A to rotatably attach a horseshoe-shaped handle 29 is provided to the other side portion 232.

Side feet 2A (FIG. 2) which serve as feet in the event of standing the projector 1 up with the handle 29 on the top are provided to the side portions 212 and 232 of the upper case 21 and the lower case 23, on one side of such an external case 2.

Also, provided on the back side for the external case 2 is an interface portion 2B which opens straddling the back portion 213 of the upper case 21 and the back portion 233 of the lower case 23, with an interface cover 215 being provided within this interface portion 2B, and an interface board, which is omitted in the drawings, having various types of connectors mounted thereupon being positioned on the inner side of the interface cover 215. Speaker holes 2C and an air inlet 2D are provided to the left and right sides of the interface portion 2B, straddling the back portions 213 and 233. Of these, the air inlet 2D is positioned at the back of the internal electric power source unit 3.

The electric power source unit 3 is configured of an electric power source 31 and a lamp driving circuit (ballast) 32 disposed to the side of the electric power source 31, as shown in FIG. 4.

The electric power source 31 supplies electric power supplied through an electric power source cable to the lamp driving circuit 32 and driver board 90 (FIG. 3) and so forth, and comprises an inlet connector 33 (FIG. 2) where the electric power source cable is plugged in.

The lamp driving circuit 32 supplies electric power to a light source lamp 411 of the optical unit 4.

Figure 6:
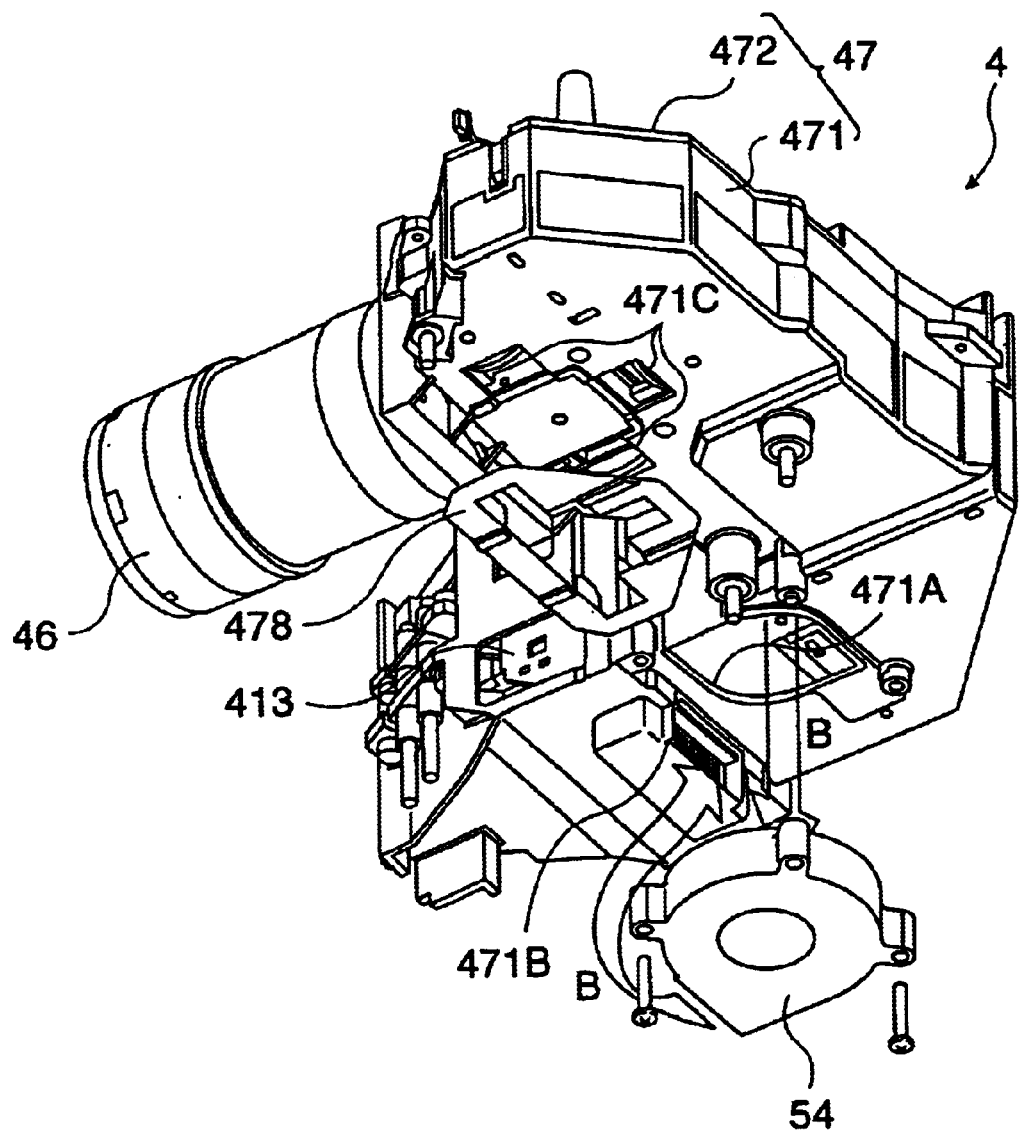
FIG. 6 is a perspective view viewing the optical unit according to an embodiment of the present invention from the lower side.
Figure 7:
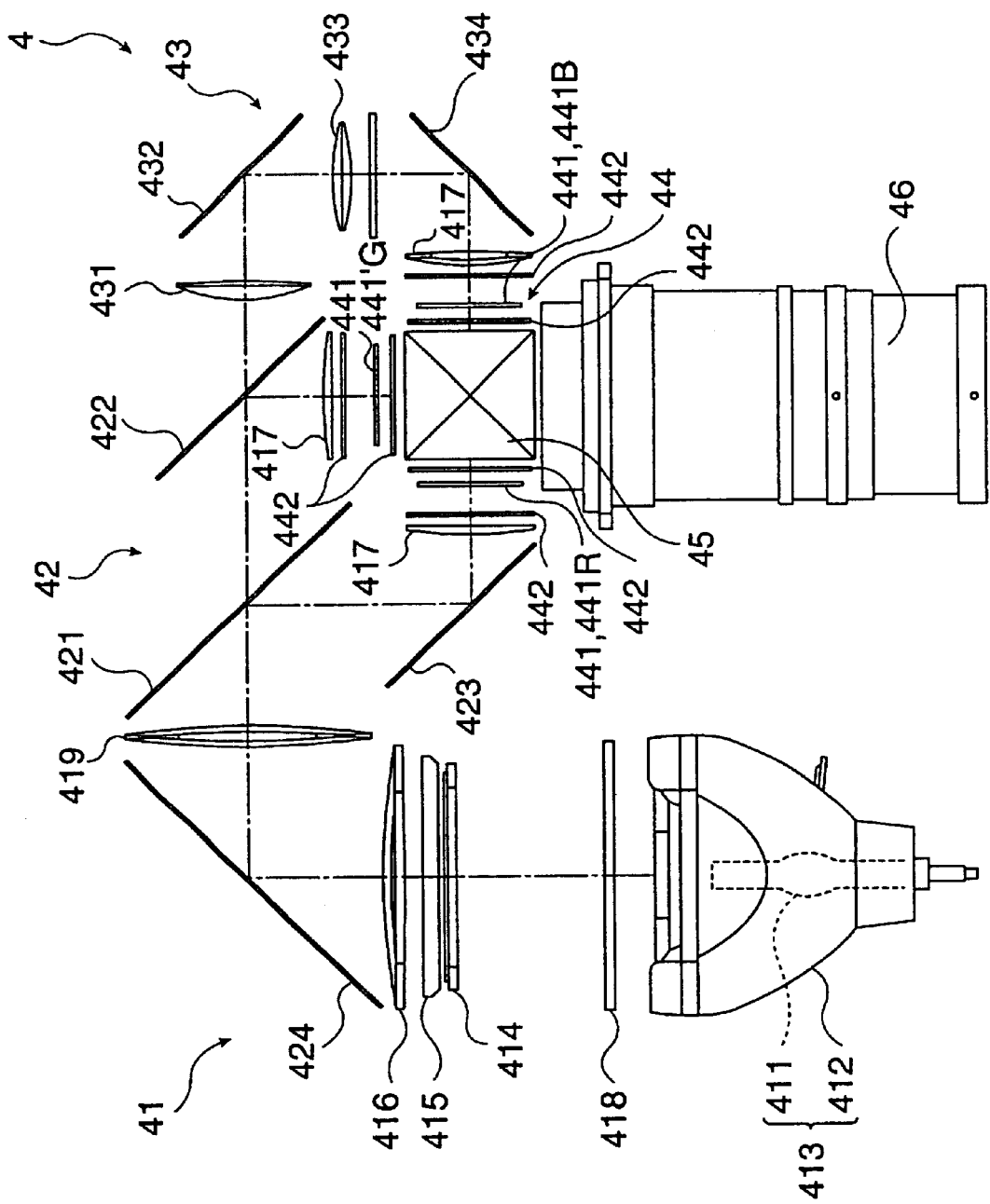
FIG. 7 is a plan view schematically illustrating the optical system of a projector according to an embodiment of the present invention.

The optical unit 4 is a unit to optically process light flux emitted from the light source lamp 411 and forming an optical image corresponding to image information, as shown in FIG. 4, FIG. 6, and FIG. 7, and includes an integrator illumination optical system 41, a color separating optical system 42, a relay optical system 43, an electric optical device 44, a cross-dichroic prism 45 serving as a color synthesizing optical system (FIG. 7), and a projecting lens 46 serving as a projecting optical system.

The electric power source unit 3 and the optical unit 4 are surrounded by an aluminum shield plate 80 (FIG. 3 and FIG. 5), including above and below, and accordingly electromagnetic noise is prevented from leaking out externally from the electric power source unit 3 or the like, or leakage of the noise is reduced.

(2. Detailed Configuration of Optical System)

In FIG. 4 and FIG. 7, the integrator illumination optical system 41 is an optical system acting so as to approximately uniformly illuminate the image forming area of the three liquid crystal panels 441 (liquid crystal panels 441R, 441G, and 441B denoted for each color light red, green, and blue) making up the electric optical device 44, and includes a light source device 413, a first lens array 418, a second lens array 414 including a UV filter, a polarization converting element 415, a first condenser lens 416, a reflecting mirror 424, and a second condenser lens 419.

Of these, the light source device 413 has a light source lamp 411 serving as an radial light source to emit radial light rays, and a reflector 412 to reflect the radial light emitted from the light source lamp 411. As for the light source lamp 411, halogen lamps, metal-halide lamps, or high-pressure mercury lamps are often used. A paraboloid mirror is used for the reflector 412. An ellipsoidal mirror may be used in conjunction with a paralleling lens (concave lens), other than the paraboloid mirror.

The first lens array 418 has a structure wherein small lenses having an approximately rectangular outline as viewed from the optical axis direction are arrayed in matrix fashion. Each of the small lenses divide the light flux emitted from the light source lamp 411 into multiple partial light fluxes. The outline form of the small lenses is set to a substantially similar figure to the form of the image forming area of the liquid crystal panel 441. For example, in the event that the aspect ratio (the ratio of horizontal and vertical dimensions) of the image formation region of the liquid crystal panel 441 is 4:3, the aspect ratio of the small lenses is also 4:3.

The second lens array 414 has a configuration generally the same as that of the first lens array 418, having a configuration wherein small lenses are arrayed in matrix fashion. This second lens array 414 functions to image the images of the small lenses of the first lens array 418 on the liquid crystal panel 441 along with the first condenser lens 416 and the second condenser lens 419.

The polarization converting element 415 is positioned between the second lens array 414 and the first condenser lens 416, and is formed into an integral unit with the second lens array 414. Such a polarization converting element 415 converts light from the second lens array 414 into one type of polarized light, whereby the usage efficiency of the light at the electric optical device 44 is enhanced.

Specifically, each partial light converted into one type of polarized light by the polarization converting element 415 is approximately superimposed on the liquid crystal panels 441R, 441G, and 441B of the electric optical device 44 in the end, by the first condenser lens 416 and the second condenser lens 419. With a projector using the type of liquid crystal panel which modulates polarized light, only one type of polarized light can be used, so approximately half of the light from the light source lamp 411 which emits random polarized light cannot be used.

Accordingly, the emitted light from the light source lamp 411 is converted into one type of polarized light by using the polarization converting element 415, thereby raising the usage efficiency of the light at the electric optical device 44. Such a polarization converting element 415 is introduced in, for example, Japanese Unexamined Patent Application Publication No. 8-304739.

The color separating optical system 42 includes two dichroic mirrors 421 and 422, and a reflecting mirror 423, and functions to divide the multiple partial light fluxes emitted from the integrator illumination optical system 41 into the three color lights of red, green, and blue, with the dichroic mirrors 421 and 422.

The relay optical system 43 includes an incident side lens 431, relay lens 433, and reflecting mirrors 432 and 434, and functions to guide the color light divided at the color separating optical system 42, the blue light, to the liquid crystal panel 441B.

At this time, at the dichroic mirror 421 of the color separating optical system 42, the blue color light component and the green color light component of the light flux emitted from the integrator illumination optical system 41 are transmitted, while the red color light component is reflected. The red color light reflected by the dichroic mirror 421 is reflected at the reflecting mirror 423, passes through a field lens 417 and has the polarization direction thereof matched at a polarizing plate 442, and then reaches the red color liquid crystal panel 441R. This field lens 417 converts each partial light flux emitted from the second lens array 414 to light flux parallel to the center axis (primary ray) thereof. This is true for field lenses 417 provided at the light incident side of the other liquid crystal panels 441G and 441B, as well.

Of the blue light and green light which have been transmitted through the dichroic mirror 421, the green light is reflected by the dichroic mirror 422, passes through the field lens 417 and has the polarization direction thereof matched at the polarizing plate 442, and then reaches the green color liquid crystal panel 441G. On the other hand, the blue light is transmitted by the dichroic mirror 422, passes through the relay optical system 43, further passes through the field lens 417 and has the polarization direction thereof matched at the polarizing plate 442, and then reaches the blue color liquid crystal panel 441B. The reason that a relay optical system 43 is used for the blue light is to reduce or prevent deterioration of the usage efficiency of the light due to diffusion and the like of the light, since the optical path for the blue light is longer than the optical paths for the other color lights. That is to say, this is to transmit the partial light flux cast into the incident side lens 431, to the field lens 417 as it is.

The electric optical device 44 includes liquid crystal panels 441R, 441G, and 441B, as three light modulating devices. The liquid crystal panels 441R, 441G, and 441B use polysilicon TFTs as switching devices for example, and each color light divided at the color separating optical system 42 is modulated according to image information by the liquid crystal panels 441R, 441G, and 441B, and the polarizing plates 442 at the light flux incident side and emitting side of these, thereby forming an optical image.

The cross-dichroic prism 45 serving as the color synthesizing element synthesize the images modulated for each color light emitted from the three liquid crystal panels 441R, 441G, and 441B, to form a color image. Now, the cross-dichroic prism 45 has a dielectric substance multi-layer film which reflects red light and a dielectric substance multi-layer film which reflects blue light formed following the interface of four right-angle prisms, in a general X shape, with the three color lights being synthesized by these dielectric substance multi-layer films. The color image synthesized by the cross-dichroic prism 45 is emitted from the projecting lens 46, and projected on a screen in an enlarged manner.

As shown in FIG. 4 and FIG. 6, the above-described optical systems 41 through 45 are stored inside an optical parts housing 47, serving as housing for the optical parts.

Now, the upper housing 472 and lower housing 471 are preferably formed of thermal-conductive material. Examples of such thermal-conductive materials include lightweight and superbly thermal-conductive metals, such as Al, Mg, Ti, alloys thereof, carbon steel, brass, stainless steel, and so forth, or resins with carbon filler, such as carbon fiber, carbon nano-tubes, etc., mixed in (polycarbonate, polyphenylene sulfide, liquid crystal resin, or the like).

The optical parts housing 47 is configured of a lower housing 471 having grooves to fit in by sliding in from above the above-described optical parts, 414 through 419, 421 through 423, 431 through 434 and the polarizing plates 442 disposed at the light incident side of the liquid crystal panels 441R, 441G, and 441B, and an upper housing 472 having a lid shape, to close off the opening at the top of the lower housing 471.

Also, a head portion 49 is formed at the light emitting side of the optical parts housing 47. The projecting lens 46 is fixed at the front side of the head portion 49, and the cross-dichroic prism 45 with the liquid crystal panels 441R, 441G, and 441B, attached at the back side.

(3. Cooling Structure)

As shown in FIG. 2 and FIG. 4 through FIG. 6, the projector 1 according to the present embodiment includes a panel cooling system A for primarily cooling the liquid crystal panels 441R, 441G, and 441B, a lamp cooling system B to primarily cool the light source lamp 411, and an electric power source cooling system C to primarily cool the electric power source 31.

First, a description will be provided regarding the panel cooling system A, with reference to FIG. 2, FIG. 4, and FIG. 5. With the panel cooling system A, a pair of sirocco fans 51 and 52 distributed on both sides of the projecting lens 46 are used. Cooling air drawn in through an air inlet 231B on the lower face by the sirocco fans 51 and 52 cools the liquid crystal panels 441R, 441G, and 441B and the polarizing plates 442 (FIG. 7) on the light flux incident side and emitting side thereof upwards from the bottom, and then is drawn to an axial exhaust fan 53 side at a front corner while cooling the lower face of the driver board 90 (FIG. 3), and is vented from the vent 212B (FIG. 3) on the front side.

Next, a description will be provided regarding the lamp cooling system B, with reference to FIG. 4 through FIG. 6. With the lamp cooling system B, a sirocco fan 54 provided to the lower face of the optical unit 4 is used. The cooling air within a projector 1 drawn by the sirocco fan 54 enters into the optical parts housing 47 from an opening (not shown) provided on the upper housing 472, passes between the second lens array 414 (FIG. 7) and polarization converting element 415 (FIG. 7) and cools these elements, following which the air exits from a vent side opening 471A of the lower housing 471 and is suctioned by the sirocco fan 54, and is vented. The vented cooling air enters into the optical parts housing 47 again from the air inlet side opening 471B of the lower housing 471, enters into the light source device 413 (FIG. 7) and cools the light source lamp 411 (FIG. 7), subsequently exits the optical parts housing 47, and is vented from the vent 212B (FIG. 3) by the axial vent fan 53.

Further, the electric power source cooling system C will be described with reference to FIG. 4. With the electric power source cooling system C, an axial intake fan 55 provided behind the electric power source 31 is used. The cooling air suctioned in from the air inlet 2D at the back side by the axial intake fan 55 cools the electric power source 31 and lamp driving circuit 32, and subsequently is vented from the vent 212B (FIG. 3) by the axial vent fan 53 as with the other cooling systems A and B.

(4. Structure of Optical Device)

The following description is provided of the structure of the optical device with reference to FIG. 8 through FIG. 14.

Figure 8:
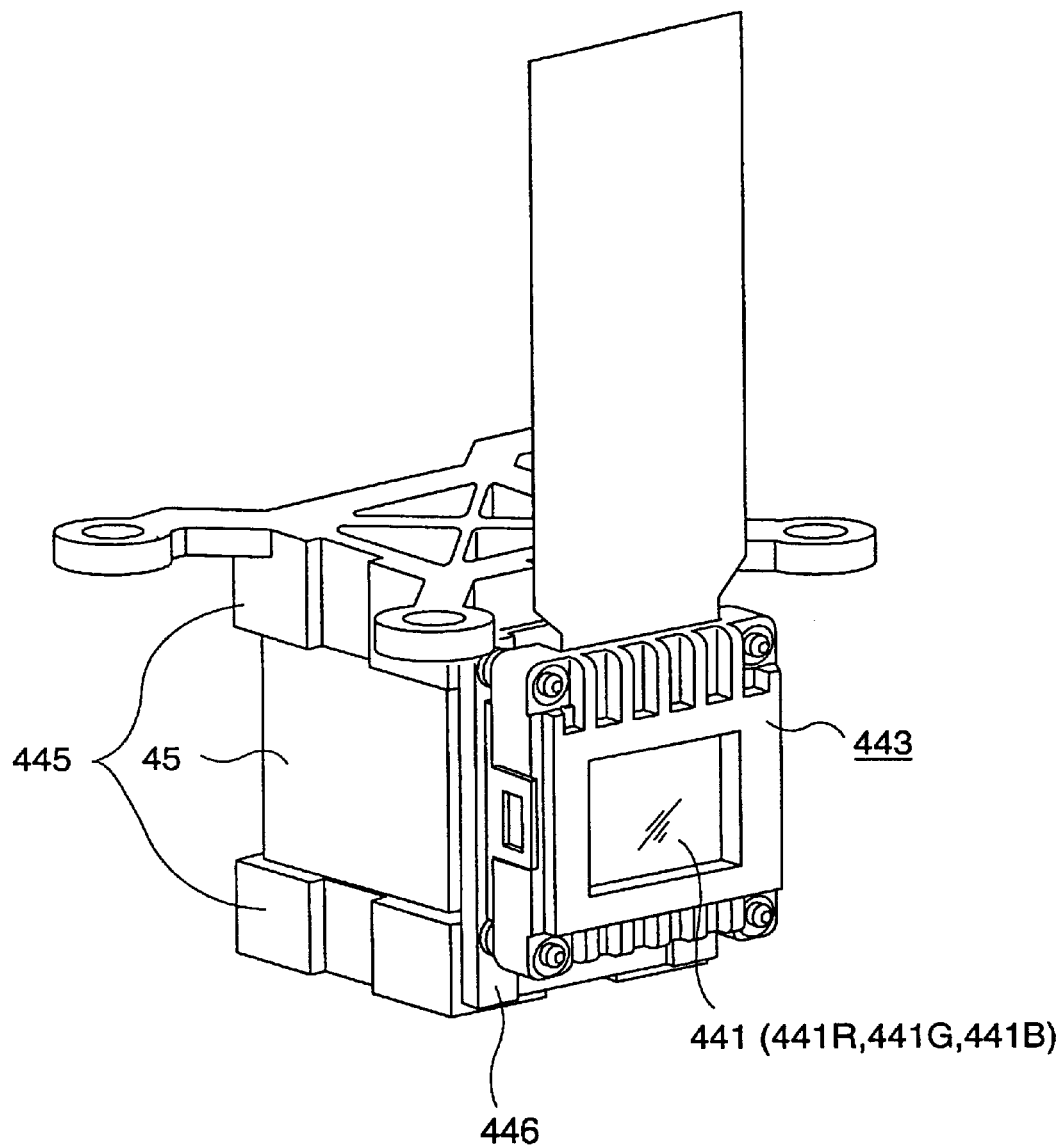
FIG. 8 is a perspective view viewing the optical system according to a first embodiment from above.

First, as shown in FIG. 8, the optical device includes a cross-dichroic prism 45, bases 445 fixed on both upper and lower faces of the cross-dichroic prism 45 (a pair of end faces intersecting with the light flux incident end face), the liquid crystal panels 441R, 441G, and 441B, a holding frame 443 to store the liquid crystal panels 441R, 441G, and 441B, and a holding member 446 introduced between the holding frame 443 and the side face of the bases 445.

Note that in FIG. 8, only one each of the liquid crystal panel 441, holding frame 443, and holding member 446 are shown, in order to simplify the diagram. These components 441, 443, and 446 are actually also disposed on two other light flux incident end faces of the cross-dichroic prism 45. This is also true for FIG. 9, FIG. 15, FIG. 16, and FIG. 17.

Now, with the present embodiment, the bases 445, holding member 446, and holding frame 443 are configured of an magnesium alloy. However, the material for these elements is not restricted to magnesium alloy. For example, lightweight and superbly thermal-conductive metals, such as Al, Mg, Ti, alloys thereof, carbon steel, brass, stainless steel, and so forth, or resins with carbon filler, such as carbon fiber, carbon nano-tubes, etc., mixed in (polycarbonate, polyphenylene sulfide, liquid crystal resin, or the like), may be used. Also, a metal (including alloys) or resin with 3 W/(m·K) or more in thermal conductivity is preferably used for the material for these members. This is because the thermal conductivity of optical glass which is a common material for the cross-dichroic prism 45 is approximately 0.7 W/(m·K), therefore fourfold thermal conductivity thereof would be considered sufficient to anticipate enhancement in thermal discharge capabilities. Table 1(a) gives examples of material with thermal conductivity of 3 W/(m·K) or higher. Also, as a comparison, Table 1(b) provides examples of material with thermal conductivity of 3 W/(m·K) or lower.

TABLE 1

|     |                          | Thermal Conductivity W/(m · K) |
|-----|--------------------------|--------------------------------|
| (a) | Mg alloy (AZ91D)         | 72                             |
|     | Al alloy (ADC12)         | 100                            |
|     | Carbon steel             | 42                             |
|     | Brass                    | 106                            |
|     | Austenitic stainless steel | 16                           |
|     | CoolPoly (RS007)         | 3.5                            |
|     | CoolPoly (RS012)         | 10                             |
|     | CoolPoly (RS008)         | 3.5                            |
|     | CoolPoly (D2)            | 15                             |
| (b) | ABS resin                | 0.2                            |
|     | Polycarbonate            | 0.2                            |
|     | Quartz glass             | 1.38                           |

In Table 1(a), CoolPoly is a product name (registered trademark) of a thermally conductive resin from Cool Polymer, Inc., and inside the parentheses are product numbers.

Also, the materials listed in Table 1(a) are examples of thermal-conductive metals or thermal-conductive resins which can be used as materials for the bases 445, holding member 446, and holding frame 443. Though brass is listed in Table 1(a) as the material with the highest thermal conductivity, it is needless to say that the thermal conductivity of materials making up these members may be higher.

The bases 445 are fixed on both upper and lower faces of the cross-dichroic prism 45, the perimeter forms thereof being somewhat larger than that of the cross-dichroic prism 45, and the side faces protruding out further than the side faces of the cross-dichroic prism 45.

Figure 9:
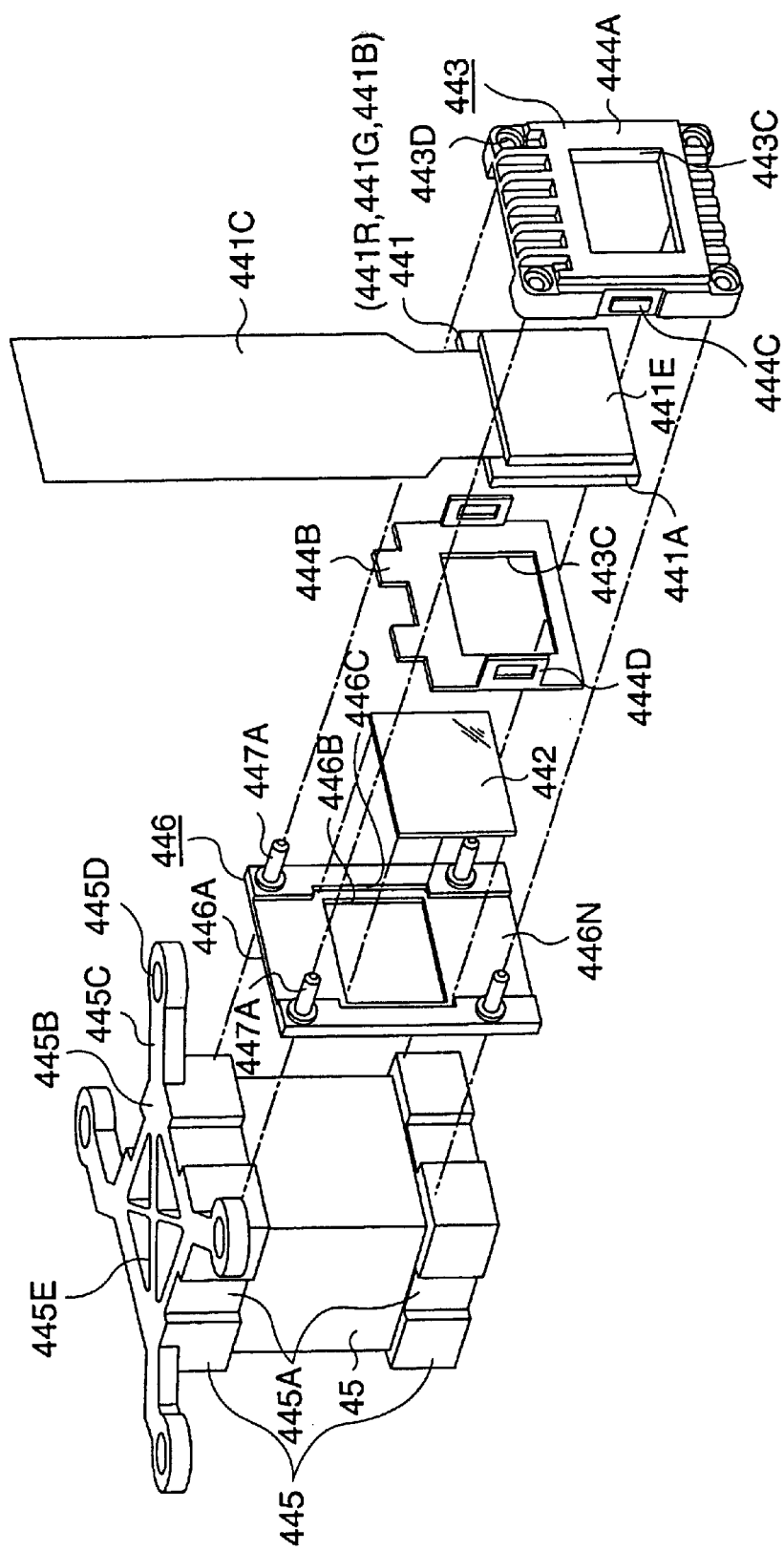
FIG. 9 is an exploded perspective view representing the structure of the optical device according to the first embodiment.

Also, as shown in FIG. 9, recesses 445A are formed on opposing upper and lower side edges on the side faces of the base 445, so that a tool, such as a screwdriver or the like, can be inserted between the holding member 446 and bases 445 which are fixed by adhesion.

Further, an attaching portion 445B is formed on the base 445 fixed on the upper face of the cross-dichroic prism 45, in order to fix the optical device to the lower housing 471.

Figure 13:
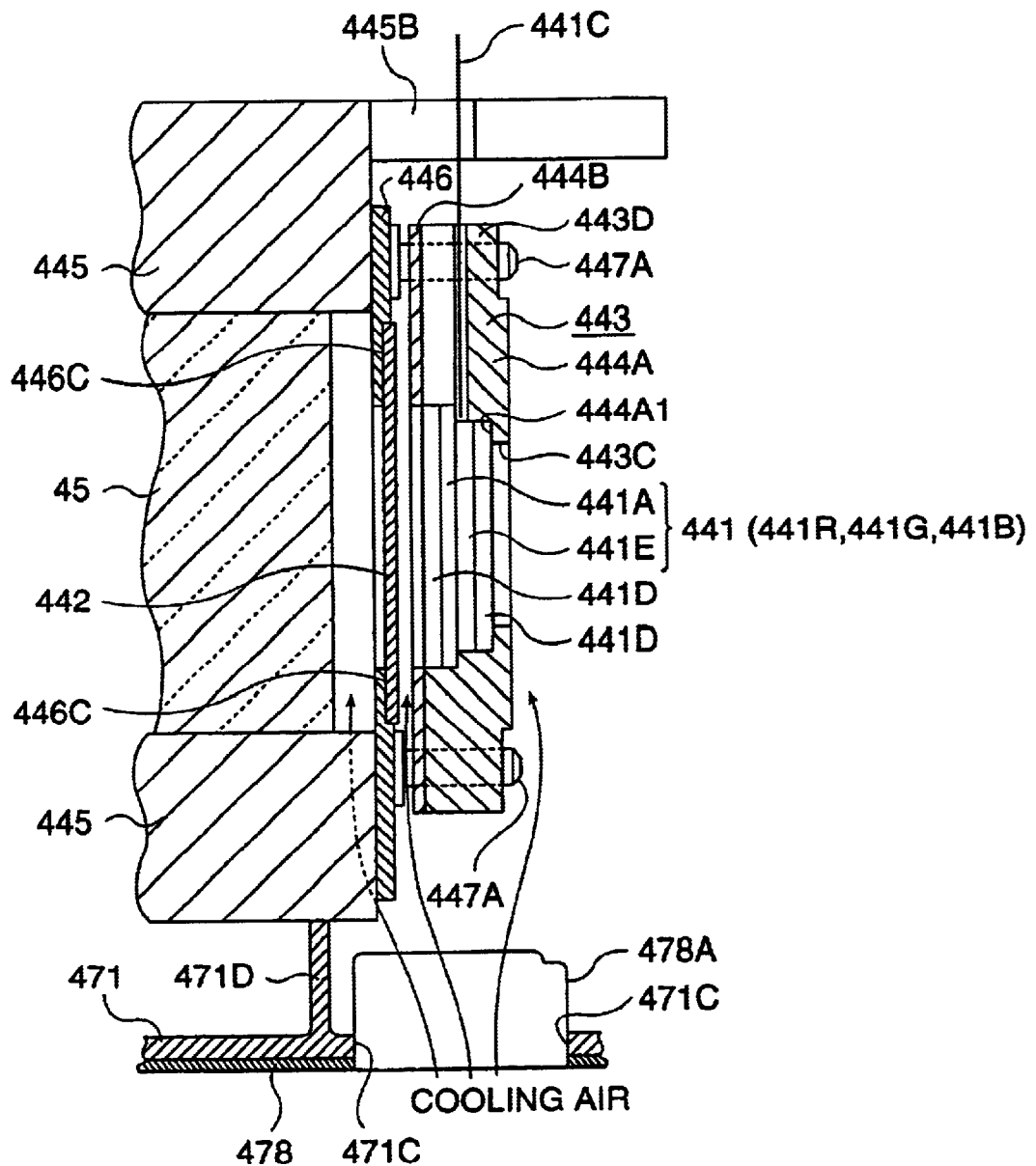
FIG. 13 is an enlarged plan view of the XIII portion shown in FIG. 12.

As shown in FIG. 13, the liquid crystal panel 441R has liquid crystal sealed in between a driving substrate (e.g., a substrate upon which are formed multiple line-shaped electrodes, electrodes making up pixels, and TFT devices electrically connected in between these) 441A and an opposing substrate (e.g., a substrate upon which is formed a common electrode) 441E, with a control cable 441C extending from between these glass substrates. Normally fixed upon the driving substrate 441A and the opposing substrate 441E are light-transmitting dust-proof plates 441D to offset the position of the panel face of the liquid crystal panel 441 from the back-focus position of the projecting lens 46, so that dust adhering to the surface of the panel is optically inconspicuous. A material with good thermal conductivity is used for the light-transmitting dust-proof plate, such as sapphire, crystal, quartz, or the like. The thermal conductivity of sapphire, crystal, and quartz is, respectively, 42 W/(m·K), 9 W/(m·K), and 1.38 W/(m·K). Though the present embodiment employs the light-transmitting dust-proof plate 441D, such a dust-proof plate is not indispensable. Also, an arrangement may be made where a light-transmitting dust-proof plate 441D is provided to only one substrate of the driving substrate 441A and the opposing substrate 441E. Further, a gap may be provided between the light-transmitting dust-proof plate 441D and the substrates 441A and 441E. This holds true for the following embodiments, as well. Note that in the drawings other than FIG. 13, the light-transmitting dust-proof plate 441D is omitted.

As shown in FIG. 13, the holding frame 443 is made up of a recessed frame member 444A having a storing portion 444A1 to store the liquid crystal panels 441R, 441G, and 441B, and a supporting plate 444B which engages with the recessed frame member 444A and presses and fixes the stored liquid crystal panels 441R, 441G, and 441B. Also, the holding frame 443 grasps the perimeter of the light-transmitting dust-proof plate 441D fixed to the opposing substrate 441E of the liquid crystal panels 441R, 441G, and 441B. Also, the liquid crystal panels 441R, 441G, and 441B, are stored in a storing portion 444A1 of the holding frame 443. An opening 443C is provided at a position corresponding to the panel face of the stored liquid crystal panels 441R, 441G, and 441B, with holes 443D formed at the four corners thereof. Also, as shown in FIG. 9, fixing of the recessed frame member 444A and the supporting plate 444B is performed by engaging hooks 444D provided at the left and right sides of the supporting plate 444B, and hook engaging portions 444C provided at places corresponding to the recessed frame member 444A.

Now, the liquid crystal panels 441R, 441G, and 441B are exposed at the opening 443C of the holding frame 443, and this portion becomes the image forming region. That is to say, the color light of R, G, and B is introduced to this portion of the liquid crystal panels 441R, 441G, and 441B, and an optical image is formed according to image information.

Further, a shielding film (not shown in the drawings) is provided at the light flux emitting side end face of the supporting plate 444 B, thereby reducing or preventing light from reflection from the cross-dichroic prism 45 from being further reflected to the cross-dichroic prism 45 side, thereby reducing or preventing deterioration in contrast due to stray light.

The holding member 446 is to hold and fix the holding frame 443 to store the liquid crystal panels 441R, 441G, and 441B, and as shown in FIG. 9, includes a rectangular plate-shaped member 446A, and pins 447A erected from the four corners of the rectangular plate-shaped member 446A. Now, the positions of the pins 447A do not need to be at the corners of the rectangular plate-shaped member 446A. The number of pins 447A is not restricted to four, with two or more being sufficient.

This holding member 446 is introduced between the bases 445 and the holding frame 443. The end face of the holding member 446 which is opposite to the pins 447A is fixed by adhesion to the side faces of the bases 445. Also, the holding member 446 and holding frame 443 are mutually fixed by adhesion, through the pins 447A of the holding member 446 and the holes 443D of the holding frame 443.

The rectangular plate-shaped member 446 A has a rectangular opening 446B formed in the generally center portion thereof, and a recess 446N is formed along the upper and lower side edges thereof. At the time of mounting the liquid crystal panels 441R, 441G, and 441B, the opening 446B corresponds to the image forming region of the liquid crystal panels 441R, 441G, and 441B. Also, a shielding film (omitted in the drawings) is provided on the light flux emitting end face of the rectangular plate-shaped member 446A, in the same way as with the holding frame 443.

Also, an engaging groove 446C is formed so as to surround the opening 446B, and a polarizing plate 442 where a polarizing film has been applied onto a sapphire substrate using a transparent adhesive agent is fixed so as to be engaged with this engaging groove 446C, using double-faced tape or adhesion.

The pins 447A have a diameter at the rising portion from the rectangular plate-shaped member 446A larger than the holes 443D formed on the holding frame 443, so that a gap is secured between the liquid crystal panels 441R, 441G, and 441B and the holding member 446 at the time of mounting the liquid crystal panels 441R, 441G, and 441B.

In the event that such a structure does not exist, i.e., in the event that the diameter of the pin 447A is generally equal from the base toward the tip, the gap cannot be secured at the time of mounting the holding frame 443 to the holding member 446, so the adhesive agent to fix the holding frame 443 and the holding member 446 spreads to the end face of the holding frame 443 due to surface tension, and adheres to the display face of the liquid crystal panel 441.

(5. Manufacturing Method for Optical Device)

The following is a detailed description of the manufacturing method for the optical device, with reference to FIG. 9.

(a) First, the bases 445 are fixed to the upper and lower faces of the cross-dichroic prism 45, using adhesive agent (base fixing step).

(b) Further, the polarizing plate 442 is fixed by double-face tape or adhesion so as to engage with the engaging grooves 446C of the holding member 446 (polarizing plate fixing step).

(c) The liquid crystal panels 441R, 441G, and 441B are stored in the storing portion 444A1 of the recessed frame member 444A of the holding frame 443. Subsequently, the supporting plate 444B of the holding frame 443 is attached from the liquid crystal panel insertion side of the recessed frame member 444A, thereby pressing and fixing liquid crystal panels 441R, 441G, and 441B so as to hold. Note that attaching of the supporting plate 444B to the recessed frame member 444A can be performed by engaging the hooks 444D of the supporting plate 444B with the hook engaging portions 444C of the recessed frame member 444A (light modulating device holding step).

(d) The pins 447A of the holding member 446 with adhesive agent coated thereupon are inserted into the holes 443D of the holding frame 443 storing the liquid crystal panels 441R, 441G, and 441B (holding frame mounting step).

(e) The end face of the holding member 446 opposite to the pins 447A is adhered to the side face of the bases 445 (the light flux incident end face side of the cross-dichroic prism 45) with adhesive agent (holding member mounting step). At this time, the holding member 446 is adhered to the side face of the bases by surface tension of the adhesive agent.

(f) In a state with the adhesive agent unhardened, the position of the liquid crystal panels 441R, 441G, and 441B is adjusted (position adjusting step).

(g) Following performing positional adjustment of the liquid crystal panels 441R, 441G, and 441B, the adhesive agent is hardened, and these panels are fixed (adhesive agent hardening step).

The optical device is manufactured by the above step procedures.

A thermal-curing adhesive agent having excellent thermal conductivity or a photo-curing adhesive agent is preferably used for the adhesive agent used in the above manufacturing steps. As for such an adhesive agent having excellent thermal conductivity, there are acrylic or epoxy adhesive agents containing metals such as silver palladium.

(6. Positional Adjustment Method for Liquid Crystal Panel)

Positional adjustment of the liquid crystal panels 441R, 441G, and 441B in the position adjusting step in (f) above is performed as follows.

First, with regard to the liquid crystal panel 441G which faces the projecting lens 46 (FIG. 7, etc.) directly, alignment adjustment is performed with the plane of contact between the side face of the bases 445 and the holding member 446 as a sliding face, and focus adjustment is performed by sliding the portion of contact of the holding frame 443 and the holding member 446, i.e., the holding frame 443 through the pins 447A. Here, with the optical axis direction of the projecting lens 46 as the Z direction, and the two axes orthogonal thereto as the X and Y axes, alignment adjustment means adjustment in the X-axial direction, Y-axial direction, and rotational direction within the X-Y plane (θ direction adjustment). Focus adjustment means adjustment in the Z-axial direction, the rotational direction centered on the X-axis (Xθ direction), and rotational direction centered on the Y-axis (Yθ direction adjustment).

Alignment adjustment can be made in a state where one of the base 445 and holding member 446 is fixed, by moving the other in the X-axial direction, Y-axial direction, and θ direction. Also, focus adjustment can be made in a state where one of the holding frame 443 and holding member 446 is fixed, by moving the other in the Z-axial direction, Xθ direction, and Yθ direction.

Following adjusting the liquid crystal panel 441G to a predetermined position, the adhesive agent is hardened with hot air, ultraviolet rays, and so forth.

Next, with reference to the liquid crystal panel 441G of which positional adjustment and fixation has been completed, positional adjustment and fixation is performed for the liquid crystal panels 441R and 441B, in the same manner as described above.

Now, the manufacturing of the optical device and the positional adjustment of the liquid crystal panel does not necessarily have to be performed in the above order. For example, in the event of using solder as an adhesive agent, an arrangement is sufficient where the parts are mounted without adhesive agent in the manufacturing steps (d) and (e), and following the positional adjustment in (f), the base 445, the holding member 446, and the holding frame 443 are fixed with solder. This is true for optical devices according to other embodiments, as well.

(7. Attachment Method for Optical Device)

Figure 10:
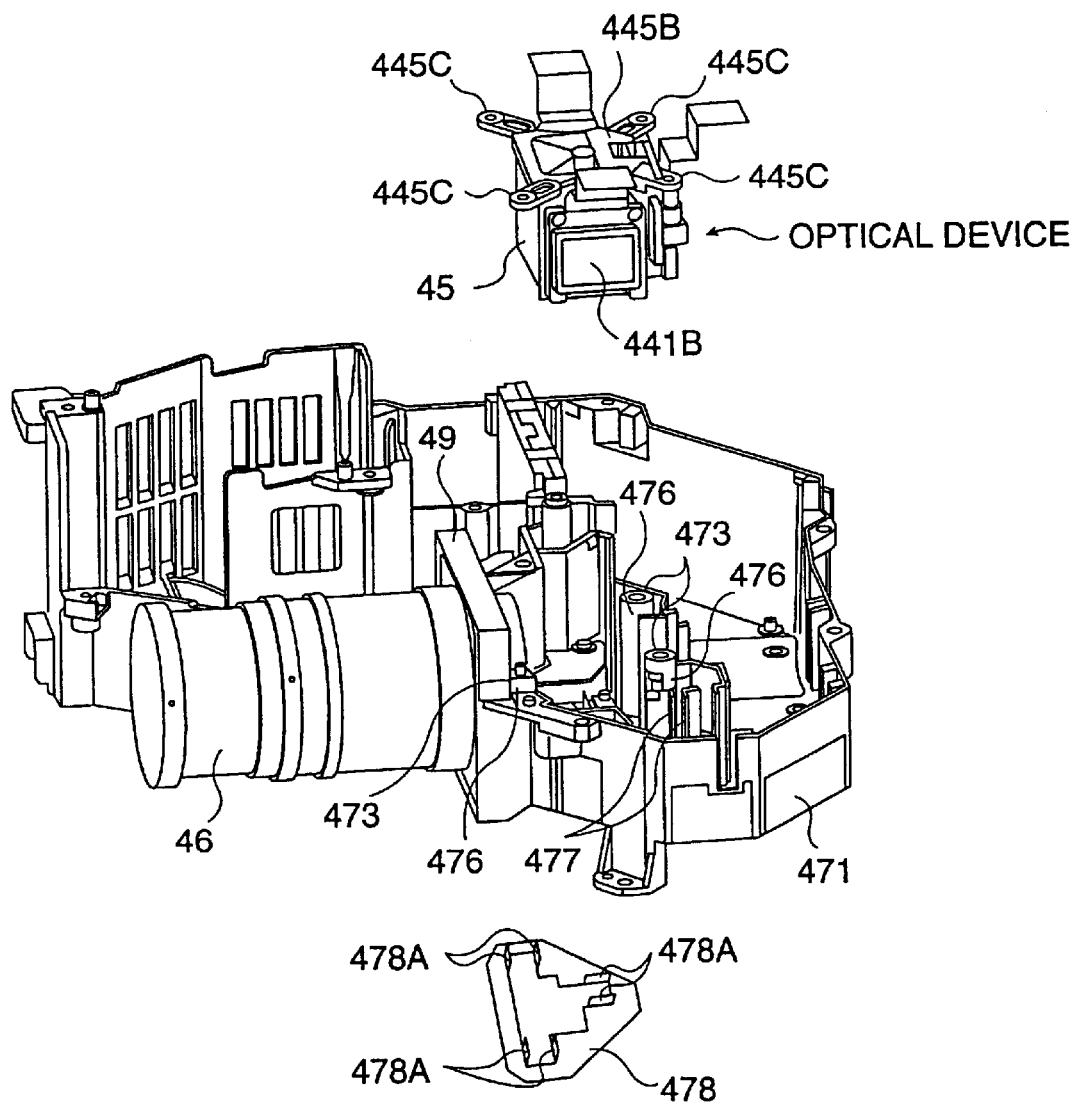
FIG. 10 is a perspective view illustrating the attachment position of the optical device according to an embodiment of the present invention.
Figure 11:
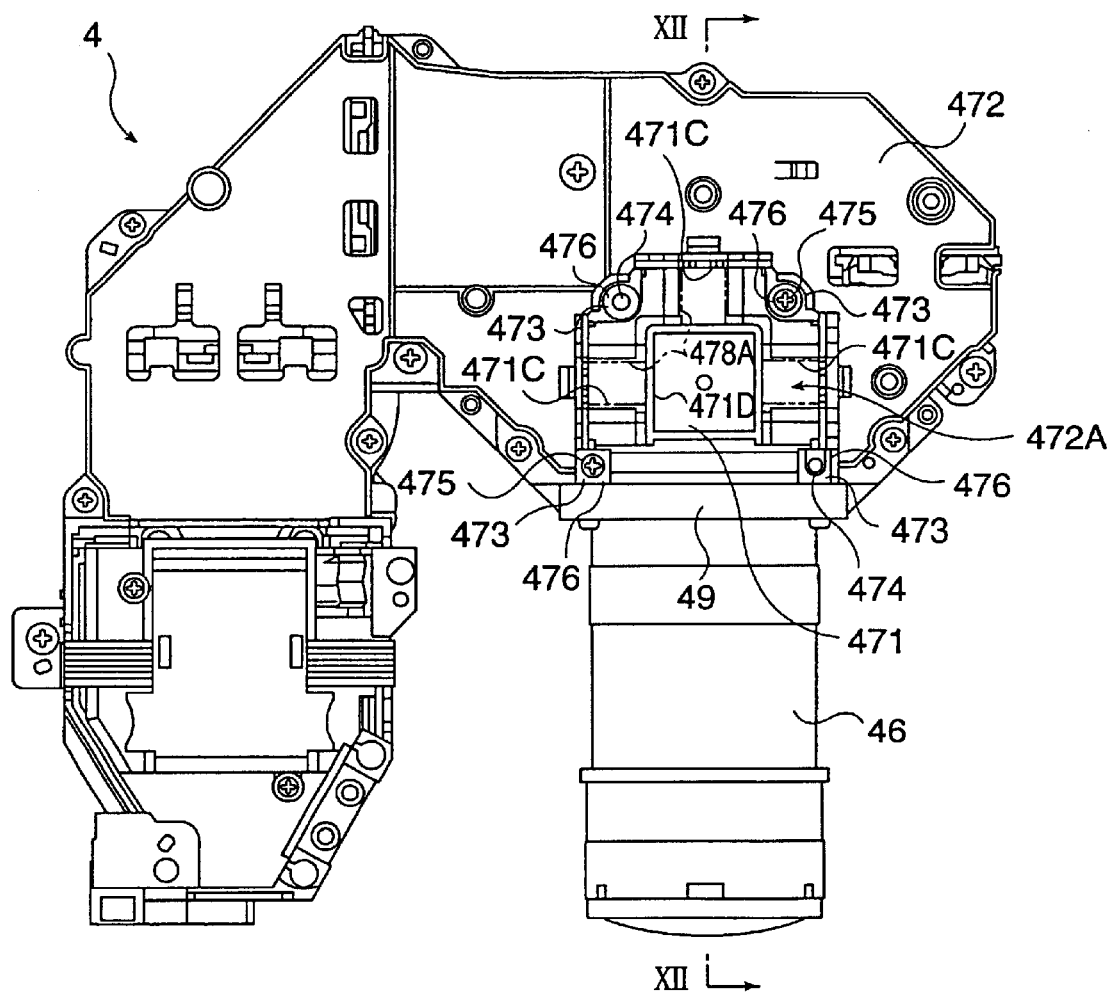
FIG. 11 is a plan view illustrating an optical unit according to an embodiment of the present invention.
Figure 14:
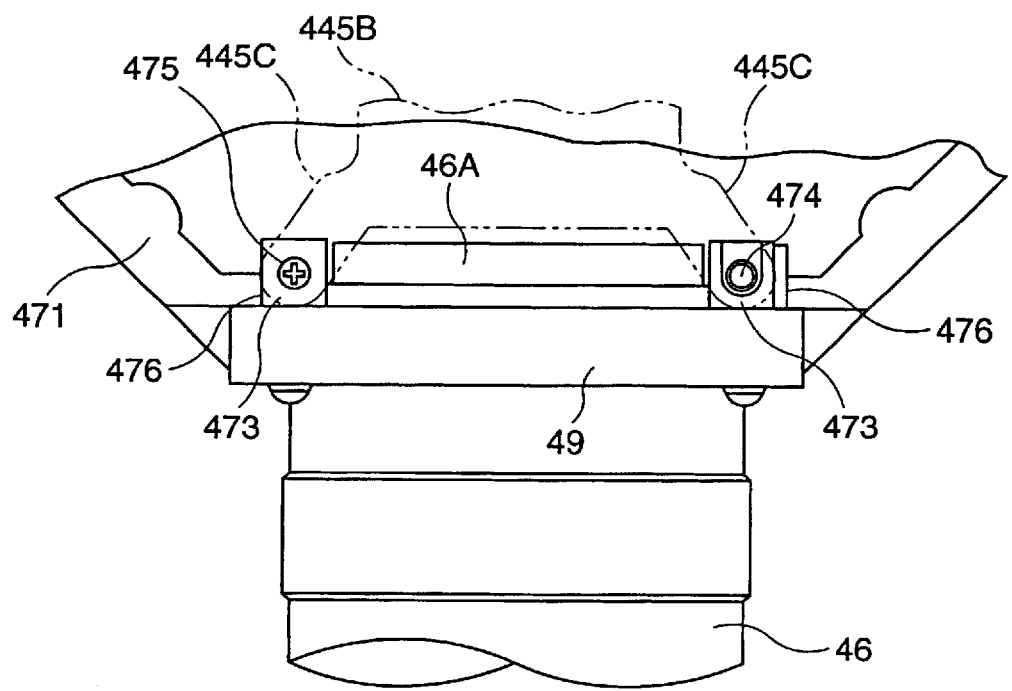
FIG. 14 is a plan view illustrating the principal portions of the optical unit according to an embodiment of the present invention in an enlarged manner.

The optical device configured of the liquid crystal panels 441R, 441G, and 441B and the cross-dichroic prism 45 integrated according to the above-described method is fixed to an attaching portion 473 of the lower housing 471 by an attaching portion 445B of the base 445 fixed to the upper face of the cross-dichroic prism 45 (a face orthogonal to the light flux incident face), as shown in FIG. 10, FIG. 11, and FIG. 14.

This attaching portion 445B has four arms 445C extending out in four directions in a plan view, as shown in FIG. 9. Also, as shown in FIG. 11 and FIG. 14, of the round holes 445D provided on each of the arms 445C, two round holes 445D on an approximately diagonal line are fit with positioning protrusions 474 provided on corresponding attaching portions 473, and the remaining two round holes 445D have screws 475 which are screwed to corresponding attaching portions 473 passed through. Also, as shown in FIG. 9, a suitable holding portion 445E is provided at the square portion at the center of the attaching portion 445B, to facilitate grasping by a worker at the time of mounting or detaching.

On the other hand, as shown in FIG. 10 and FIG. 14, the attaching portion 473 of the lower housing 471 is provided on the top of four cylindrical or square-column bosses 476 continued in an approximately vertical direction of the lower housing 471. Accordingly, in the state that the attaching portion 445B of the base 445 is attached to the attaching portion 473 of the lower housing 471, the liquid crystal panels 441R, 441G, and 441B and the cross-dichroic prism 45 are disposed in a state of being hung on the lower side of the attaching portion 445B, and are stored within the optical parts housing 47 in a state of being barely off of the bottom of the lower housing 471.

With such a lower housing 471, two bosses 476 at the projecting lens 46 side have an integrally-formed head portion 49 to fix the projecting lens 46. The bosses 476 have reinforcing functions so that the head portion 49 does not tilt even when the projecting lens 46 which is heavy is fixed to the head portion 49.

Multiple holding pieces 477 following the vertical direction (shown in FIG. 4 and FIG. 10 represented by some of the holding pieces 477) are provided on the two bosses 476 distanced from the projecting lens 46 side, with grooves to fit in a field lens 417, dichroic mirrors 421 and 422, an incident side lens 431, and relay lens 433, being formed between adjacent pairs of holding pieces 477. That is to say, these holding pieces 477 are also reinforced by the bosses 476 by being integrally formed by the bosses 476.

On the other hand, as shown in FIG. 11, a notch opening 472A is formed in the upper housing 472 at a portion corresponding to the liquid crystal panels 441R, 441G, and 441B (FIG. 8) and the cross-dichroic prism 45 (FIG. 8), and the attaching portion 473 of the lower housing 471 is also exposed from this notch opening 472A. That is to say, the liquid crystal panels 441R, 441G, and 441B and the cross-dichroic prism 45 shown in FIG. 8 and others can be mounted to or detached from the attaching portion 473 along with the attaching portion 445B of the base 445 even in the state of the upper housing 472 being attached to the lower housing 471, due to being fixed to the base 445 having the attaching portion 445B, beforehand.

Figure 12:
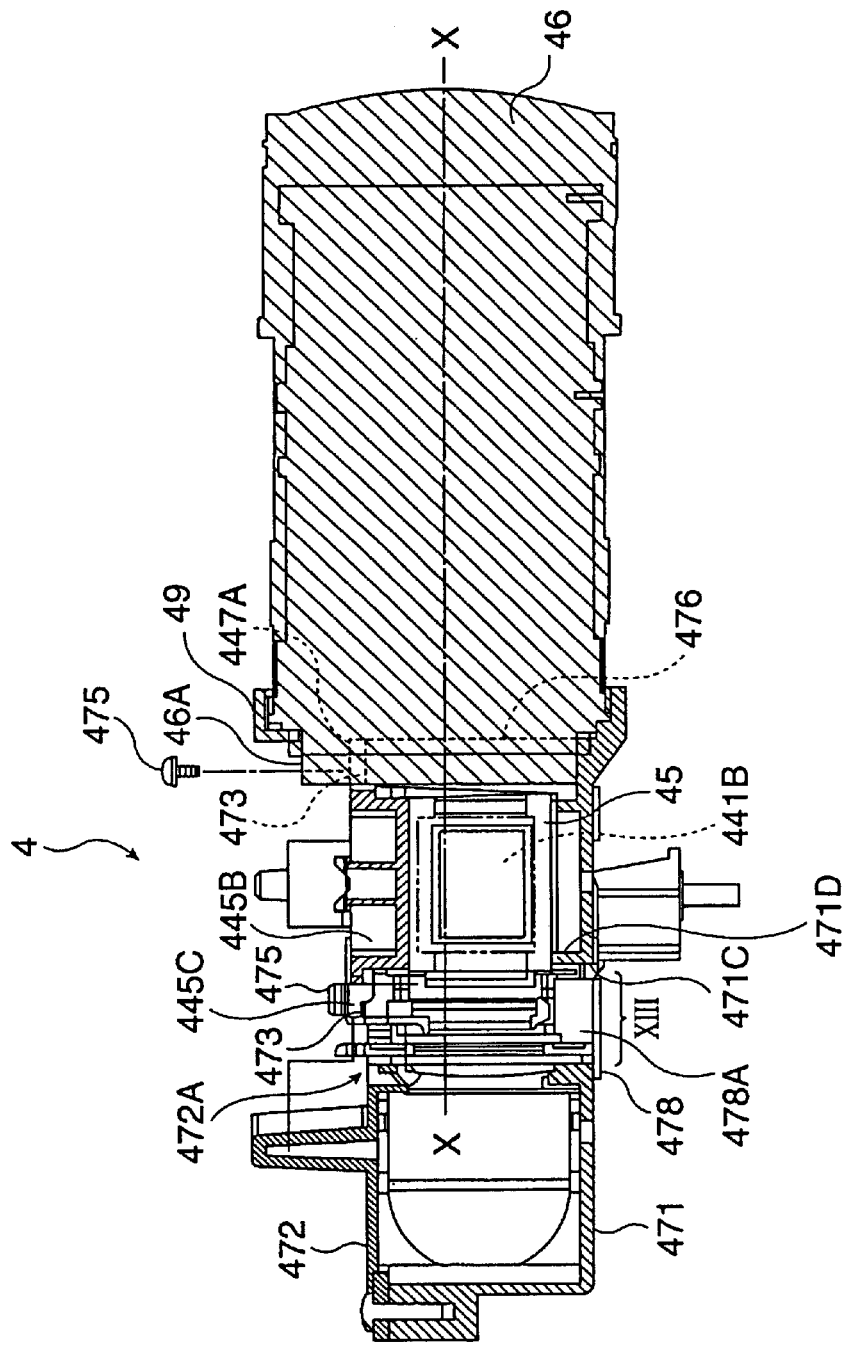
FIG. 12 is a cross-sectional view taken along plane XII—XII in FIG. 11.

Also, particularly, the attaching portion 473 provided to the bosses 476 integrally formed with the head portion 49 is positioned above the center axis X-X of the projecting lens 46 shown in FIG. 12. Accordingly, as shown in FIG. 14, two arms 445C of the attaching portion 445B overlap the perimeter of the end portion 46A of the projecting lens 46 protruding from the head portion 49 to the cross-dichroic prism 45 side in a plan view, but arrangement is made such that there is no actual mutual interference.

(8. Cooling Structure of Optical Device)

The following is a description of the cooling structure of the optical device fixed to the optical parts housing 47 by the above-described attaching method.

As shown in FIG. 6 and FIG. 10 through FIG. 13, air inlet openings 471C are provided in three positions on the bottom of the lower housing 471, corresponding to the liquid crystal panels 441R, 441G, and 441B, so that the liquid crystal panels 441R, 441G, and 441B and the polarizing plates 442 disposed at the light incident sides and emitting sides thereof are cooled with the cooling air of the panel cooling system A (FIG. 2 and FIG. 5) flowing into the optical parts housing 47 from the air inlet openings 471C. At this time, a recess 445A formed at a portion of the end face of the base 445 serves as a channel to cool air, so heat transmitted to the holding member 446 and base 445 can be efficiently cooled.

At this time, a flat and generally triangular plate-shaped flow straightening plate 478 is provided on the lower face of the lower housing 471, with pairs of erected pieces 478A (a total of six) provided on the flow straightening plate 478 protruding upwards from the air inlet openings 471C. In FIG. 11, the erected pieces 478A are drawn with chain double-dashed lines. The erected pieces 478A straighten the flow of the cooling air to cool the liquid crystal panels 441R, 441G, and 441B and the polarizing plates 442, from the bottom upwards.

Further, in FIG. 11 through FIG. 13, an erected portion 471D rising from the bottom of the lower housing 471 is positioned on a perimeter of one of the air inlet openings 471C which is on the side of the cross-dichroic prism 45 and is parallel to the light flux incident face thereof, where the top portion thereof is in close proximity to the bottom face of the base 445 fixed to the lower face of the cross-dichroic prism 45 so that cooling air flowing from the bottom side upwards does not readily leak from the gap between the bottom of the lower housing 471 and the cross-dichroic prism 45, and rather flows into the gap between the liquid crystal panels 441R, 441G, and 441B and the cross-dichroic prism 45.

(9. Advantages of the First Embodiment)

According to the present embodiment, there are the following advantages.

(1) The bases 445, holding member 446, and holding frame 443 are configured of an magnesium alloy which has high thermal conductivity, so the heat generated at the liquid crystal panels 441R, 441G, and 441B and the polarizing plates 442 due to the light irradiated from the light source lamp 411 and so forth can be speedily dissipated, by allowing it to escape in the order of the holding frame 443, holding member 446, and bases 445. Accordingly, heat can be efficiently discharged from the liquid crystal panels 441R, 441G, and 441B and the polarizing plates 442, so malfunctions due to high temperatures of the liquid crystal and deterioration of the polarizing plate 442 can be reduced or prevented. Also, the cooling capabilities of the liquid crystal panels 441R, 441G, and 441B can be greatly enhanced. Further, correspondingly, the amount of light of the light source lamp 411 can be increased, thereby enabling increasing the brightness of the image projected on the screen. Further, the size of the sirocco fans 51 and 52 used to cool the optical device can be reduced, as well.

(2) The bases 445, holding member 446, and holding frame 443 are configured of the same material, so the amount of dimensional change of the members due to heat (expansion and shrinking) is the same, and accordingly, reliability enhances markedly.

(3) the pins 447A provided to the holding member 446 and the holes 443D provided to the holding frame 443 are fixed by an adhesive agent having thermal conductivity, so the heat generated at the liquid crystal panels 441R, 441G, and 441B and the polarizing plates 442 can be efficiently allowed to escape. Such a structure contributes to enhance thermal dissipating capabilities.

(4) An engaging groove 446C is formed on the holding member 446, and a polarizing plate 442 where a polarizing film has been applied onto a sapphire substrate using a transparent adhesive agent is fixed so as to be engaged with this engaging groove 446C. Accordingly, the heat generated at the polarizing film is allowed to escape to the sapphire substrate which has high thermal conductivity, and further, the heat which has transmitted to the sapphire substrate can be allowed to escape to the holding member 446. Accordingly, rise in temperature and the difference in temperature distribution within the face of the polarizing plate 442 can be relieved, thereby reducing or preventing deterioration due to heat. Also, optical elements other than the polarizing plate 442, such as phase-difference plates, optically-compensating plates, and so forth may be engaged with the engaging groove 446C.

(5) The holding frame 443, the holding member 446, and the base 445, are fixed by an adhesive agent having thermal conductivity. This adhesive agent assists thermal conduction from the holding frame 443 to the holding member 446 and to the base 445. Such a structure contributes to enhanced thermal dissipating capabilities.

(6) Erected portions 471D erected from the bottom of the lower housing 471 are situated on an edge of the inlet openings 471C provided on the base of the lower housing 471, with the tops thereof being in close proximity with the lower face of the base 445 fixed to the lower face of the cross-dichroic prism 45, so the cooling air of the panel cooling system A flows into the gaps between the liquid crystal panels 441R, 441G, and 441B and the cross-dichroic prism 45 in a sure manner. Accordingly, the liquid crystal panels 441R, 441G, and 441B and the surroundings thereof can be efficiently cooled.

(7) Also, the erected pieces 478A of the flow straightening plate 478 protrude upwards from the air inlet openings 471C, so the cooling air can be guided from the lower side to the liquid crystal panels 441R, 441G, and 441B and the polarizing plates 442 positioned, above, in a sure manner, reducing or preventing leaking of the cooling air into the optical parts housing 47 and efficiently cooling liquid crystal panels 441R, 441G, and 441B and the surroundings thereof.

(8) Further, recesses 445A are formed on a portion of the end faces of the bases 445, so that gaps are formed between the holding member 446 the side faces of the bases 445. Also, recesses 446N are formed on the rectangular plate-shaped member 446A of the holding member 446, so a gap is formed between the holding frame 443 and the holding member 446. Accordingly, cooling air guided in upwards from below by the erected pieces 478A of the flow straightening plate 478 and the erected pieces 471D protruding upwards from the base of the lower housing 471 can be caused to flow in through the gaps, thereby enabling the liquid crystal panels 441R, 441G, and 441B and the polarizing plates 442 to be cooled more efficiently.

(9) The holding frame 443 is configured of a recessed frame member 444A and a supporting plate 444B, so the area of contact between the liquid crystal panels 441R, 441G, and 441B and the polarizing plate 442, and the holding frame 443, is great. Due to such a structure, the heat generated at the liquid crystal panels 441R, 441G, and 441B can be efficiently dissipated to the holding frame 443, so high thermal dissipating capabilities can be obtained.

Second Embodiment

The second embodiment according to the present invention will be described next.

In the following description, parts having the same structure as with the first embodiment are denoted with the same reference numerals, and detailed description thereof will be omitted or simplified.

Figure 15:
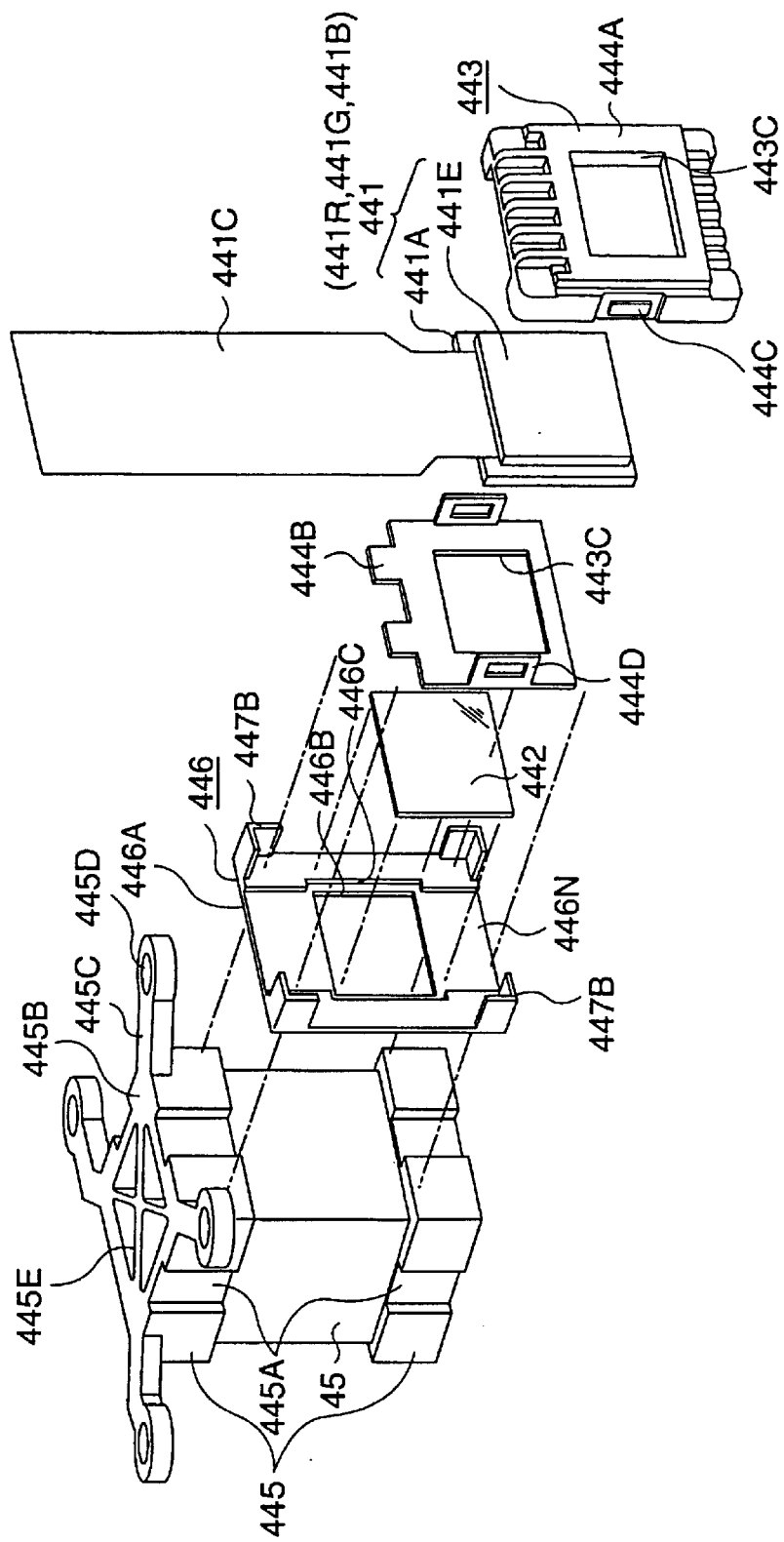
FIG. 15 is an exploded perspective view representing the structure of the optical unit according to a second embodiment.

With the optical device according to the first embodiment, the holding member 446 had a rectangular plate-shaped member 446A, and pins 447A erected from the four corners of this rectangular plate-shaped member 446A. Conversely, the optical device according to the second embodiment differs in the point that the holding member 446 has erected pieces 447B with a general L-shape when viewed from the front, as shown in FIG. 15. Other configurations and manufacturing methods are the same as with the first embodiment. Also, for the materials of the components, such as those described with the first embodiment can be used.

Specifically, the erected pieces 447B are positioned at the four corners of the rectangular plate-shaped member 446A and erected so as to extend following the edge of the rectangular plate-shaped member 446A, and are configured so as to hold the perimeter of the holding frame 443 storing the liquid crystal panels 441R, 441G, and 441B. The erected pieces 447B and the end faces of the holding frame 443 are adhered by an adhesive agent having thermal conductivity. Now, there is no need for the position of erected pieces 447B to be at the corners of the rectangular plate-shaped member 446A. Also, the number of erected pieces 447B is not restricted to four, rather, two or more is sufficient.

According to such a second embodiment, the advantages the same as (1) and (2), and (4) through (9), described in the description of the first embodiment can be obtained.

Also, the erected pieces 447B are formed on the corners of the rectangular plate-shaped member 446A, and erected so as to extend following the edges of the rectangular plate-shaped member 446A, and the erected pieces 447B and the holding frame 443 are fixed with an adhesive agent having thermal conductivity, so the heat generated at the liquid crystal panels 441R, 441G, and 441B and the polarizing plates 442 can be allowed to escape efficiently. Such a structure contributes to enhance thermal dissipating capabilities. Also, the erected pieces 447B are formed on the four corners of the rectangular plate-shaped member 446A, so the effects of external force applied to the liquid crystal panels 441R, 441G, and 441B and the polarizing plates 442 by heat can be alleviated, and accordingly, the liquid crystal panels 441R, 441G, and 441B and the polarizing plates 442 can be held in a stable manner.

Third Embodiment

The third embodiment according to the present invention will be described next.

In the following description, parts having the same structure as with the first embodiment are denoted with the same reference numerals, and detailed description thereof will be omitted or simplified.

Figure 16:
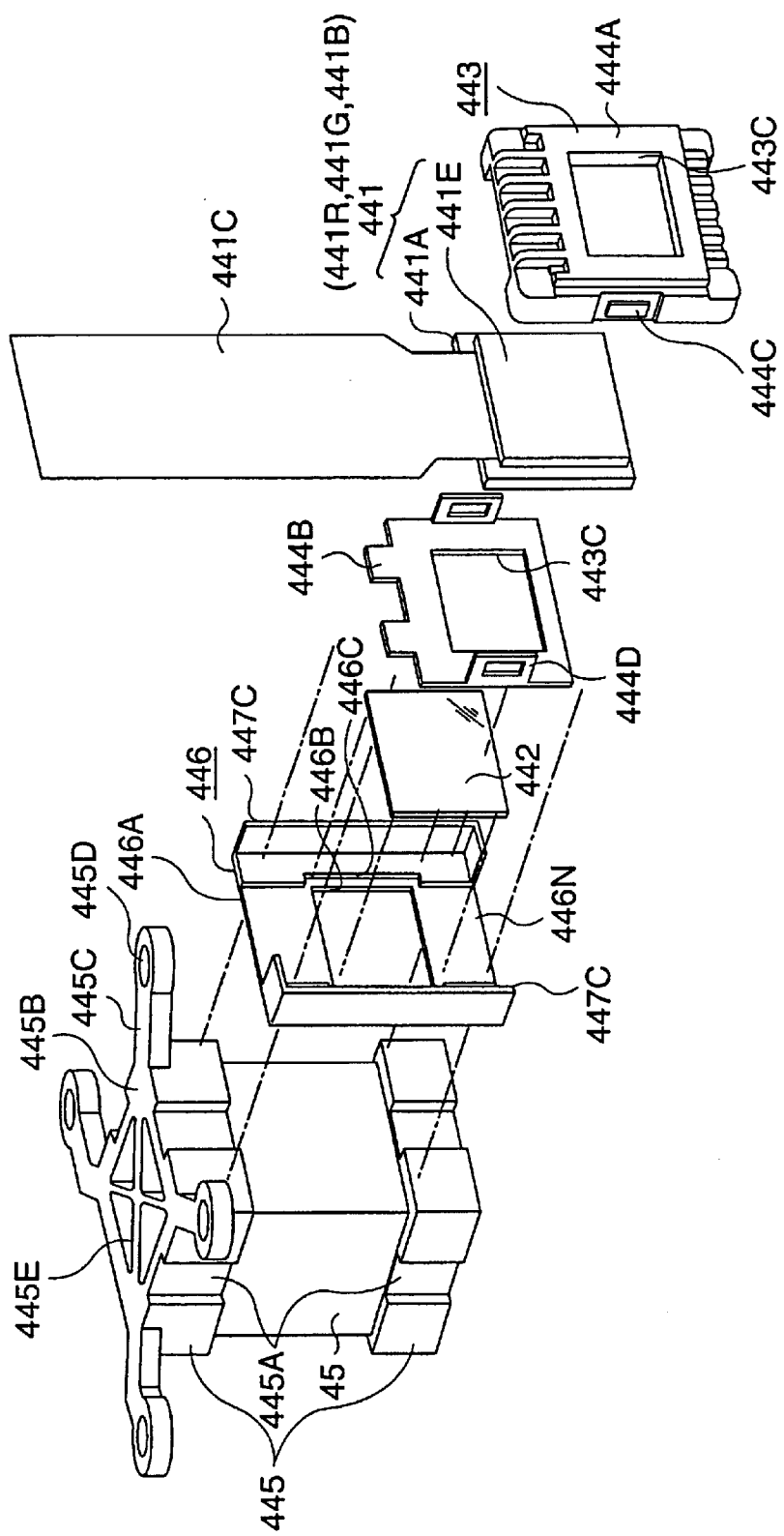
FIG. 16 is an exploded perspective view representing the structure of the optical unit according to a third embodiment.

With the optical device according to the first embodiment, the holding member 446 had the rectangular plate-shaped member 446A, and pins 447A erected from the four corners of this rectangular plate-shaped member 446A. Conversely, the optical device according to the third embodiment differs in the point that the holding member 446 has erected pieces 447C with a general L-shape when viewed from the front, as shown in FIG. 16. Other configurations and manufacturing methods are the same as with the first embodiment. Also, for the materials of the components, such as those described with the first embodiment can be used.

Specifically, the erected pieces 447C are positioned at the corners of the rectangular plate-shaped member 446A and erected so as to extend following the edge of the rectangular plate-shaped member 446A, and are configured so as to hold the perimeter of the holding frame 443 storing the liquid crystal panels 4441R, 441G, and 441B. Also, a pair of parallel sides of the erected pieces 447C have the same length as a pair of sides of the rectangular plate-shaped member 446A, where the parallel pair of sides of the erected pieces 447C have the same length as a pair of the sides of the rectangular plate-shaped member 446A. The erected pieces 447C and the end faces of the holding frame 443 are adhered by an adhesive agent having thermal conductivity.

According to such a third embodiment, the advantages the same as (1) and (2), and (4) through (9), described in the description of the first embodiment can be obtained.

Also, the erected pieces 447B are formed on the corners of the rectangular plate-shaped member 446A, and erected so as to extend following the edges of the rectangular plate-shaped member 446A, and the erected pieces 447B and the holding frame 443 are fixed with an adhesive agent having thermal conductivity, so the heat generated at the liquid crystal panels 441R, 441G, and 441B and the polarizing plates 442 can be allowed to escape efficiently. Such a structure contributes to improve thermal dissipating capabilities. Also, the erected pieces 447B are formed on a pair of mutually parallel sides of the rectangular plate-shaped member 446A, and have generally the same length as the sides of the rectangular plate-shaped member, so the portion of contact between the holding frame 443 and the holding member 446 can be increased even further, thus further enhancing heat dissipation capabilities.

Fourth Embodiment

The fourth embodiment according to the present invention will be described next.

In the following description, parts having the same structure as with the first embodiment are denoted with the same reference numerals, and detailed description thereof will be omitted or simplified.

With the first embodiment, bases 445 were fixed to both the top and bottom faces of the cross-dichroic prism 45 (both of a pair of end faces intersecting the light flux incident end face), with the holding member 446 being fixed by adhesion to the side faces of the bases 445. Further, a polarizing plate 442 was fixed to engaging grooves 446C of the holding member 446 by double-face tape or an adhesive agent.

Conversely, with the fourth embodiment, the holding member 446 is fixed by adhesion to the light flux incident end face of the cross-dichroic prism 45, and also, the base 445 is provided on only one of the pair of end faces intersecting with the light flux incident end face of the cross-dichroic prism 45. Further, the polarizing plate 442 is fixed to the light flux incident end face of the cross-dichroic prism 45 with double-face tape or an adhesive agent.

Figure 17:
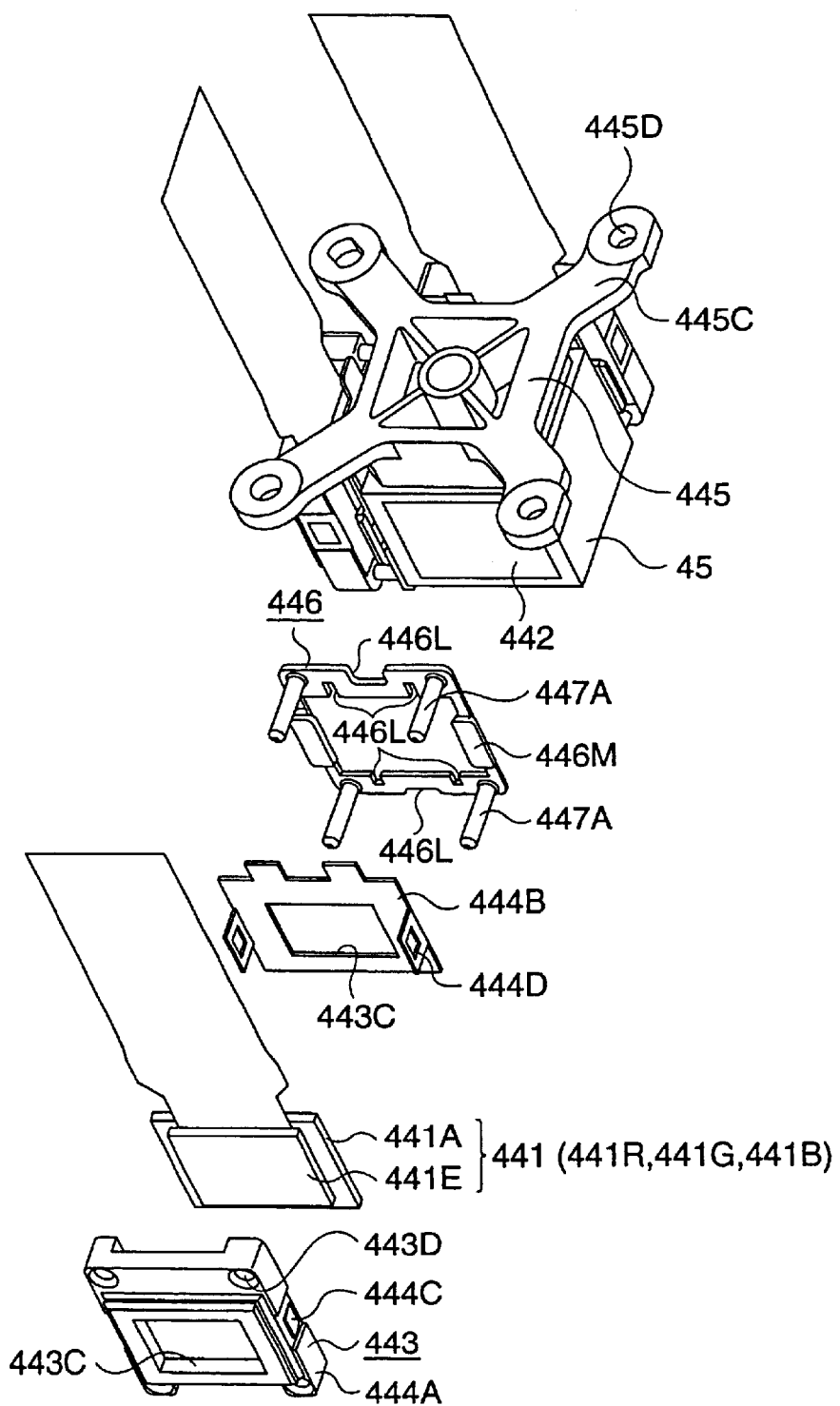
FIG. 17 is an exploded perspective view representing the structure of the optical unit according to a fourth embodiment.

Specifically, the holding member 446 has a rectangular plate-shaped member 446A, and pins 447A erected from the four corners of the rectangular plate-shaped member 446A, as shown in FIG. 17.

A rectangular opening 446B is formed in the rectangular plate-shaped member 446A at the image forming region of the liquid crystal panels 441R, 441G, and 441B, and notches 446L for hot behavioral difference absorption are formed on the upper and lower edges of the rectangular plate-shaped member 446A and upper and lower edges of the opening 446B. Further, supporting faces 446M are formed on the left and right edges so that an optically-compensating plate (not shown in the drawings), such as "Fuji WV Film Wide View A" (product name) sold by Fuji Photo Film Co., Ltd., can be attached. Installing such optically-compensating plates compensates for birefringence occurring at the liquid crystal panels 441R, 441G, and 441B, and minimizes retardation, whereby the viewing angle can be widened, and a high contrast ratio can be obtained.

Also, the polarizing plate 442 is fixed in generally the center of the light flux incident end face of the cross-dichroic prism 45.

Configurations other than those described above are the same as the first embodiment. Also, for the materials of the components, such as those described with the first embodiment can be used.

Next, a detailed description will be provided regarding the manufacturing method for the optical device according to the present embodiment, with reference to FIG. 17.

(a) First, the base 445 is fixed to the upper face of the cross-dichroic prism 45, using adhesive agent (base fixing step).

(b-1) Also, the polarizing plate 442 is fixed by double-face tape or adhesive agent at the general center of the light flux incident end face of the cross-dichroic prism 45 (polarizing plate fixing step).

(b-2) Further, an optically-compensating plate is held and fixed by double-face tape or adhesive agent so as to engage with the supporting faces 446M of the holding member 446.

(c) The liquid crystal panels 441R, 441G, and 441B are stored in the storing portion 44A1 of the recessed frame member 444A of the holding frame 443. Subsequently, the supporting plate 444B of the holding frame 443 is attached at the liquid crystal panel insertion side of the recessed frame member 444A, thereby pressing and fixing the liquid crystal panels 441R, 441G, and 441B so as to hold. Note that attaching of the supporting plate 444B to the recessed frame member 444A can be performed by engaging the hooks 444D of the supporting plate 444B with the hook engaging portions 444C of the recessed frame member 444A (light modulating device holding step).

(d) The pins 447A of the holding member 446 are inserted into the holes 443D of the holding frame 443 storing the liquid crystal panels 441R, 441G, and 441B (holding frame mounting step).

(e) The end face of the holding member 446 opposite to the pins 447A is coated with an ultraviolet curing adhesive agent, and adhered to the light flux incident end face of the cross-dichroic prism 45 with adhesive agent (holding member mounting step). At this time, the holding member 446 is adhered to the light flux incident end face of the cross-dichroic prism 45 by surface tension of the adhesive agent.

(f) In a state with the adhesive agent unhardened, the position of the liquid crystal panels 441R, 441G, and 441B is adjusted (position adjusting step).

(g) Following performing positional adjustment of the liquid crystal panels 441R, 441G, and 441B, the adhesive agent is hardened (adhesive agent hardening step).

Positional adjustment of the liquid crystal panels 441R, 441G, and 441B in the position adjusting step in (f) above is performed as follows.

First, with regard to the liquid crystal panel 441G which faces the projecting lens 46 directly, alignment adjustment (X-axial direction, Y-axial direction, θ direction adjustment) is performed with the plane of contact between the light flux incident end face of the cross-dichroic prism 45 and the holding member 446 as a sliding face, and focus adjustment (X-axial direction, Xθ direction, Yθ direction adjustment) is performed by sliding the plane of contact of the holding frame 443 and the holding member 446, i.e., sliding through the pins 447A. That is to say, alignment adjustment can be made in a state where one of the cross-dichroic prism 45 and holding member 446 is fixed, by moving the other in the X-axial direction, Y-axial direction, and θ direction. Also, focus adjustment can be made in a state where one of the holding frame 443 and holding member 446 is fixed, by moving the other in the Z-axial direction, Xθ direction, and Yθ direction.

Following adjusting the liquid crystal panel 441G to a predetermined position, the adhesive agent is hardened with hot air, a hot beam, ultraviolet rays, and so forth.

Next, with reference to the liquid crystal panel 441G regarding which the above positional adjustment and subsequent fixation has been performed, positional adjustment and fixation is performed for the liquid crystal panels 441R and 441B, in the same manner as described above.

According to such a fourth embodiment, the following advantages can be provided.

(10) The base 445, holding member 446, and holding frame 443 are configured of an magnesium alloy with high thermal conductivity so the heat generated at the liquid crystal panels 441R, 441G, and 441B, optically-compensating plate, and the polarizing plates 442, due to the light irradiated from the light source lamp 411, and so forth, can be speedily dissipated, by allowing it to escape to in the order of the holding frame 443, holding member 446, prism 45, and base 445. Accordingly, heat can be efficiently discharged from the liquid crystal panels 441R, 441G, and 441B, the optically-compensating plate, and the polarizing plates 442, so malfunctions and deterioration of the optically-compensating plate due to high temperatures of the liquid crystal can be prevented. Also, the cooling capabilities of the liquid crystal panels 441R, 441G, and 441B can be greatly enhanced. Further, correspondingly, the amount of light of the light source lamp 411 can be increased, thereby enabling increasing the brightness of the image projected on the screen. Moreover, the size of the sirocco fans 51 and 52 used for cooling the optical device can be reduced, as well.

(11) The base 445, holding member 446, and holding frame 443 are configured of the same material, so the amount of dimensional change of the members due to heat (expansion and shrinking) is the same, and accordingly, functional reliability enhances markedly.

(12) The pins 447 A provided to the holding member 446 and the holes 443D provided to the holding frame 443 are fixed by an adhesive agent having thermal conductivity, so the heat generated at the liquid crystal panels 441R, 441G, and 441B can be efficiently allowed to escape. Such a structure contributes to enhance thermal dissipating capabilities.

(13) The holding frame 443, the holding member 446, the prism 45, and the base 445, are fixed by an adhesive agent having thermal conductivity. This adhesive agent assist thermal conduction from the holding frame 443 to the holding member 446, to the prism 45, and to the base 445. Such a structure contributes to enhanced thermal dissipation capabilities.

(14) Supporting faces 446M formed on the left and right edges of the holding member 446 are formed so as to protrude in a direction distanced from the prism 45, not in a direction to the portion of the rectangular plate-shaped member 446A adhered to the prism 45, i.e., in the out-of-plane direction, and accordingly, a gap is formed between the prism 45 and the optical element fixed to the supporting faces 446M, and between the optical element and the holding frame 443. Accordingly, cooling air guided upwards from below by the erected portions 471D erected from the bottom of the lower housing 471 and the erected pieces 478A of the flow-straightening plate 478 can be caused to flow into these gaps, and the liquid crystal panels 441R, 441G, and 441B and the optical elements can be cooled more efficiently 443.

Also, with the present embodiment, advantages the same as (6), (7), and (9) described in the description of the first embodiment can also be obtained.

Now, the four right-angle prisms making up the cross-dichroic prism 45 are generally formed of optical glass, but forming the right-angle prisms of a material having higher thermal conductivity than optical glass, such as sapphire or crystal, etc., or configuring the cross-dichroic prism 45 of cross-mirrors placed in a box-shaped container filled with a fluid which has higher thermal conductivity than optical glass, makes transfer of heat from the holding frame 443 to the holding member 446, to the prism 45, and to the base 445 smoother, thereby enhancing thermal dissipation capabilities. This is the same for other embodiments wherein the holding member 446 is fixed to the light flux incident end face of the cross-dichroic prism 45.

Also, with the present embodiment, an optically-compensating plate is fixed to the supporting faces 446M of the supporting member 446, and the polarizing plate 442 is fixed to the light flux incident end face of the cross-dichroic prism 45, but a polarizing plate 442 may be fixed to the supporting faces 446M instead of the optically-compensating plate. The optical elements to be fixed by the supporting faces 446M are not restricted to optically-compensating plates and polarizing plates, and may be phase difference plates (¼ wavelength plate, ½ wavelength plate, etc.), condenser lenses, etc.

Instead of the holding member 446 according to the present embodiment, a holding member 446, such as in the first through third embodiments (see FIGS. 9, 15, and 16), may be used to fix the polarizing palate 442 or the like to engaging grooves 446C (see FIGS. 9, 15, and 16) on the holding member 446. In this case, the advantages obtained based on the holding member 446 of the first through third embodiments can be obtained instead of the advantages obtained based on the holding member 446 according to the present embodiment. Conversely, an arrangement may be made where, instead of the holding member 446 of the first through third embodiments, the holding member 446 according to the present embodiment is used to fix the optically-compensating plate or the like by the supporting faces 446M. In this case, the advantages obtained based on the holding member 446 used in these optical devices in the first through third embodiments can be obtained therein.

Fifth Embodiment

The fifth embodiment according to the present invention will be described next.

In the following description, parts having the same structure as with the fourth embodiment are denoted with the same reference numerals, and detailed description thereof will be omitted or simplified.

With the optical device according to the fourth embodiment, the polarizing plate 442 is fixed to the light flux incident end face of the cross-dichroic prism 45 directly with both-face tape or adhesive agent, and supporting faces 446M are formed on the left and right edges of the rectangular plate-shaped member 446A of the holding member 446 so that an optically-compensating plate can be attached.

Conversely, the fifth embodiment differs from the fourth embodiment in that two sets of supporting faces 446M and 446M1 are provided on the holding member 446, and that the polarizing plate 442 and the optically-compensating plate are fixed to the supporting faces 446M and 446M1. Other configurations and manufacturing methods are the same as with the fourth embodiment. Also, for the materials of the components, such as those described with the first embodiment can be used.

Figure 18:
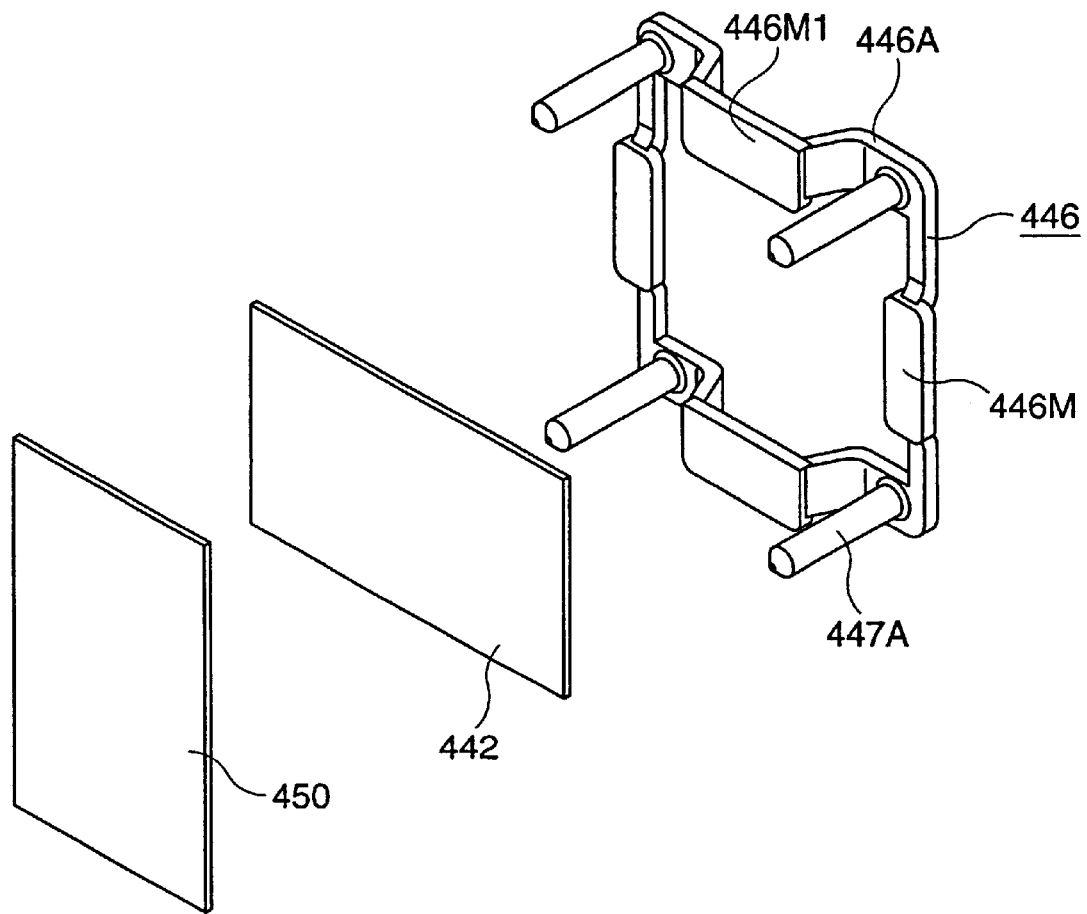
FIG. 18 is an exploded perspective view illustrating the principal components of a fifth embodiment.

Specifically, as shown in FIG. 18, a first supporting face 446M and a second supporting face 446M1 are each formed on the left and right edges and the top and bottom edges of the rectangular plate-shaped member 446A of the holding member 446, respectively. The first supporting face 446M and second supporting face 446M1 are formed so that the height-wise dimensions from the rectangular plate-shaped member 446A (out-of-plane directional positions) are different.

Here, the polarizing plate 442 is fixed to the first supporting face 446M with double-face tape or an adhesive agent, and the optically-compensating plate 450 is similarly fixed to the second supporting face 446M1 with double-face tape or adhesive agent. The height-wise dimensions of the supporting face 446M and supporting face 446M1 differ one from another, so the polarizing plate 442 and the optically-compensating plate 450 are fixed without interference therebetween.

According to such a fifth embodiment, there are the following advantages besides the advantages the same as with the fourth embodiment.

The polarizing plate 442 and optically-compensating plate 450 are fixed to the holding member 446, so the heat generated at the polarizing plate 442 and optically-compensating plate 450 can be discharged to the holding member 446, thereby enhancing the cooling capabilities of the polarizing plate 442 and optically-compensating plate 450, and preventing deterioration.

Also, the holding member 446 has two types of supporting faces 446M and 446M1 with different out-of-plane directional positions, so the polarizing plate 442 and optically-compensating plate 450 can be supported at different positions by the holding member 446. Accordingly, gaps are formed between the prism 45, polarizing plate 442, optically-compensating plate 450, and holding frame 443. Accordingly, cooling air guided upwards from below by the erected portions 471D erected from the bottom of the lower housing 471 and the erected pieces 478A of the flow-straightening plate 478 can be caused to flow into these gaps, and the liquid crystal panels 441R, 441G, and 441B and the optical elements thereof can be cooled more efficiently.

Also, the optical elements to be fixed by the supporting faces 446M and 446M1 are not restricted to optically-compensating plates and polarizing plates, and may be phase difference plates (¼ wavelength plate, ½ wavelength plate, etc.), condenser lenses, etc.

Also, instead of the holding member 446 according to the first through third embodiments, a holding member 446 according to the present embodiment may be used to fix the optically-compensating plate or the like to the supporting faces 446M and 446M1. In this case, the advantages obtained based on the holding member 446 of these optical devices can be obtained in the first through third embodiments.

Sixth Embodiment

The sixth embodiment according to the present invention will be described next.

In the following description, parts having the same structure as with the first embodiment are denoted with the same reference numerals, and detailed description thereof will be omitted or simplified.

With the optical device according to the first embodiment, bases 445 were fixed to both the top and bottom faces of the cross-dichroic prism 45 (both of a pair of end faces intersecting the light flux incident end face), with the holding member 446 being fixed by adhesion to the side faces of the bases 445.

Also, the cross-dichroic prism 45 was disposed in a state of being hung from the lower housing 471 by the base 445 fixed on the upper face thereof.

Also, with regard to the holding member 446 and holding frame 443, the holding member 446 and holding frame 443 were mutually fixed by adhesion through pins 447A provided on the holding member 446 and holes 443D provided on the holding frame 443.

Further, the polarizing plate 442 was fixed to the engaging grooves 446C of the holding member 446 by double-face tape or adhesive agent.

Conversely, with the sixth embodiment, the base 445 is fixed only on the lower face of the cross-dichroic prism 45, and the cross-dichroic prism 45 is fixed to the lower housing 471 by the base 445 fixed to the lower face thereof.

Also, the holding member 446 is directly fixed by adhesion to the light flux incident end face of the cross-dichroic prism 45, and the holding frame 443 is fixed by adhesion to the holding member 446 with wedge-shaped spacers 448A introduced therebetween.

Further, the polarizing plate 442 is fixed to the light flux incident end face of the cross-dichroic prism 45 by double-face tape or adhesive agent.

Other configurations are the same as with the first embodiment.

Figure 19:
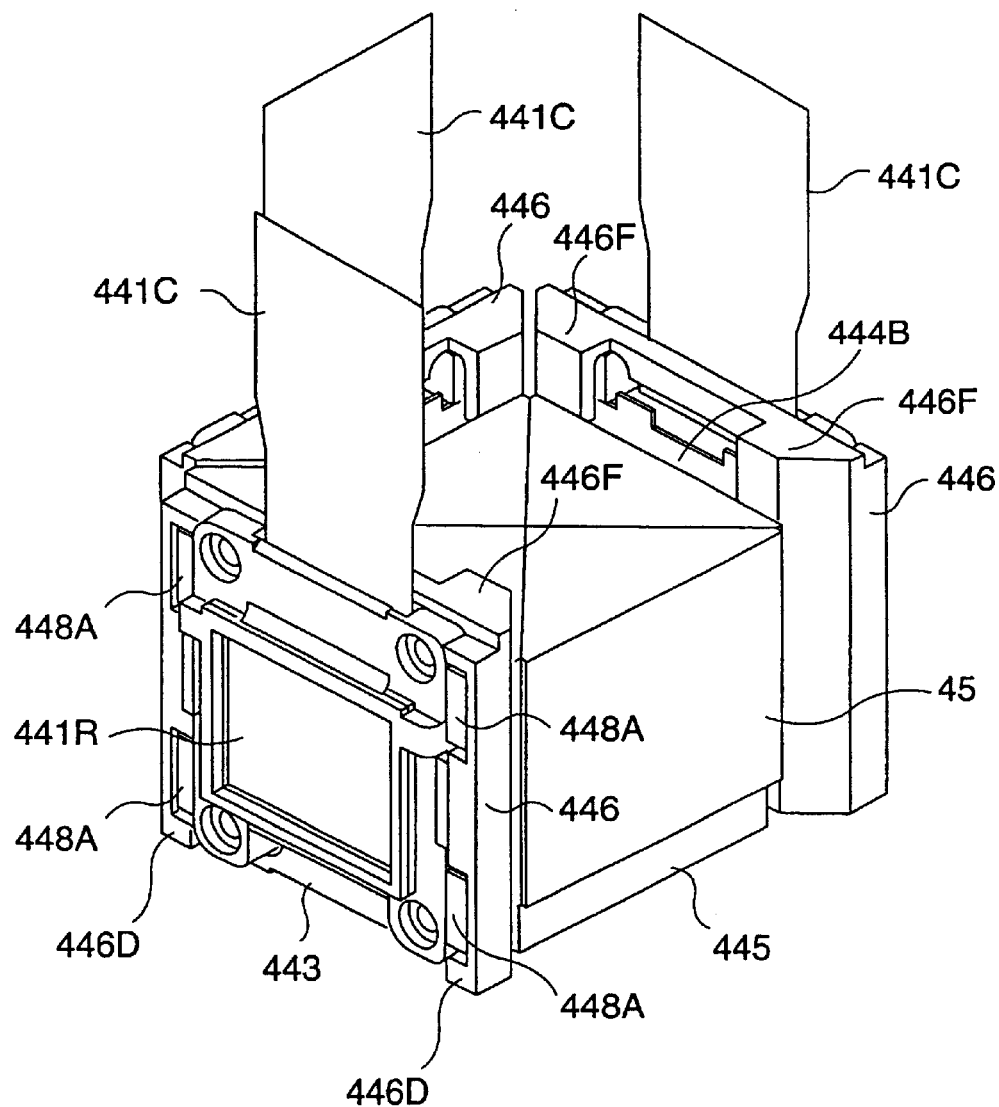
FIG. 19 is a perspective view representing the structure of the optical unit according to a sixth embodiment.
Figure 20:
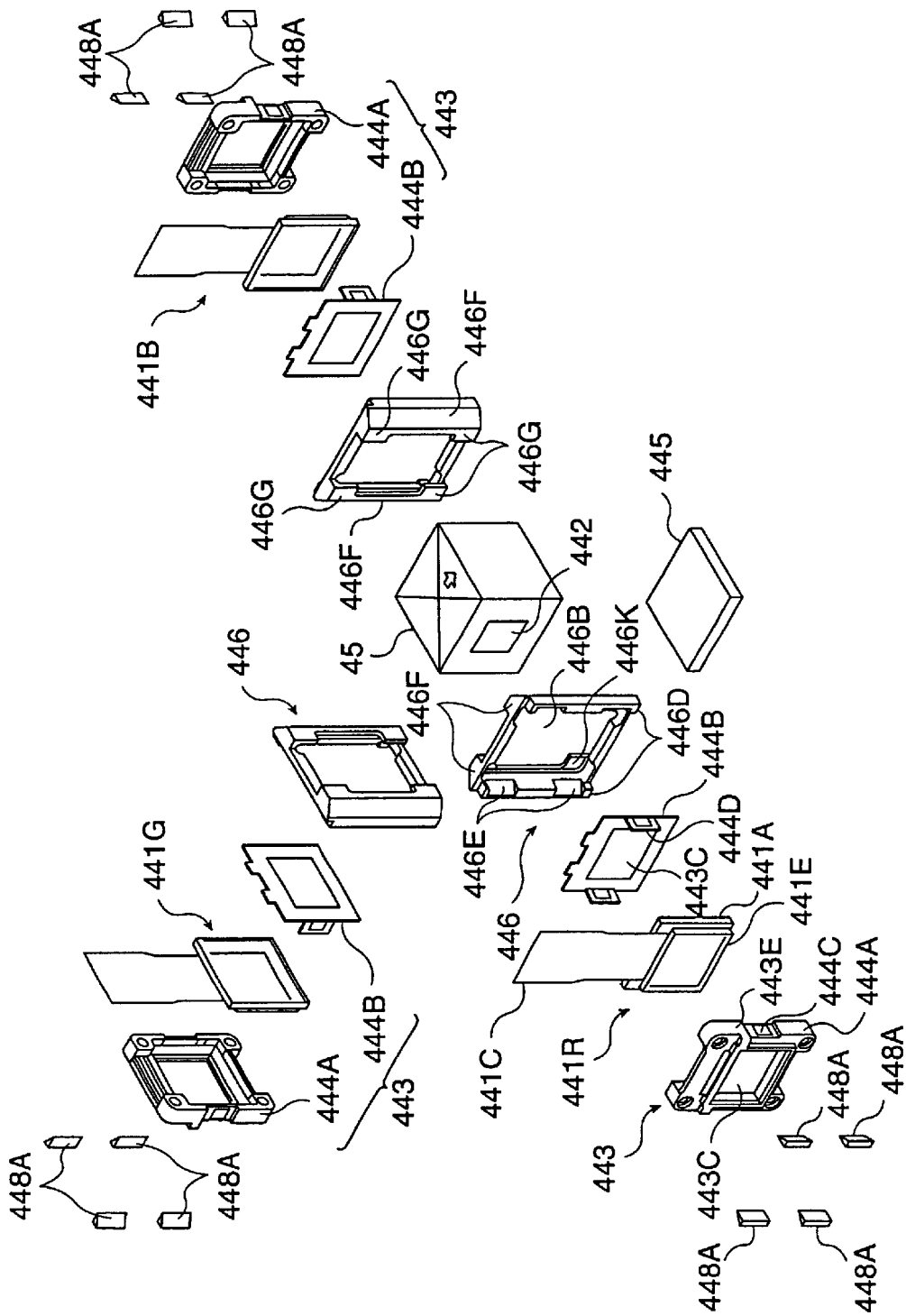
FIG. 20 is an exploded view of FIG. 19.

Specifically, FIG. 19 is a perspective view of the state of attachment of the liquid crystal panels 441R, 441G, and 441B and cross-dichroic prism 45 according to the sixth embodiment, and FIG. 20 is an exploded perspective view thereof. Here, the liquid crystal panels 441R, 441G, and 441B are attached to a cross-dichroic prism 45 formed of crystal, mounted and fixed to the base 445, using the holding frame 443, holding member 446, and wedge-shaped spacers 448A.

The holding frame 443 differs, somewhat with regard to the external view shown in the figure, from the holding frame 443 (FIG. 9, etc.) according to the first embodiment, but the basic structure is the same as that described with the first embodiment, including the point that a light shielding film is provided on the light flux emitting side end face of the supporting plate 443B.

The holding member 446 is to hold the holding frame 443 where the liquid crystal panels 441R, 441G, and 441B are stored. The holding member 446 is fixed to the light flux incident end face of the cross-dichroic prism 45. Also, the holding member has an opening 446B at approximately the center thereof. This opening 446B corresponds to the image forming region of the liquid crystal panels 441R, 441G, and 441B when the liquid crystal panels 441R, 441G, and 441B are mounted. A light shielding film (not shown in the drawings) is provided at the light flux emitting side end face of the holding member 446, as with the holding frame 443.

Erected pieces 446D formed so as to cover the side edges of the holding frame 443, and a supporting piece 446K for supporting the light emitting side face of the holding frame, are formed on the light incident side of the holding member 446. Also, protrusions 446F are formed on both left and right sides of the light emitting side. These protrusions 446F form a partial gap between the cross-dichroic prism 45 and the holding member 446. This gap forms an air path to cool the liquid crystal panels 441R, 441G, and 441B and the optical elements, such as the polarizing plate and the like disposed in the vicinity thereof. Contact faces 446G with the cross-dichroic prism 45 are provided on the upper and lower end faces of the protrusions 446F. The height of protrusion of the erected pieces 446D is approximately equal to the thickness of the holding frame 443, and the length of the erected pieces 446D in the height direction is approximately equal to the height of the holding frame 443. Also, the inner spacing of the erected pieces 446D is somewhat wider than the width of the holding frame 443. Also, a focus adjustment clearance is provided between the light emitting side face of the holding frame 443 and the light incident side face of the holding member 446, and an alignment adjustment clearance for pixel matching is provided between the width of the holding frame 443 and the inner spacing of the erected pieces 446D of the holding member 446. Further, inclined faces 446E are formed on the inner side of the erected pieces 446D of the holding member 446, so that wedge-shaped spacers 448A for fixing the holding frame 443 and the holding member 446 can be inserted between this inclined face 446E and the holding frame 443. The inclined faces 446E are formed horizontally symmetrical on the upper and lower ends of the left and right erected pieces 446D.

The wedge-shaped spacers 448A are used to position the liquid crystal panels 441R, 441G, and 441B and to fix the holding frame 443 and holding member 446. Here, four wedge-shaped spacers 448A are used. As with the base 445, holding member 446, and holding frame 443, thermal-conductive metal or thermal-conductive resin (preferably with thermal conductivity of 3 W/(m·K) or higher) is used to configure the wedge-shaped spacers 448A. Examples of such metals and resins have already been described in the description portion of the first embodiment. Also, the wedge-shaped spacers 448A are used to adhere the holding frame 443 and holding member 446, and taking into consideration the dimensional change due to heat, a material with a thermal expansion coefficient close to that of the holding frame 443 or holding member 446, or a material with a thermal expansion coefficient between that of the holding frame 443 and holding member 446, is preferably used. Particularly, forming the holding frame 443, the holding member 446, and the spacers 448A, of the same material, is preferable. Also, it is preferable that the thermal expansion coefficient of the material making up the components 443, 446, and 448A, is as close as possible to that of the glass making up the cross-dichroic prism 45.

The base 445 is to mount and fix the cross-dichroic prism 45 in the center thereof. The base 445 is fixed to the lower housing 471 (FIG. 6) by screws or the like.

Next, a manufacturing method of the optical device according to the present embodiment will be described.

(a) First, the polarizing plate 442 is fixed to the cross-dichroic prism 45 (polarizing plate fixing step).

(b) The cross-dichroic prism 45 with the polarizing plate 442 fixed thereto is fixed on the center of the base 445 (base fixing step).

(c) Also, the liquid crystal panel 441R is stored in the recessed frame member 444A of the holding frame 443. Subsequently, the supporting plate 444B of the holding frame 443 is attached from the liquid crystal panel insertion side of the recessed frame member 444A, thereby storing the liquid crystal panels 441R, 441G, and 441B. Attaching the supporting plate 444B to the recessed frame member 444A can be performed by engaging the hooks 444D of the supporting plate 444B with the hook engaging portions 444C of the recessed frame member 444A (light modulating device holding step).

(d) Next, the holding frame 443 storing the liquid crystal panels 441R, 441G, and 441B is stored between the left and right erected pieces 446D of the holding member 446, and brought into contact with the supporting piece 446K (holding frame mounting step).

(e-1) The contact faces 446G of the holding member 446 are adhered to the light flux incident end face of the cross-dichroic prism 45 with an adhesive agent (holding member mounting step). At this time, the holding member 446 is adhered to the light flux incident end face of the cross-dichroic prism 45 by surface tension of the adhesive agent.

(e-2) Wedge-shaped spacers 448A with adhesive agent coated thereupon are inserted between the inclined faces 446E formed on the inner side face of the erected pieces 446D and the perimeter 443E of the holding frame 443 (spacer mounting step). At this time, the spacers 448A are adhered to the inclined faces 446E and the perimeter face 443E of the holding frame 443, due to the surface tension of the adhesive agent.

(f) Further, in a state with the adhesive agent at the contact face of the holding member 446 and the cross-dichroic prism 45 and the adhesive agent coated on the wedge-shaped spacers 448A unhardened, the position of the liquid crystal panels 441R, 441G, and 441B is adjusted (position adjusting step).

(g) Following performing positional adjustment of the liquid crystal panels 441R, 441G, and 441B, the adhesive agent is hardened (adhesive agent hardening step).

Positional adjustment of the liquid crystal panels 441R, 441G, and 441B as to the cross-dichroic prism 45 in the position adjusting step in (f) above is performed as follows.

Figure 21:
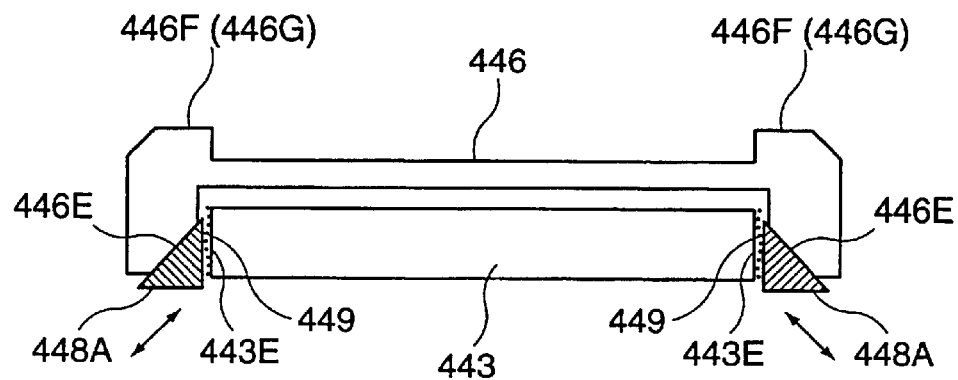
FIG. 21 is a schematic illustrating the placement and operations of wedge-shaped spacers in the sixth embodiment.

First, with regard to the liquid crystal panel 441G which faces the projecting lens 46 (FIG. 7, etc.) directly, alignment adjustment (X-axial direction, Y-axial direction, θ direction adjustment) is performed with the plane of contact between the light flux incident end face of the cross-dichroic prism 45 and the holding member 446 as a sliding face, and focus adjustment (Z-axial direction, Xθ direction, Yθ direction adjustment) is performed by sliding the face of contact of the holding frame 443 and the holding member 446. That is to say, alignment adjustment can be made in a state wherein one of the cross-dichroic prism 45 and holding member 446 is fixed, by moving the other in the X-axial direction, Y-axial direction, and θ direction. Also, focus adjustment can be made in a state wherein one of the holding frame 443 and holding member 446 is fixed, by moving the other in the Z-axial direction, Xθ direction, and Yθ direction. At this time, the wedge-shaped spacers 448A slide in the direction shown by the arrow in FIG. 21 in accordance with the movement of the holding frame 443 or the holding member 446. Following adjusting the liquid crystal panel 441G to a predetermined position, the adhesive agent is hardened with hot air, a hot beam, ultraviolet rays, or the like.

Next, positional adjustment and fixing of the liquid crystal panels 441R and 441B are performed with the liquid crystal panel 441G regarding which positional adjustment and fixing has been completed, as a reference.

In the above manufacturing steps, an adhesive agent having excellent thermal conduction is used for the adhesive agent, as described with the first embodiment.

Attaching the liquid crystal panels 441R, 441G, and 441B to the cross-dichroic prism 45 does not necessarily have to be performed in the above order. For example, in the event of using solder as an adhesive agent, an arrangement is sufficient wherein the parts are mounted without adhesive agent in the manufacturing steps (d), (e-1), and (e-2), and following the positional adjustment in (f), the cross-dichroic prism 45, holding member 446, spacers 448A, and holding frame 443 are fixed with solder. Also, in the above manufacturing step (e-2), wedge-shaped spacers 448A with adhesive agent coated thereupon were inserted between the inclined faces 446E formed on the inner side of the erected pieces 446D and the perimeter 443E of the holding frame 443, but an arrangement may be made where a thermal-conductive adhesive agent is filled in the gap between the perimeter of the holding frame 443 and the erected pieces 446D beforehand, to which the wedge-shaped spacers 448A are inserted. This is true for optical devices according to other embodiments which are manufactured with the same method as the present embodiment.

The liquid crystal panels 441R, 441G, and 441B and cross-dichroic prism 45 thus integrated are fixed to the lower housing 471 (FIG. 6) by screws or the like, using the base 445 on the bottom.

According to such a sixth embodiment, advantages the same as (10), (11), and (13) described in the description of the fourth embodiment can be obtained.

Also, the holding member 446 has protrusions 446F at the face of contact with the cross-dichroic prism 45, and these protrusions and the cross-dichroic prism 45 form a partial gap therebetween. This gap forms an air path for cooling the liquid crystal panels 441R, 441G, and 441B and the optical elements such as the polarizing plate and the like disposed in the vicinity thereof, which can reduce or prevent deterioration of the liquid crystal panels 441R, 441G, and 441B and the optical elements disposed in the vicinity thereof due to heat, thereby contributing to improved image quality.

Also, filling the gap between the perimeter of the holding frame 443 and the erected piece 446D widens the area of contact between the holding frame 443 and the holding member 446. Accordingly, the heat generated at the liquid crystal panels 441R, 441G, and 441B can be speedily dissipated to the holding member 446, thereby further enhancing the cooling efficiency of the light modulating devices.

Further, with the present embodiment, advantages the same as (6), (7), and (9) described in the description of the first embodiment can be obtained.

Seventh Embodiment

The seventh embodiment according to the present invention will be described next.

In the following description, parts having the same structure as with the sixth embodiment are denoted with the same reference numerals, and detailed description thereof will be omitted or simplified.

With the optical device according to the sixth embodiment, attachment of the holding frame 443 to the holding member 446 was performed by two wedge-shaped spacers 448A each on the left and right sides.

Figure 22:
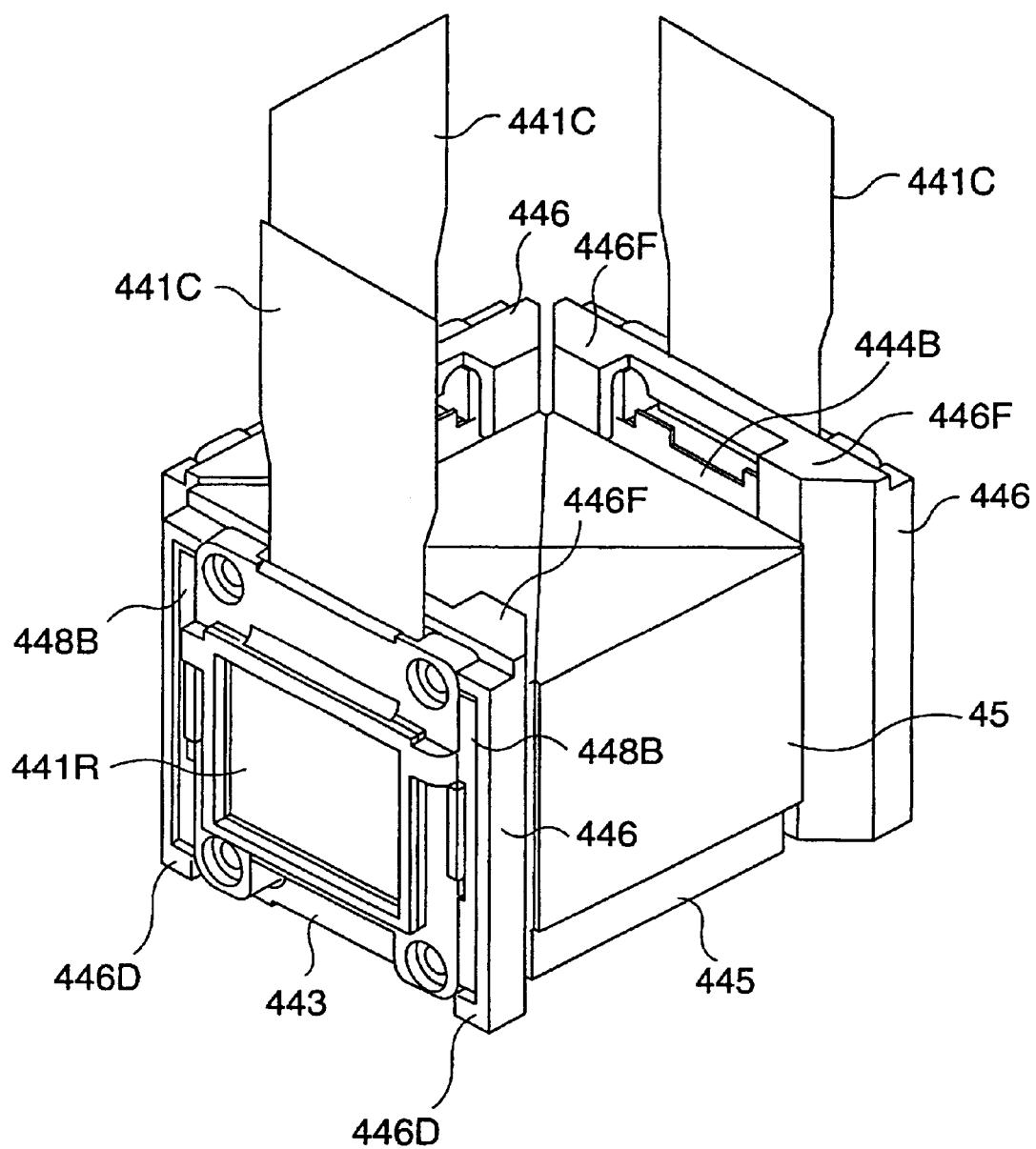
FIG. 22 is a perspective view representing the structure of the optical unit according to a seventh embodiment.
Figure 23:
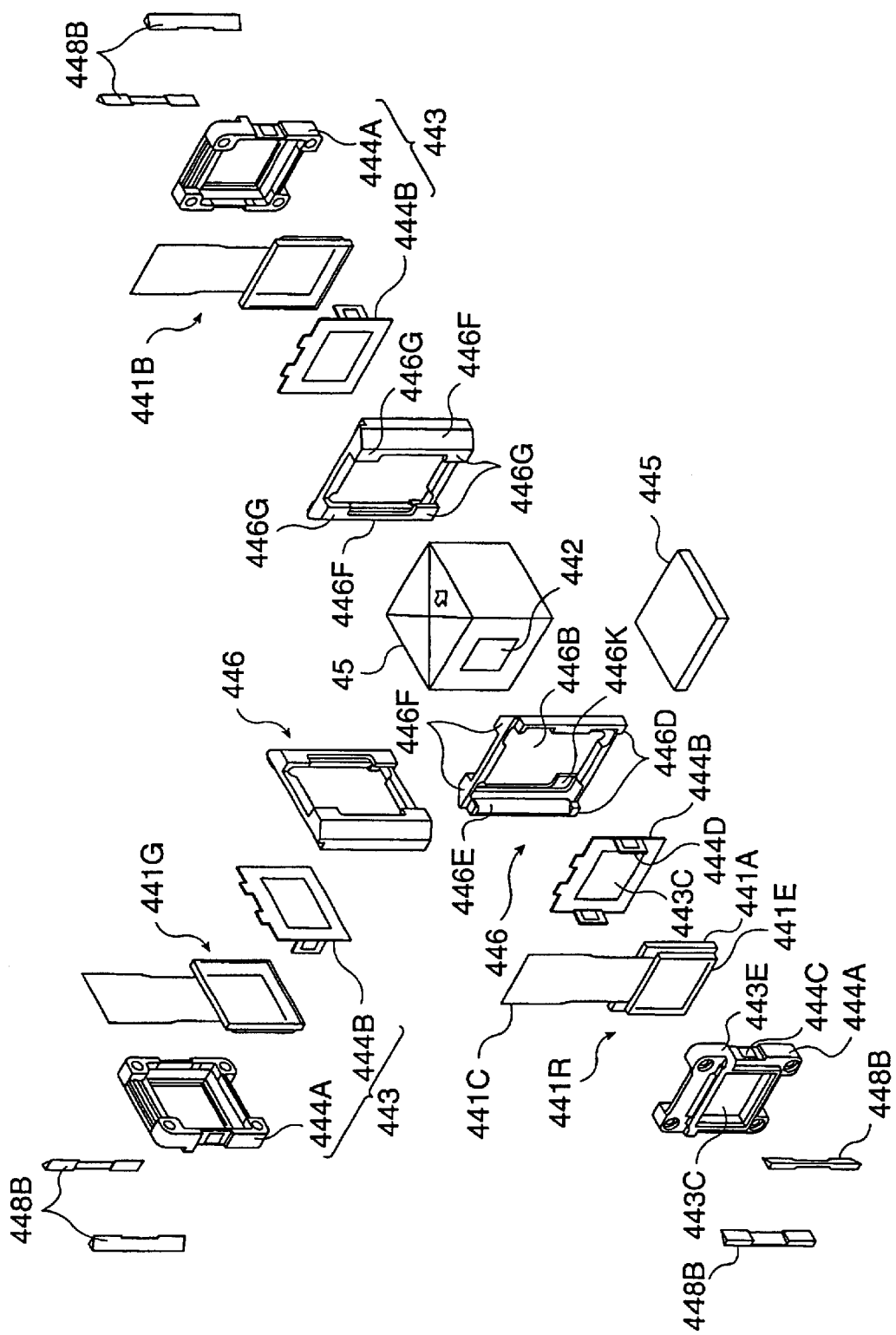
FIG. 23 is an exploded perspective view of FIG. 22.

Conversely, with the optical device according to the seventh embodiment, attachment of the holding frame 443 to the holding member 446 is performed by one wedge-shaped spacer 448B each on the left and right sides, as shown in FIG. 22 or FIG. 23. Specifically, a wedge-shaped spacer 448B is disposed over the entire length of the inclined face 446E of the erected piece 446D, forming the contact portion of the holding frame 443 and the holding member 446 at the top and bottom ends. Other configurations and manufacturing methods are the same as with the sixth embodiment.

According to such a seventh embodiment, advantages the same as the sixth embodiment can be obtained.

Using one wedge-shaped spacer 448B each on the left and right sides, and disposing the wedge-shaped spacers 448B over the entire length of the inclined faces 446E of the erected pieces 446D, increases the area of contact between the wedge-shaped spacers 448B and the holding frame 443, so the efficiency of dissipation from the holding frame 443 to the wedge-shaped spacers 448B can be further enhanced, and further, the cooling efficiency of the liquid crystal panels 441R, 441G, and 441B can be further improved.

Eighth Embodiment

The eighth embodiment according to the present invention will be described next.

In the following description, parts having the same structure as with the sixth embodiment are denoted with the same reference numerals, and detailed description thereof will be omitted or simplified.

With the sixth embodiment and seventh embodiment, fixing of the holding frame 443 to the holding member 446 was performed by multiple wedge-shaped spacers 448A or 448B.

Figure 24:
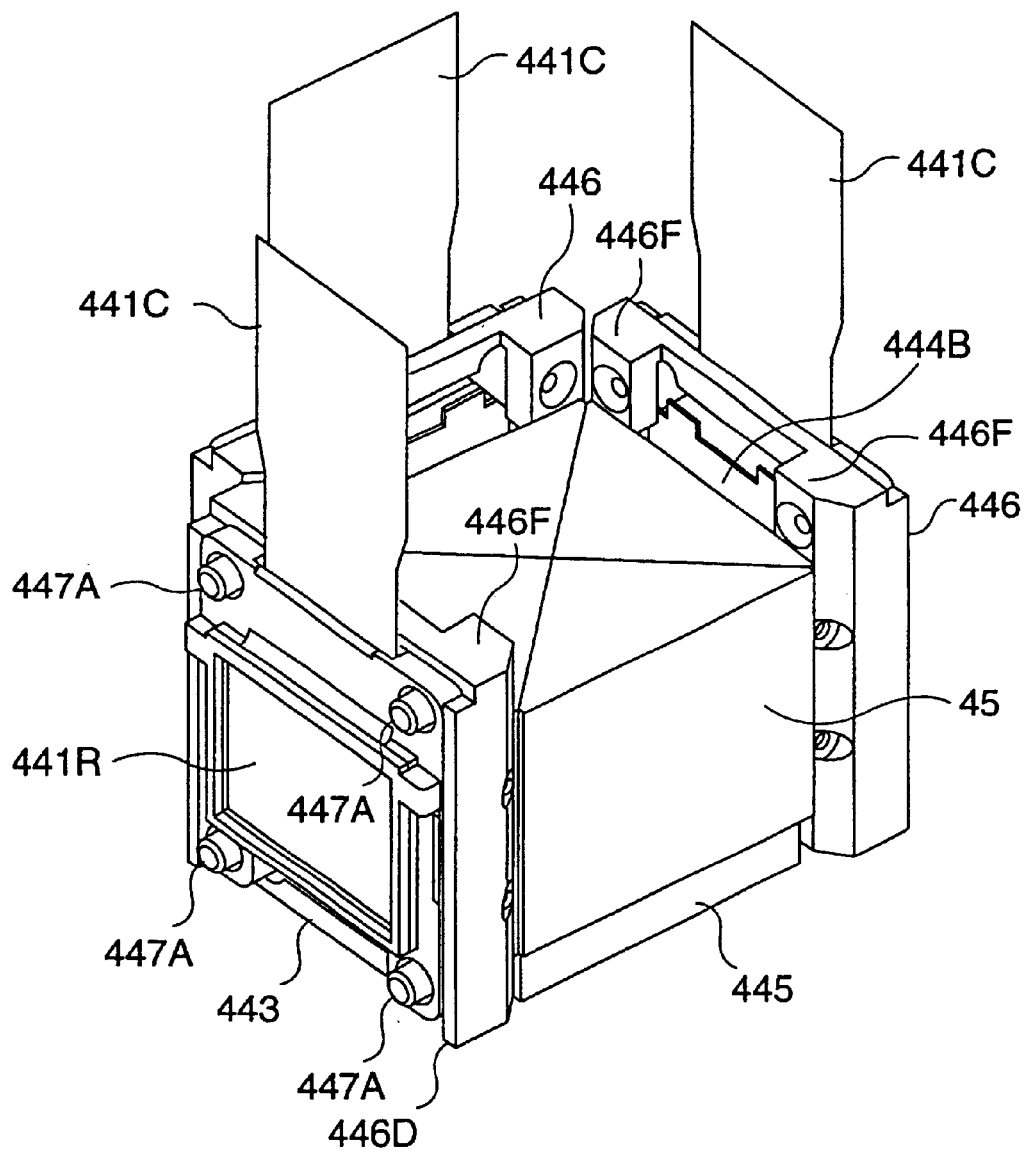
FIG. 24 is a perspective view representing the structure of the optical unit according to an eighth embodiment.
Figure 25:
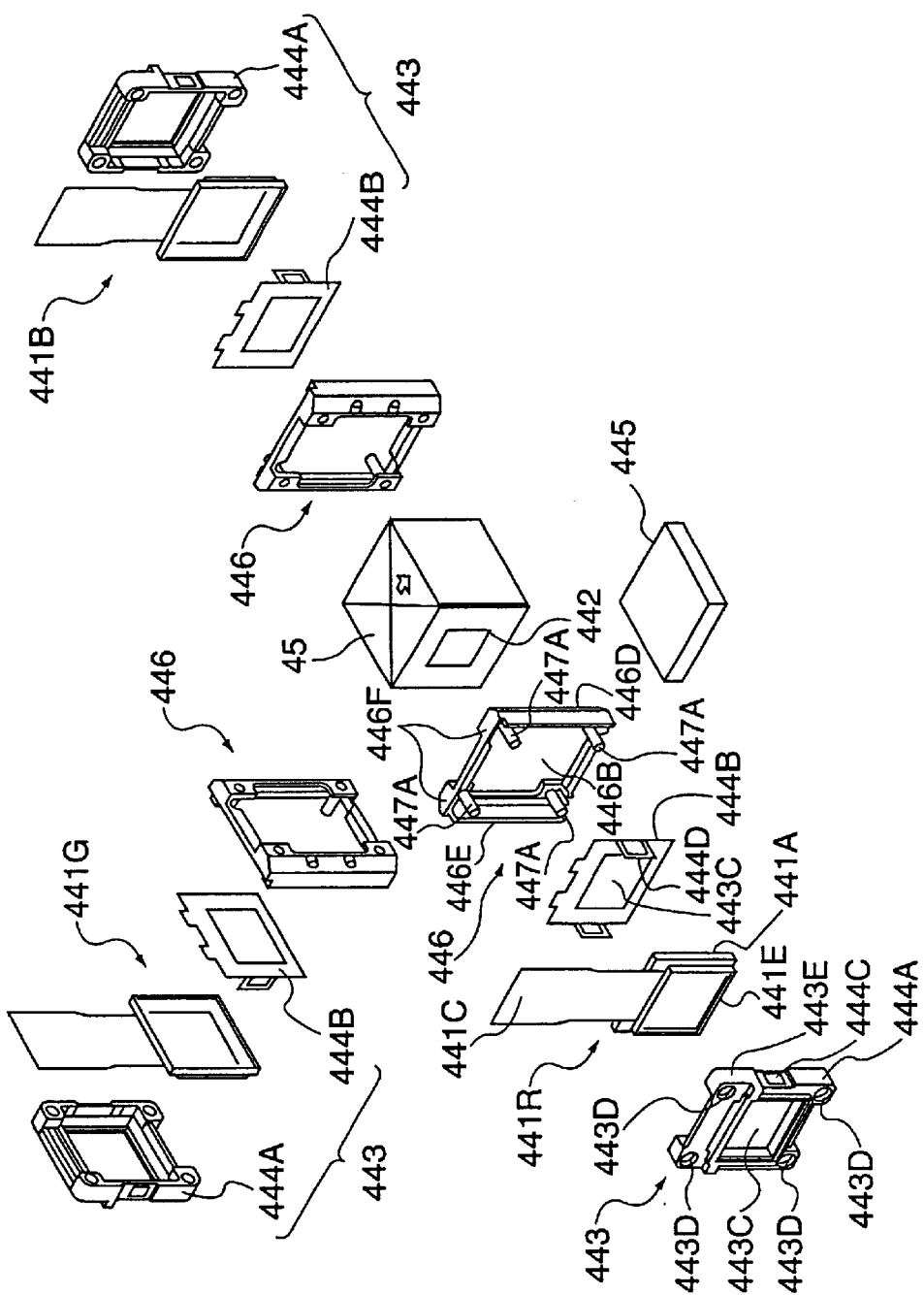
FIG. 25 is an exploded perspective view of FIG. 24.
Figure 26:
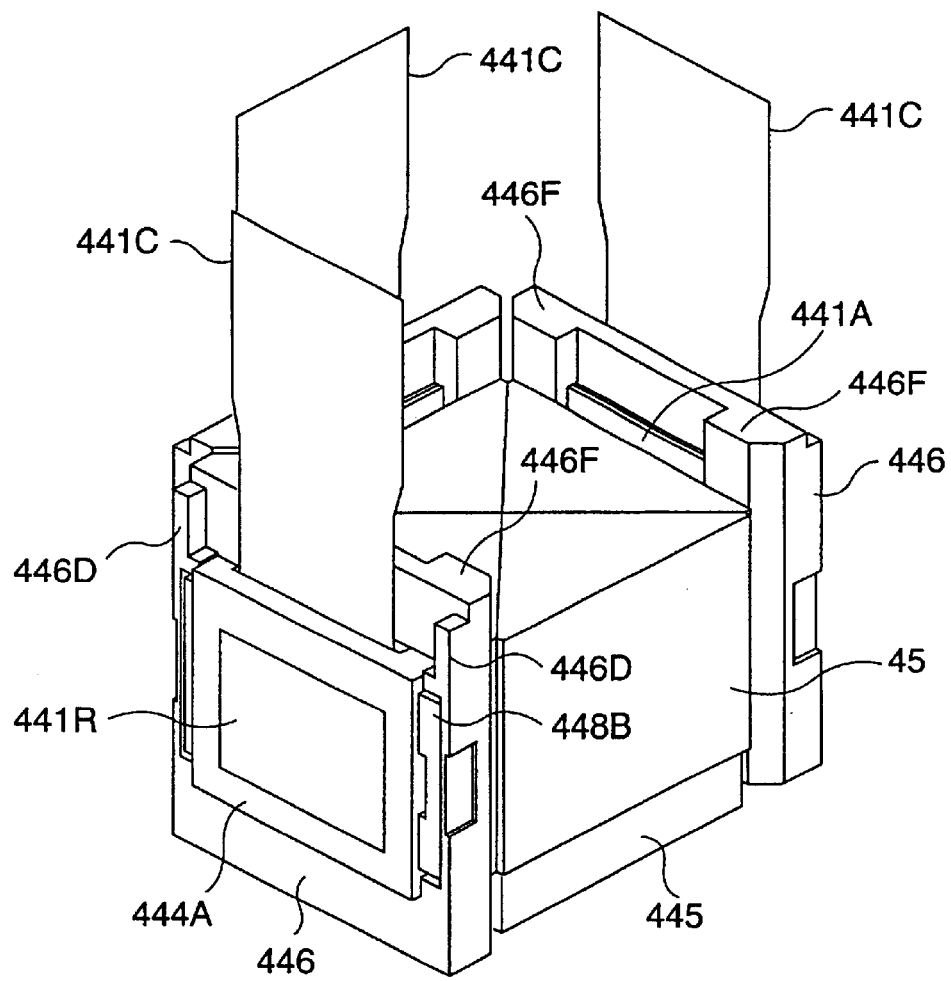
FIG. 26 is a perspective view representing the structure of the optical unit according to a ninth embodiment.
Figure 27:
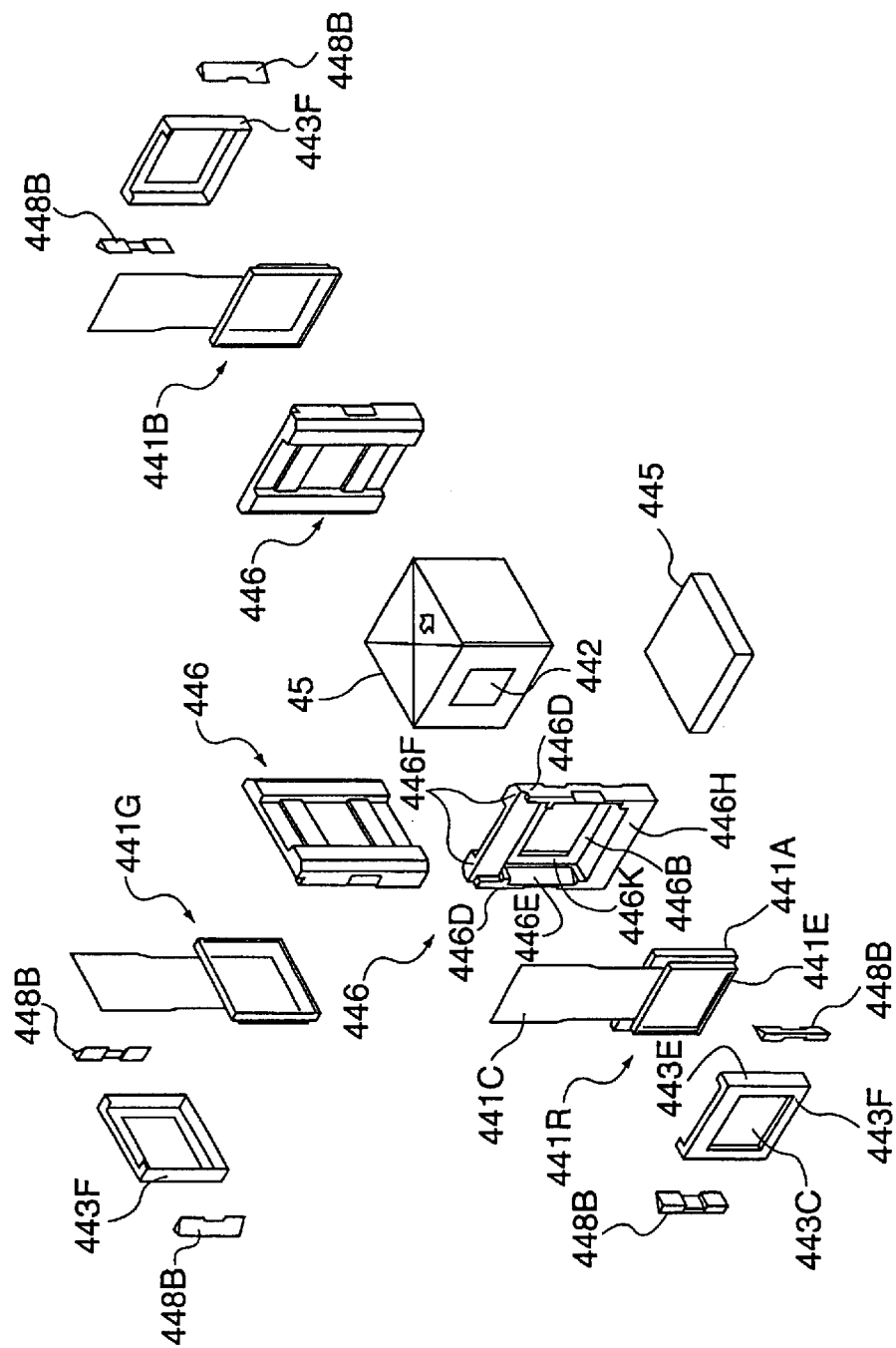
FIG. 27 is an exploded perspective view of FIG. 26.

Conversely, with the eighth embodiment, this differs in that this is performed by pins 447A erected from the four corners of the face of the holding frame 443 side of the holding member 446, and holes 443D formed in the four corners of the holding frame 443, as with the fourth embodiment and fifth embodiment, as shown in FIG. 24 or FIG. 25. Other configurations are the same as with the sixth embodiment. The number of pins 447A is not restricted to four, with two or more being sufficient, for example.

The manufacturing method of the optical devices according to the present embodiment is the same as that described with the fourth embodiment, except for the point that the step (b-2) does not exist.

According to such an eighth embodiment, the same advantages as with the sixth embodiment can be provided.

Ninth Embodiment

The ninth embodiment according to the present invention will be described next.

In the following description, parts having the same structure as with the seventh embodiment are denoted with the same reference numerals, and detailed description thereof will be omitted or simplified.

With the first embodiment through the eighth embodiment, the holding frame 443 to hold the liquid crystal panels 441R, 441G, and 441B was configured of a recessed frame member 444A to store the liquid crystal panels 441R, 441G, and 441B, and a supporting plate 444B to press and fix the stored liquid crystal panels 441R, 441G, and 441B.

Conversely, with the ninth embodiment, a holding frame 443F is configured of a recessed frame to support the light incident side of the liquid crystal panels 441R, 441G, and 441B. The light emitting side thereof is not pressed and fixed by the supporting plate 444B, but rather directly stored and held in storing space 446H of the holding member 446. Other configurations are the same as with the seventh embodiment.

Also, the manufacturing method of the optical device according to the present embodiment is the same as that described above with the sixth embodiment, except for the point that the light modulating device holding step in (c) ends with only storing the liquid crystal panels 441R, 441G, and 441B to the holding frame 443F configured of a recessed member.

According to such a ninth embodiment, the same advantages as with the sixth embodiment can be obtained.

Also, the holding frame 443F is formed with a recessed frame alone to support the light incident side of the liquid crystal panels 441R, 441G, and 441B, so hook engaging portions to fix the supporting plate 444B become unnecessary, as with the above-described first through eighth embodiments, and the recessed frame member 444A can be formed in a simple shape using a thinner plate. Further, the liquid crystal panels 441R, 441G, and 441B directly come into contact with the holding material 446. Accordingly, thermal transfer from the liquid crystal panels 441R, 441G, and 441B to the holding member 446 is further propagated, so the advantages of further enhanced heat dissipating properties can be obtained.

With the present embodiment, an arrangement may be made where the holding frame 443 and holding member 446 are fixed without using the spacers 448A. In this case, the erected pieces 446D of the holding member 446 and the perimeter of the holding frame 443F are made to face one another with a gap therebetween wherein focus adjustment is possible or a gap where both focus adjustment and alignment adjustment are possible, and following adjusting the position of the liquid crystal panels 441R, 441G, and 441B, the holding member 446 and the holding frame 443 are fixed with adhesive agent. It is preferable that the adhesive agent is applied before adjusting the position of the liquid crystal panels 441R, 441G, and 441B, and positional adjustment is performed in a state that the adhesive agent is unhardened. Also, the adhesive agent may be applied following adjustment and be hardened.

Tenth Embodiment

The tenth embodiment according to the present invention will be described next.

In the following description, parts having the same structure as with the sixth embodiment are denoted with the same reference numerals, and detailed description thereof will be omitted or simplified.

With the first embodiment through the eighth embodiment, the holding frame 443 to hold the liquid crystal panels 441R, 441G, and 441B was configured of a recessed frame member 444A to store the liquid crystal panels 441R, 441G, and 441B, and a supporting plate 444B to press and fix the stored liquid crystal panels 441R, 441G, and 441B.

Figure 28:
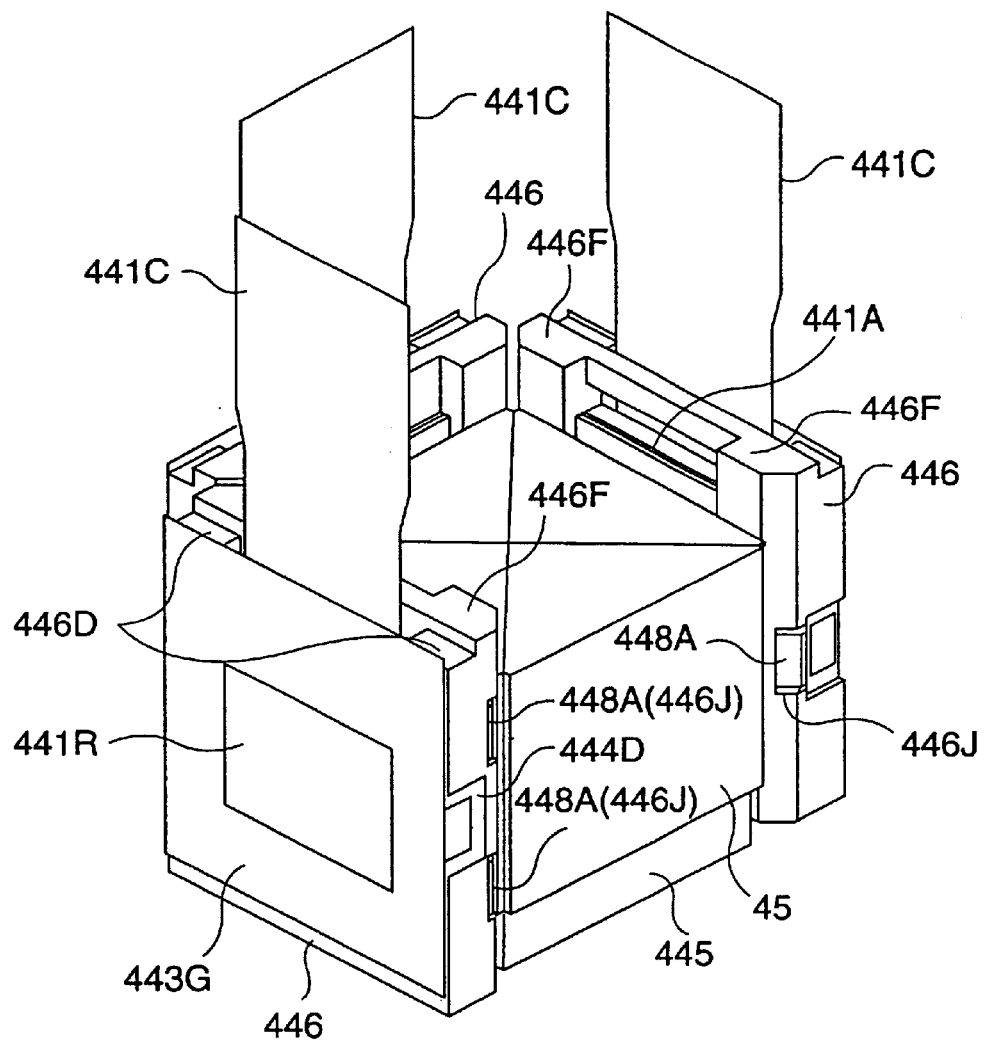
FIG. 28 is a perspective view representing the structure of the optical unit according to a tenth embodiment.
Figure 29:
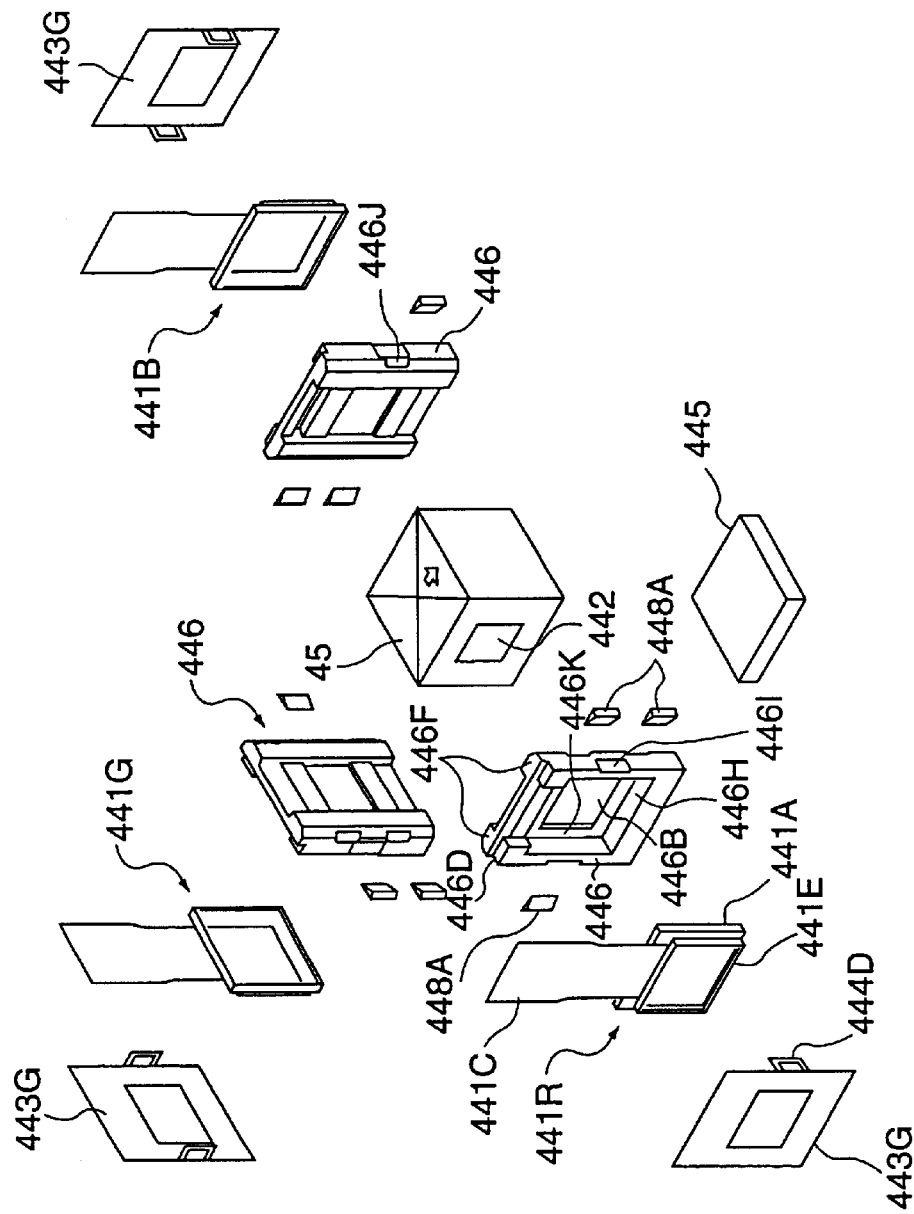
FIG. 29 is an exploded perspective view of FIG. 28.

Conversely, with the tenth embodiment, a holding frame 443G is configured of a supporting plate to support the light incident side of the liquid crystal panels 441R, 441G, and 441B, as shown in FIG. 28 or FIG. 29.

The liquid crystal panels 441R, 441G, and 441B are stored and held in storing space 446H of the holding member 446, and the light incident side of the liquid crystal panel 441R is pressed and fixed by the holding frame 443G configured of the supporting plate. The holding frame 443G configured of the supporting plate, and the holding member 446, are fixed by engaging of hooks 444D provided on the holding frame 443G and hook engaging portions 446I provided on the holding member 446.

Further, the holding member 446 according to the sixth embodiment had inclined faces 446E at the inner side of the erected pieces 446D for the spacers 448A to be inserted thereto (see FIG. 20), but the holding member 446 according to the present embodiment has no such inclined faces 446E. Instead, through holes 446J exposed on the left and right sides of the holding member 446 are provided on the erected pieces 446D of the holding member 446. The spacers 448A are inserted between the light emitting face of the liquid crystal panels 441R, 441G, and 441B, and the face of the holding member 446 at the side of the liquid crystal panels 441R, 441G, and 441B, from the outside of the holding member 446 through the through holes 446J. While three of the spacers 448A and through holes 446J are provided for each, this may be two, four, or more, for example. Other configurations are the same as with the sixth embodiment.

The manufacturing method for the optical device according to the present embodiment is carried out as follows.

(a) The polarizing plate 442 is fixed by adhesion to the light flux incident end face of the cross-dichroic prism 45 (polarizing plate fixing step).

(b) The cross-dichroic prism 45 with the polarizing plate 442 fixed thereto is fixed on the upper center of the base 445 (base fixing step).

(c) The contact faces 446G of the holding member 446 are adhered to the light flux incident end face of the cross-dichroic prism 45 (holding member fixing step).

(d) The liquid crystal panels 441R, 441G, and 441B are stored in the storing space 446H of the holding member 446 (light modulating device holding step).

(e) The holding frame 443G configured of the supporting plate is attached from the light incident side of the liquid crystal panels 441R, 441G, and 441B, the hooks 444D are engaged with the hook engaging portions 444C on the holding member 446, and the liquid crystal panels 441R, 441G, and 441B are pressed and fixed (holding frame mounting step).

(f) Wedge-shaped spacers 448A are inserted into through holes 446J provided on the left and right side faces of the holding member 446, and moved while being brought into contact with both the face on the liquid crystal panels 441R, 441G, and 441B side of the holding member 446 and the light emitting face of the liquid crystal panels liquid crystal panels 441R, 441G, and 441B, thereby adjusting the position of the liquid crystal panels 441R, 441G, and 441B (position adjusting step).

(g) Subsequently, the adhesive agent is hardened (adhesive agent hardening step).

According to such a tenth embodiment, the same advantages as with the sixth embodiment can be obtained.

Also, the liquid crystal panels 441R, 441G, and 441B directly come into contact with the holding member 446. Accordingly, thermal transfer from the liquid crystal panels 441R, 441G, and 441B to the holding member 446 is further propagated, so the advantages of further enhanced heat dissipating properties can be obtained.

Eleventh Embodiment

The eleventh embodiment according to the present invention will be described next.

In the following description, parts having the same structure as with the eighth embodiment are denoted with the same reference numerals, and detailed description thereof will be omitted or simplified.

With the eighth embodiment, the holding member 446 was directly fixed by adhesion to the light flux incident end face of the cross-dichroic prism 45. Conversely, with the eleventh embodiment, a sapphire plate 451 with relatively high thermal conductivity is fixed by adhesion to the light flux incident end face of the cross-dichroic prism 45, and the holding member 446 is fixed by adhesion to the light flux incident end face of the cross-dichroic prism 45 across the sapphire plate 451.

Figure 30:
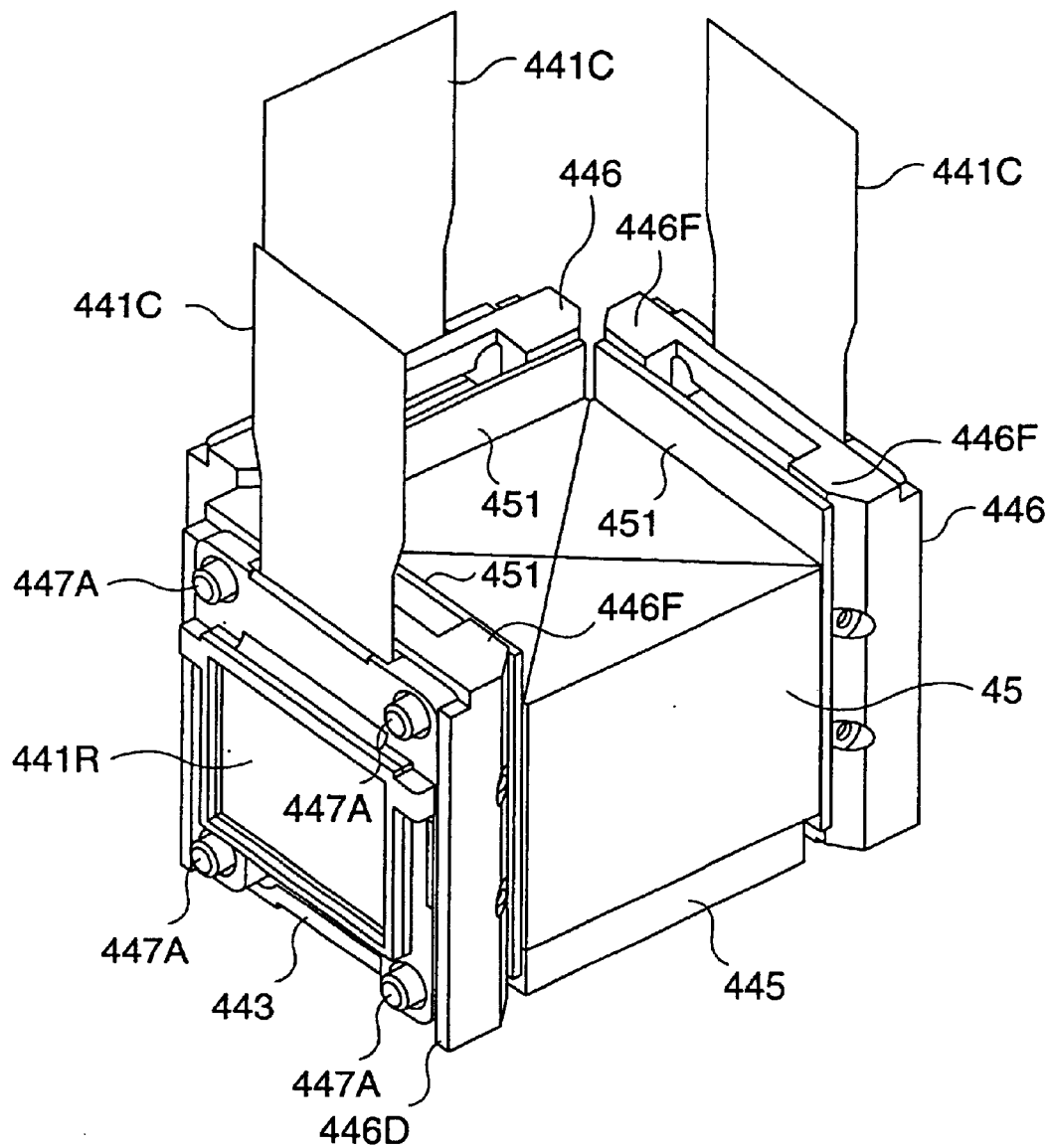
FIG. 30 is a perspective view representing the structure of the optical unit according to an eleventh embodiment.
Figure 31:
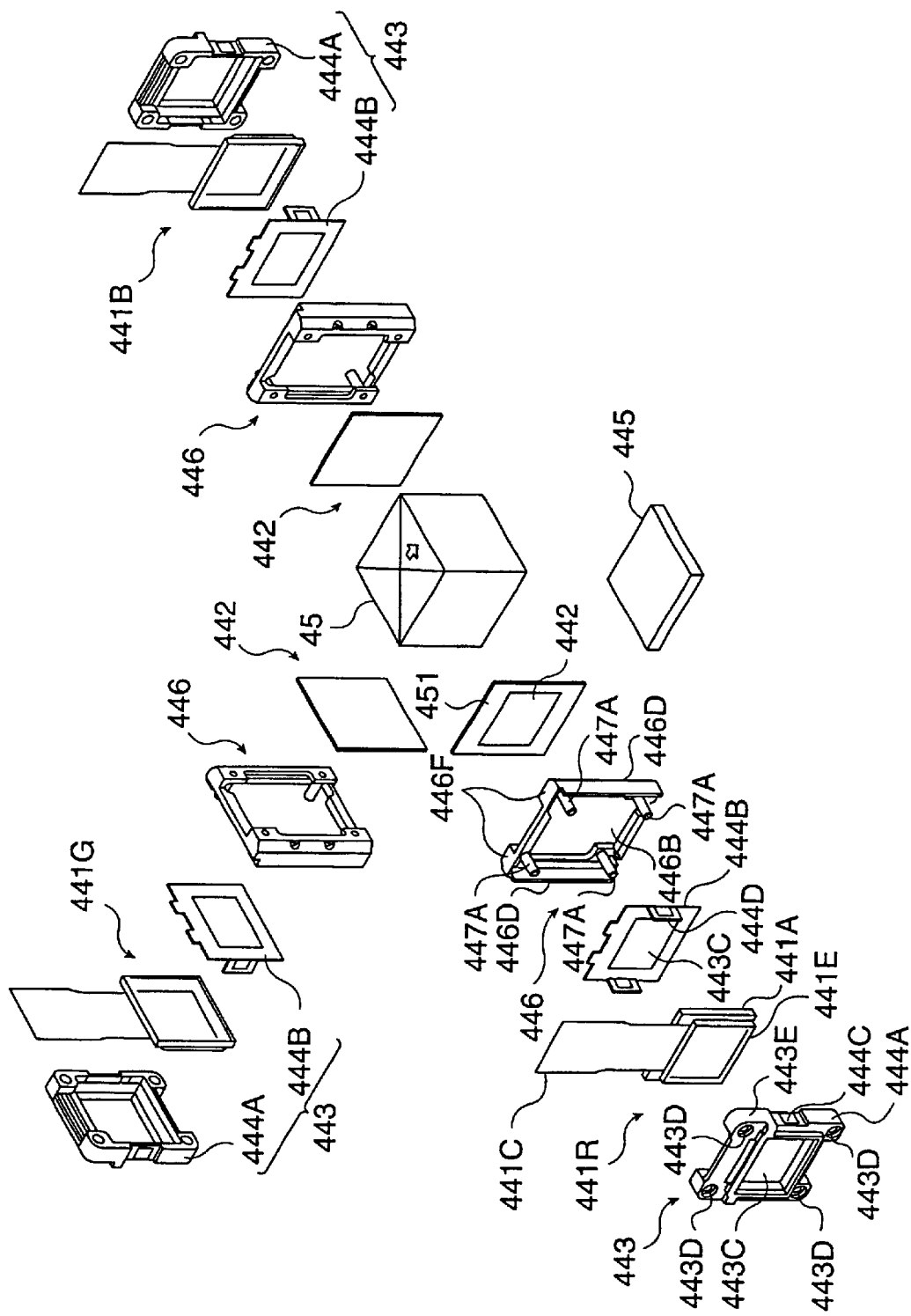
FIG. 31 is an exploded perspective view of FIG. 30.

Specifically, as shown in FIG. 30 or FIG. 31, a sapphire plate 451 is fixed by adhesion to almost the entire surface of the light flux incident end face of the cross-dichroic prism 45 using double-side tape or adhesive agent, and the polarizing plate 442 is applied to the liquid crystal panel corresponding portion at the center portion of the sapphire plate 451 using double-side tape or adhesive agent. Also, the protrusions 446F of the holding member 446 are fixed by adhesive agent to the sapphire plate 451.

Figure 32:
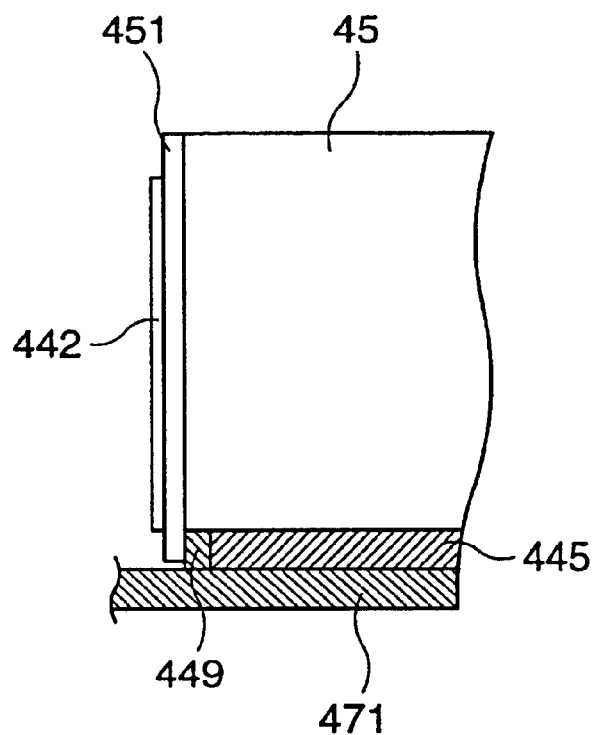
FIG. 32 is a schematic illustrating a sapphire plate and base applied to the prism.

Further, as shown in FIG. 32, an adhesive agent 449 having thermal conductivity is filled in the gap between the sapphire plate 451 and the base 445, joining these in a thermally conductible manner. Other configurations are the same as with the eighth embodiment.

The manufacturing method for the optical device according to the present invention is the same as with the eighth embodiment, except for the point that a sapphire plate 451 is fixed by adhesion to the light flux incident end face of the cross-dichroic prism 45 using double-side tape or adhesive agent, following which the polarizing plate 442 is applied to the sapphire plate 451 using double-side tape or adhesive agent, and the point that the holding member 446 is fixed by adhesion to the light flux incident end face of the cross-dichroic prism 45 across the sapphire plate 451.

As for the adhesive agent for adhesion of the mutual interfaces of the dichroic prism 45, sapphire plate 451, holding member 446, and base 445, an adhesive agent with excellent thermal conductivity as described in the first embodiment is used.

Also, for the configuration to join the base 445 and the sapphire plate 451 so as to enable thermal conduction, an arrangement may be made where a thermal-conductive sheet with carbon mixed in, or spacer members or the like formed of thermal-conductive material are introduced so as to directly fix the sapphire plate 451 to the lower housing 471, instead of filling the adhesive agent with thermal conductivity between these. In this case, in addition to adhesive agent with thermal conductivity, mechanical fixing using screws or the like, can also be used to fix the thermal-conducting sheet or spacer members.

According to such an eleventh embodiment, the following advantages can be obtained, in addition to advantages the same as those of the eighth embodiment.

In addition to cooling using the air path between the cross-dichroic prism 45 and the liquid crystal panels 441R, 441G, and 441B, the heat in the vicinity of the liquid crystal panels 441R, 441G, and 441B can be conducted and dissipated in the order of the holding frame 443, pins 447A of the holding member 446, holding member 446, sapphire plate 451, base 445, and lower housing 471, so even in the event that the prism 45 is made of glass such as BK7 with a relatively low thermal conductivity, the cooling capabilities of the liquid crystal panels 441R, 441G, and 441B can be greatly enhanced. Accordingly, even in the event that the luminance of the projector is raised, deterioration of the liquid crystal panel can be suppressed, and stable images can be maintained.

Also, the configuration according to the present embodiment where the holding member 446 is fixed by adhesion to the light flux incident end face of the cross-dichroic prism 45 with a sapphire plate introduced between, and the sapphire plate and the base are joined in a thermally conductible manner, can also be applied to the fourth through tenth embodiments. This enables advantages, such as enhanced cooling capabilities, suppression of deterioration of the liquid crystal panel, and maintaining stable image quality, to be obtained with the fourth through tenth embodiments as well.

Twelfth Embodiment

The twelfth embodiment according to the present invention will be described next.

In the following description, the same structures and the same parts as with the sixth embodiment are denoted with the same reference numerals, and detailed description thereof will be omitted or simplified.

With the sixth embodiment, the holding member 446 was fixed by adhesion to the light flux incident end face of the cross-dichroic prism 45.

Figure 33:
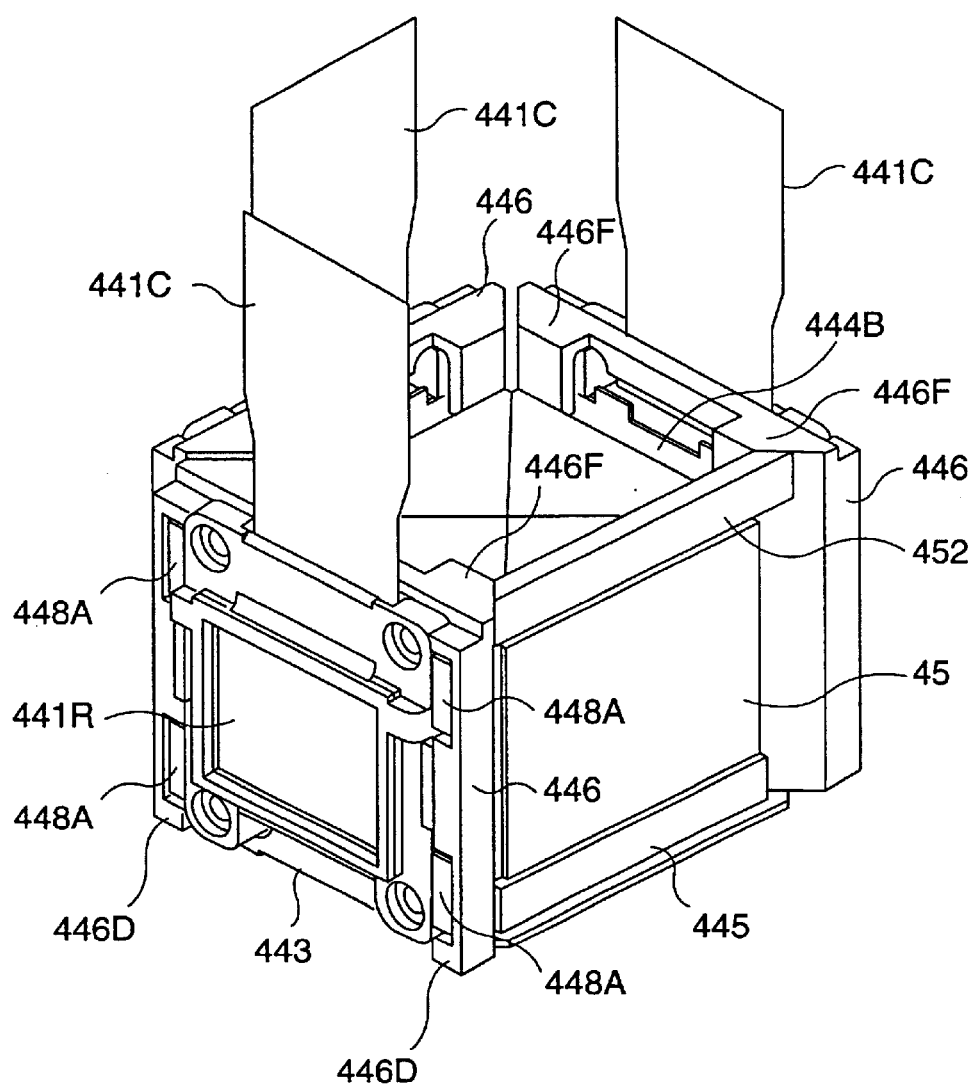
FIG. 33 is a perspective view representing the structure-of the optical unit according to a twelfth embodiment.
Figure 34:
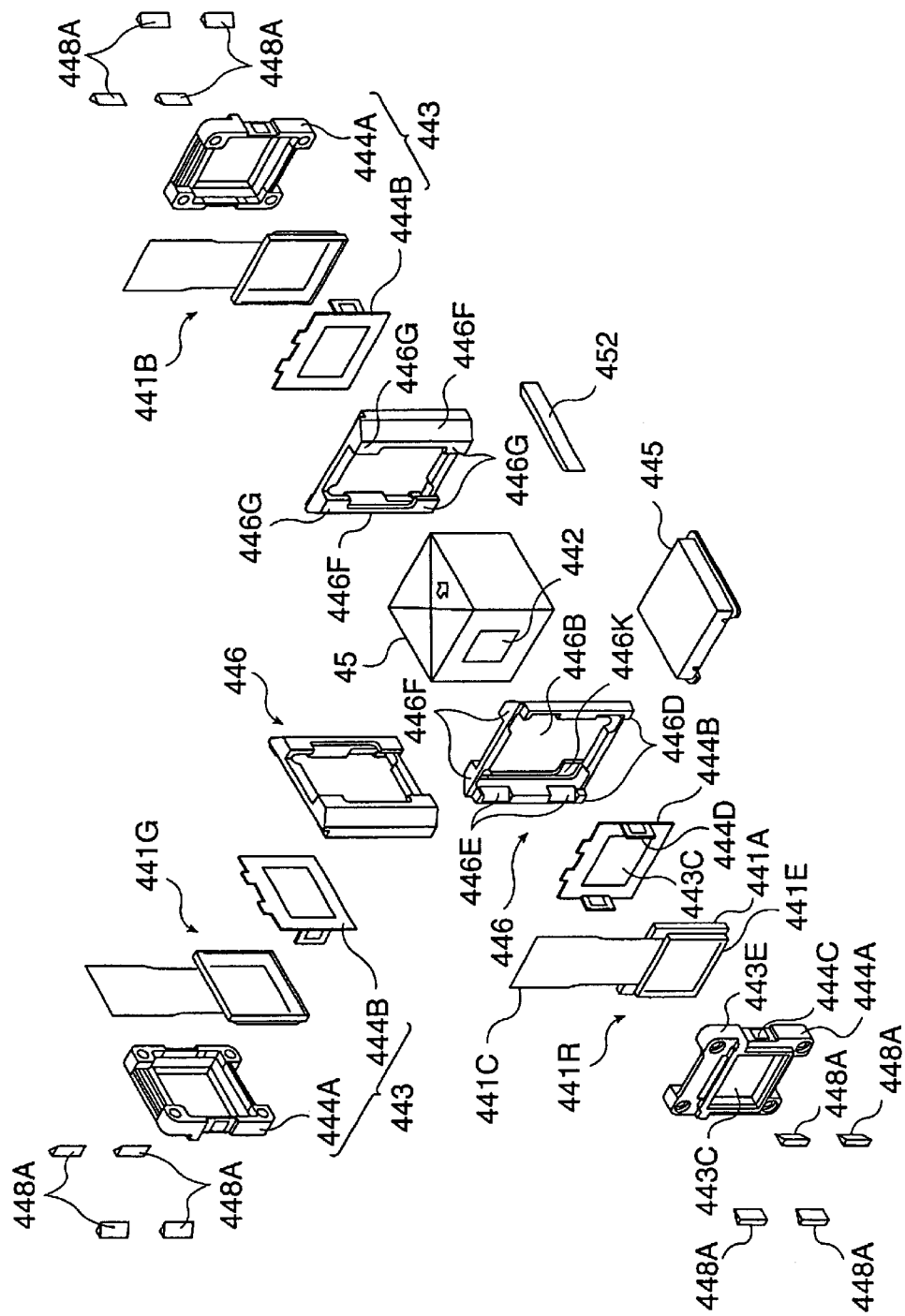
FIG. 34 is an exploded perspective view of FIG. 33.

Conversely, with the twelfth embodiment, the holding member 446 is fixed to the base 445, as shown in FIG. 33 or FIG. 34. Further, the top portion of opposing holding members 446 are linked by a frame linking member 452.

Other configurations are the same as with the sixth embodiment.

The following is a description of the manufacturing method of the optical device according to the present embodiment.

(a) The polarizing plate 442 is fixed to the light flux incident end face of the cross-dichroic prism 45 (polarizing plate fixing step).

(b) The cross-dichroic prism 45 with the polarizing plate 442 fixed thereto is fixed on the upper center of the base 445 (base fixing step).

(c) Also, the liquid crystal panels 441R, 441G, and 441B are stored in the recessed frame member 444A of the holding frame 443. Further, the supporting plate 444B is attached to the recessed frame member 444A from the light emitting side of the liquid crystal panels 441R, 441G, and 441B, thereby pressing and fixing the liquid crystal panels 441R, 441G, and 441B so as to hold. Attaching of the supporting plate 444B to the recessed frame can be performed by engaging the hooks 444D of the supporting plate 444B with the hook engaging portions 444C of the recessed frame member 444A (light modulating device holding step).

(e-1") Also, the contact faces 446G of the holding member 446 are adhered to the end faces of the base 445 on three sides, with an adhesive agent (holding member fixing step).

(d-1) Further, a frame linking member 452 is fixed by adhesion between holding members 446 at the synthesized light emitting side (linking member fixing step). This frame linking member 452 can be used as an attachment helper plate for the projecting lens 46.

(d-2) Next, the holding frame 443 storing the liquid crystal panels 441R, 441G, and 441B is stored between the left and right erected pieces 446D of the holding member 446, and brought into contact with the supporting piece 446K (holding frame mounting step).

(e-2) Wedge-shaped spacers 448A with adhesive agent coated thereupon are inserted between the inclined faces 446E formed on the inner side face of the erected pieces 446D and the perimeter 443E of the holding frame 443 (spacer mounting step). At this time, the spacers 448A are adhered to the inclined faces 446E and the perimeter 443E of the holding frame 443, due to the surface tension of the adhesive agent.

(f) Further, in a state with the adhesive agent coated on the wedge-shaped spacers 448A unhardened, the position of the liquid crystal panels 441R, 441G, and 441B is adjusted (position adjusting step).

(g) Following performing positional adjustment of the liquid crystal panels 441R, 441G, and 441B, the adhesive agent is hardened (adhesive agent hardening step).

An adhesive agent having excellent thermal conductivity, such as that described in the first embodiment, is used for the adhesive agent in the above manufacturing steps.

Figure 35:
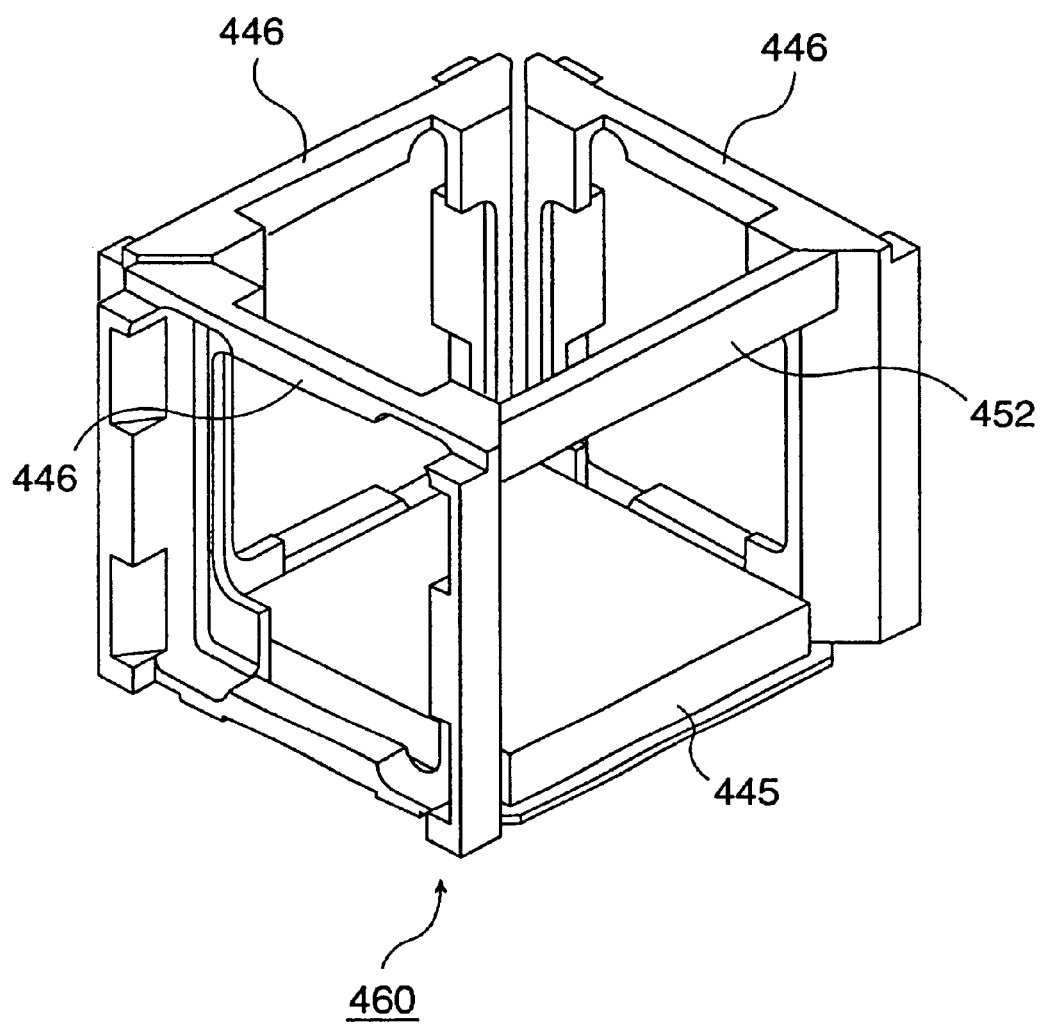
FIG. 35 is a perspective view where the base and the holding members in the twelfth embodiment are integrally formed.

Now, the above has been a description of the configuration where, the base 445, holding members 446, and linking member 452 are configured as separate parts, which are fixed and integrated at the time of assembling, but a formed unit 460 where these are integrally formed as shown in FIG. 35 may be used.

The manufacturing method of the optical device in this case is as described next.

(a) The polarizing plate 442 is fixed to the light flux incident end face of the cross-dichroic prism 45 (polarizing plate fixing step).

(b) Subsequently, the cross-dichroic prism 45 with the polarizing plate 442 fixed thereto is inserted from above the formed unit 460, and fixed on the upper center of the base 445 (formed unit fixing step).

(c) Also, the liquid crystal panels 441R, 441G, and 441B are stored in the recessed frame member 444A of the holding frame 443. Further, the supporting plate 444B is attached to the recessed frame member 444A from the light emitting side of the liquid crystal panel 441R, thereby pressing and fixing the liquid crystal panels 441R, 441G, and 441B so as to hold. Attaching of the supporting plate 444B to the recessed frame can be performed by engaging the hooks 444D of the supporting plate 444B with the hook engaging portions 444C of the recessed frame member 444A (light modulating device holding step).

(d-2) Next, the holding frame 443 storing the liquid crystal panels 441R, 441G, and 441B is stored between the left and right erected pieces 446D of the holding member 446, and brought into contact with the supporting piece 446K (holding frame mounting step).

(e-2) Wedge-shaped spacers 448A with adhesive agent coated thereupon are inserted between the inclined faces 446E formed on the inner side face of the erected pieces 446D and the perimeter 443E of the holding frame 443 (spacer mounting step). At this time, the spacers 448A are adhered to the inclined faces E and the perimeter 443E of the holding frame 443, due to the surface tension of the adhesive agent.

(f) Further, in a state with the adhesive agent coated on the wedge-shaped spacers 448A unhardened, the position of the liquid crystal panels 441R, 441G, and 441B is adjusted (position adjusting step).

(g) Following performing positional adjustment of the liquid crystal panels 441R, 441G, and 441B, the adhesive agent is hardened (adhesive agent hardening step).

Thus, by employing a formed unit where the base 445 and holding member 446 are integrated, the holding member fixing step and linking member fixing step can be omitted, so the optical device can be readily assembled. Also, it is not necessary to integrally form all of the base 445, holding members 446, and linking member 452, rather, the same advantages can be obtained in cases where only two of these are integrally formed, as well.

Attaching of the liquid crystal panels 441R, 441G, and 441B to the cross-dichroic prism 45 does not necessarily have to be performed in the above order. For example, in the event of using solder as an adhesive agent, an arrangement is sufficient wherein the parts are mounted without adhesive agent in the manufacturing steps (d-1), (d-2), (e-1"), and (e-2), and following the positional adjustment in (f), the holding member 446, spacers 448A, holding frame 443, and linking member 452 are fixed with solder. Also, the holding members 446 and frame linking member 452 may be mechanically fixed by screws or the like, instead of adhesive agent. Also, with the above manufacturing step (e-2), wedge-shaped spacers 448A with adhesive agent coated thereupon were inserted between the inclined faces 446E formed on the inner side faces of the erected pieces 446D and the perimeter 443E of the holding frame 443, but an arrangement may be made wherein a thermal-conductive adhesive agent is filled in the gap between the perimeter of the holding frame 443 and the erected piece 446D beforehand, to which the wedge-shaped spacers 448A are inserted. This is true for optical devices of the other embodiments manufactured with the same manufacturing method as the present embodiment.

The liquid crystal panels 441R, 441G, and 441B and cross-dichroic prism 45 thus integrated are fixed to the lower housing 471 (FIG. 6) by screws or the like, using the base 445 on the bottom.

According to such a twelfth embodiment, advantages the same as (1), (2), (5), (6), (7), and (9) described with the first embodiment can be obtained.

Also, by linking the top portions of the holding members 446 with a frame linking member 452, the holding members 446 can be held and fixed in a stable manner, while the temperature distribution of the holding members 446 can be made uniform, thereby enhancing thermal transfer.

Also, integrally forming at least two of the base 445, holding member 446, and linking member 452 makes dissipation of heat from the holding frame to the base, to the holding member and to the linking member to be carried out smoothly, thereby further enhancing the cooling capabilities of the liquid crystal panels 441R, 441G, and 441B.

Further, filling the gap between the perimeter of the holding frame 443 and the erected pieces 446D with a thermal-conductive adhesive agent widens the area of contact between the holding frame 443 and the holding member 446. Accordingly, the heat generated at the liquid crystal panels 441R, 441G, and 441B can be speedily dissipated to the holding member 446, further improving the cooling efficiency of the light modulating devices.

Thirteenth Embodiment

The thirteenth embodiment according to the present invention will be described next.

In the following description, the same structures and the same parts as with the twelfth embodiment are denoted with the same reference numerals, and detailed description thereof will be omitted or simplified.

With the optical device according to the twelfth embodiment, attachment of the holding frame 443 to the holding member 446 was performed by two wedge-shaped spacers 448A each on the left and right sides.

Figure 36:
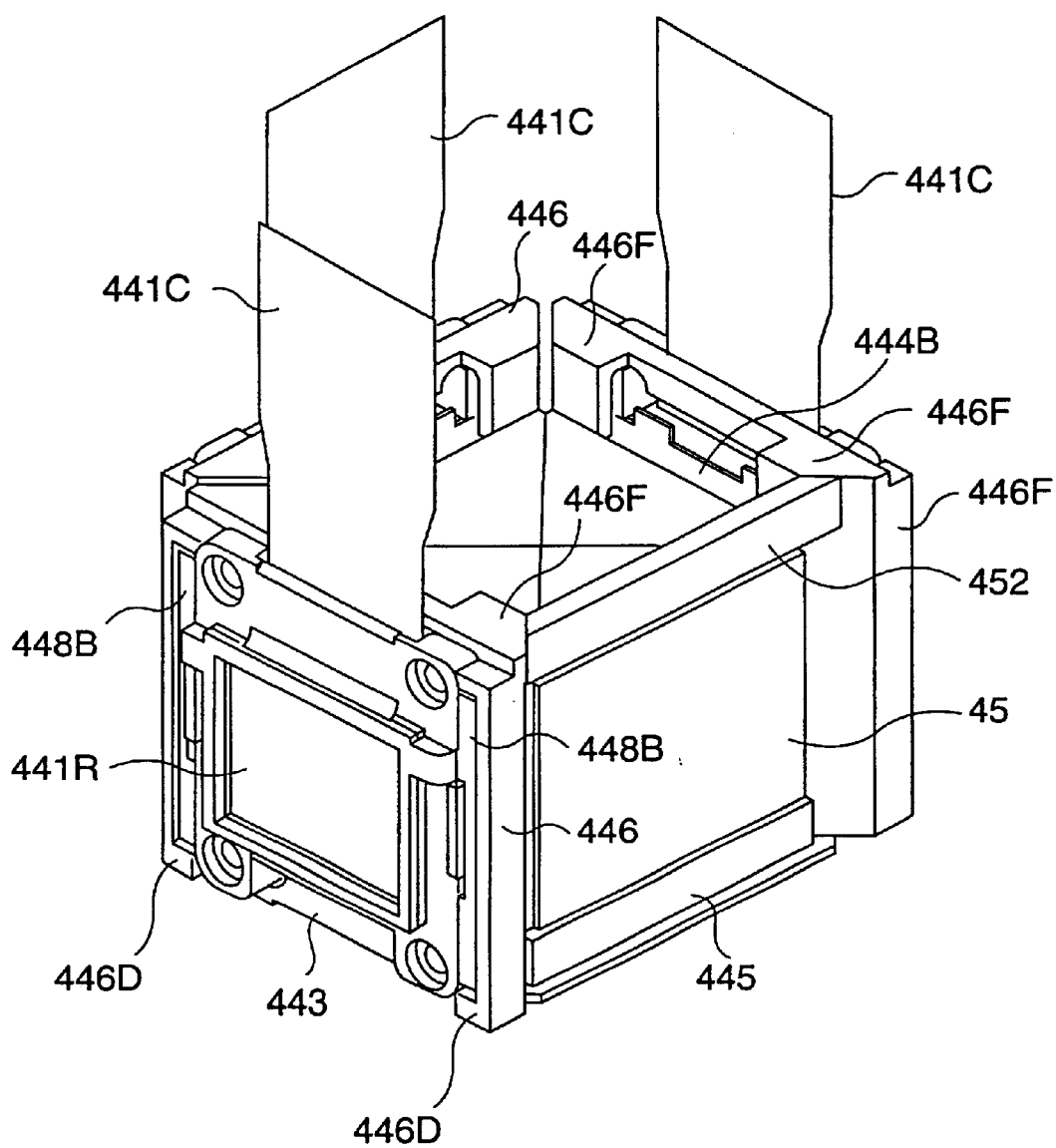
FIG. 36 is a perspective view representing the structure of the optical unit according to a thirteenth embodiment.
Figure 37:
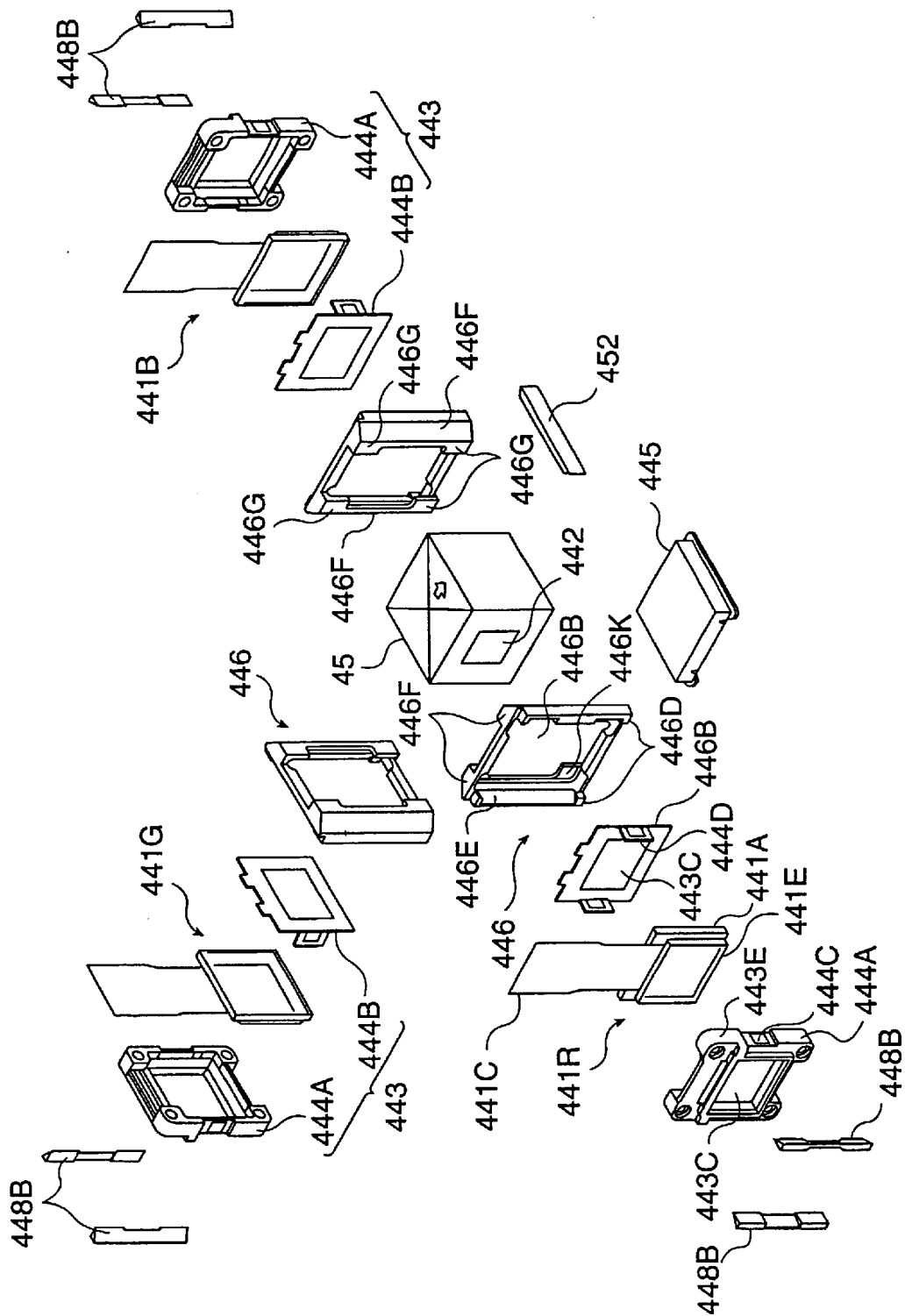
FIG. 37 is an exploded perspective view of FIG. 36.
Figure 38:
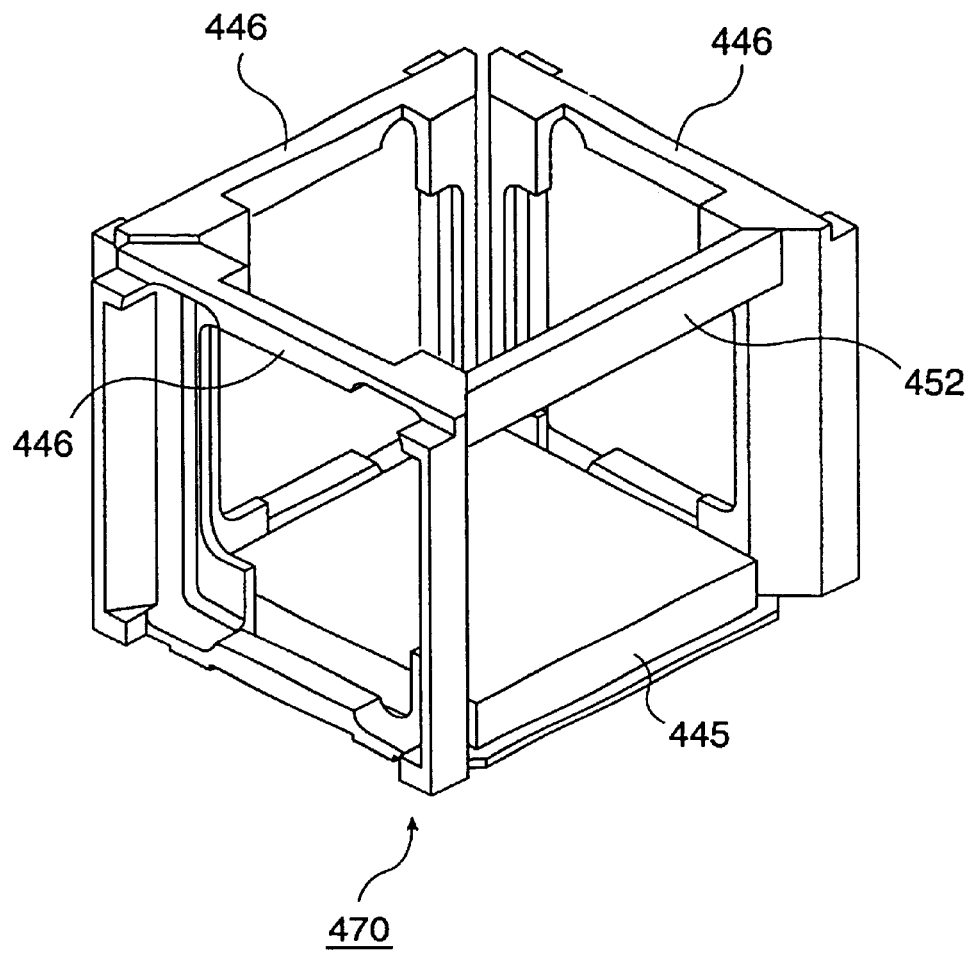
FIG. 38 is a perspective view where the base and the holding members in the thirteenth embodiment are integrally formed.

Conversely, with the optical device according to the thirteenth embodiment, attachment of the holding frame 443 to the holding member 446 is performed by one wedge-shaped spacer 448B each on the left and right sides, as shown in FIG. 36 or FIG. 37. Specifically, a wedge-shaped spacer 448B is disposed over the entire length of the inclined face 446E of the erected piece 446D, forming the contact portion of the holding frame 443 and the holding member 446 at the top and bottom ends. Also, as shown in FIG. 38, a formed unit 470 where the base 445, holding members 446, and linking member 452, or two of these, are integrally formed, may be used with the present embodiment as well. Other configurations and manufacturing methods are the same as with the twelfth embodiment.

According to such a thirteenth embodiment, advantages the same as the twelfth embodiment can be obtained.

Also, using one wedge-shaped spacer 448B each on the left and right sides, and disposing the wedge-shaped spacers 448B over the entire length of the inclined faces 446E of the erected pieces 446D, increases the area of contact between the wedge-shaped spacers 448B and the holding frame 443, so the dissipation properties from the holding frame 443 to the wedge-shaped spacers 448B can be further enhanced, and further, the cooling efficiency of the liquid crystal panels 441R, 441G, and 441B can be further enhanced.

Fourteenth Embodiment

The fourteenth embodiment according to the present invention will be described next.

In the following description, the same structures and the same parts as with the twelfth embodiment are denoted with the same reference numerals, and detailed description thereof will be omitted or simplified.

With the optical device according to the twelfth embodiment and thirteenth embodiment, fixing of the holding frame 443 to the holding member 446 was performed by multiple wedge-shaped spacers 448A or 448B.

Figure 39:
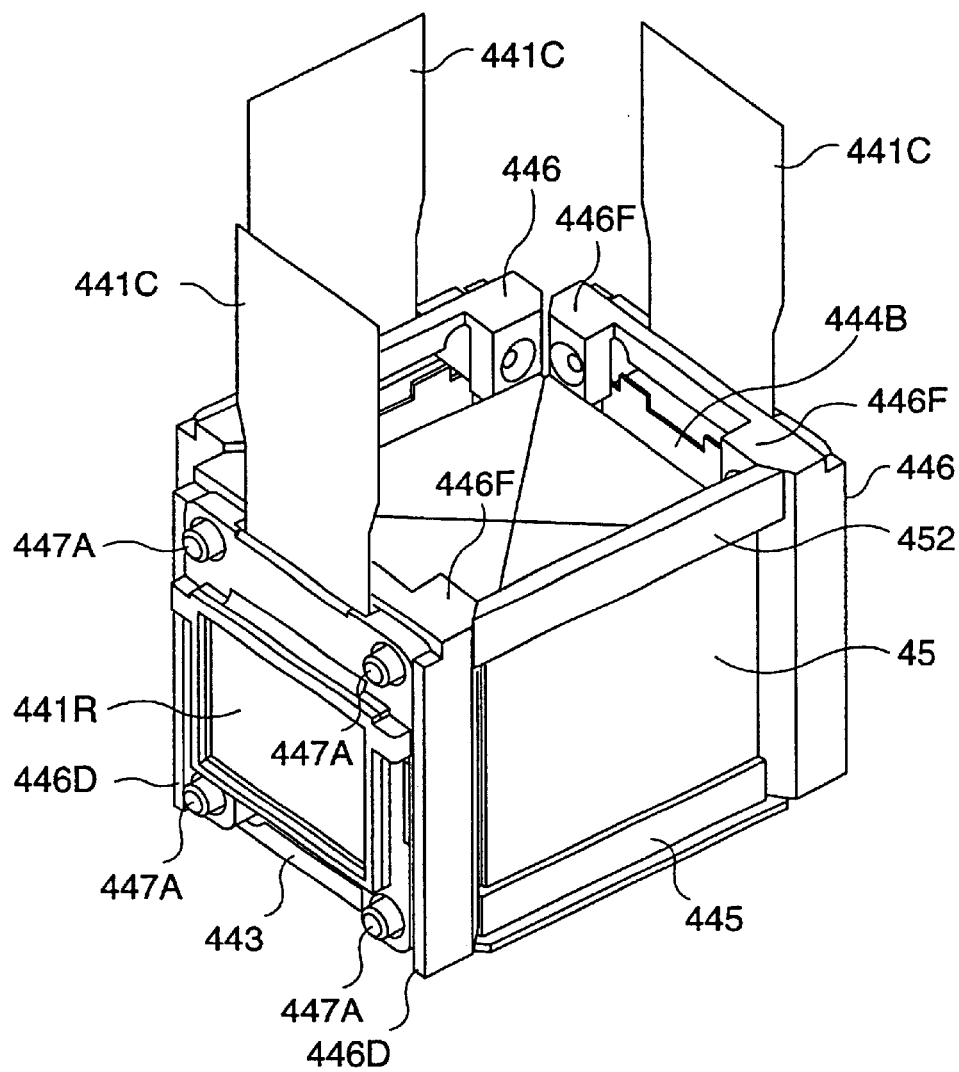
FIG. 39 is a perspective view representing the structure of the optical unit according to a fourteenth embodiment.
Figure 40:
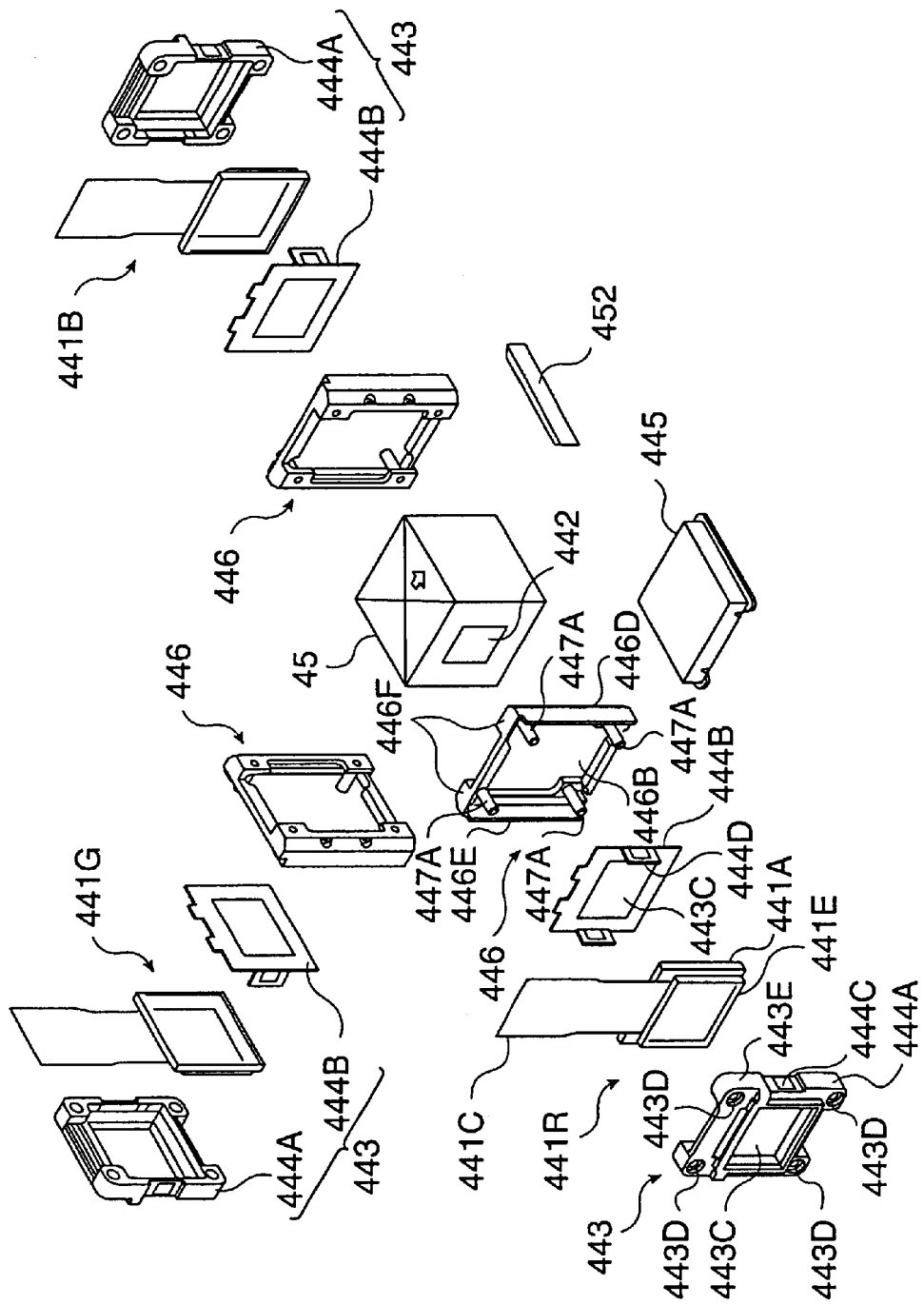
FIG. 40 is an exploded perspective view of FIG. 39.

Conversely, with the fourteenth embodiment, this differs in that this is performed by pins 447A erected from the four corners of the holding frame 443 of the holding member 446, and holes 443D formed in the four corners of the holding frame 443 corresponding to the pins 447A, as shown in FIG. 39 or FIG. 40. Other configurations are the same as with the twelfth embodiment. Now, the positions of the pins do not need to be at the corners of the holding member 446. Also, the number of pins 447A is not restricted to four, with two or more being sufficient.

Figure 41:
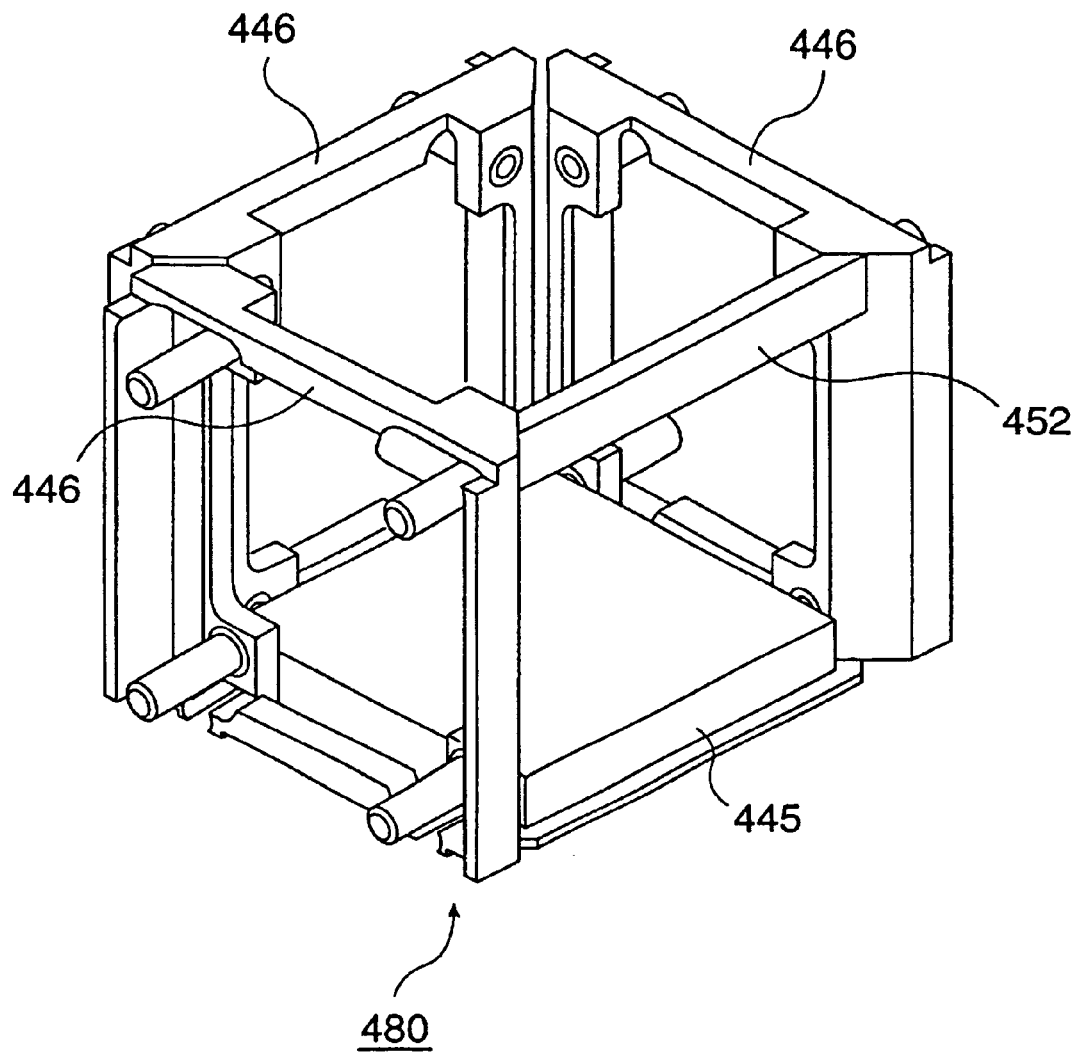
FIG. 41 is a perspective view where the base and the holding members in the fourteenth embodiment are integrally formed.

Also, as shown in FIG. 41, a formed unit 470 where the base 445, holding members 446, and linking member 452, or two of these, are integrally formed, may be used with the present embodiment as well.

The manufacturing method of the optical device according to the present embodiment is almost the same as that described with the twelfth embodiment, except for the point that the pins 447A of the holding member 446 are inserted into the holes 443D of the holding frame 443 along with the adhesive agent in the holding frame mounting step (d-2), and the point that the spacer mounting step (e-2) does not exist.

According to such an eleventh embodiment, advantages the same as (3) described with the first embodiment can be obtained, in addition to advantages the same as the twelfth embodiment.

Fifteenth Embodiment

The fifteenth embodiment according to the present invention will be described next.

In the following description, the same structures and the same parts as with the thirteenth embodiment are denoted with the same reference numerals, and detailed description thereof will be omitted or simplified.

With the twelfth embodiment through the fourteenth embodiment, the holding frame 443 to hold the liquid crystal panels 441R, 441G, and 441B was configured of a recessed frame member 444A to store the liquid crystal panels 441R, 441G, and 441B, and a supporting plate 444B to press and fix the stored liquid crystal panels 441R, 441G, and 441B.

Figure 42:
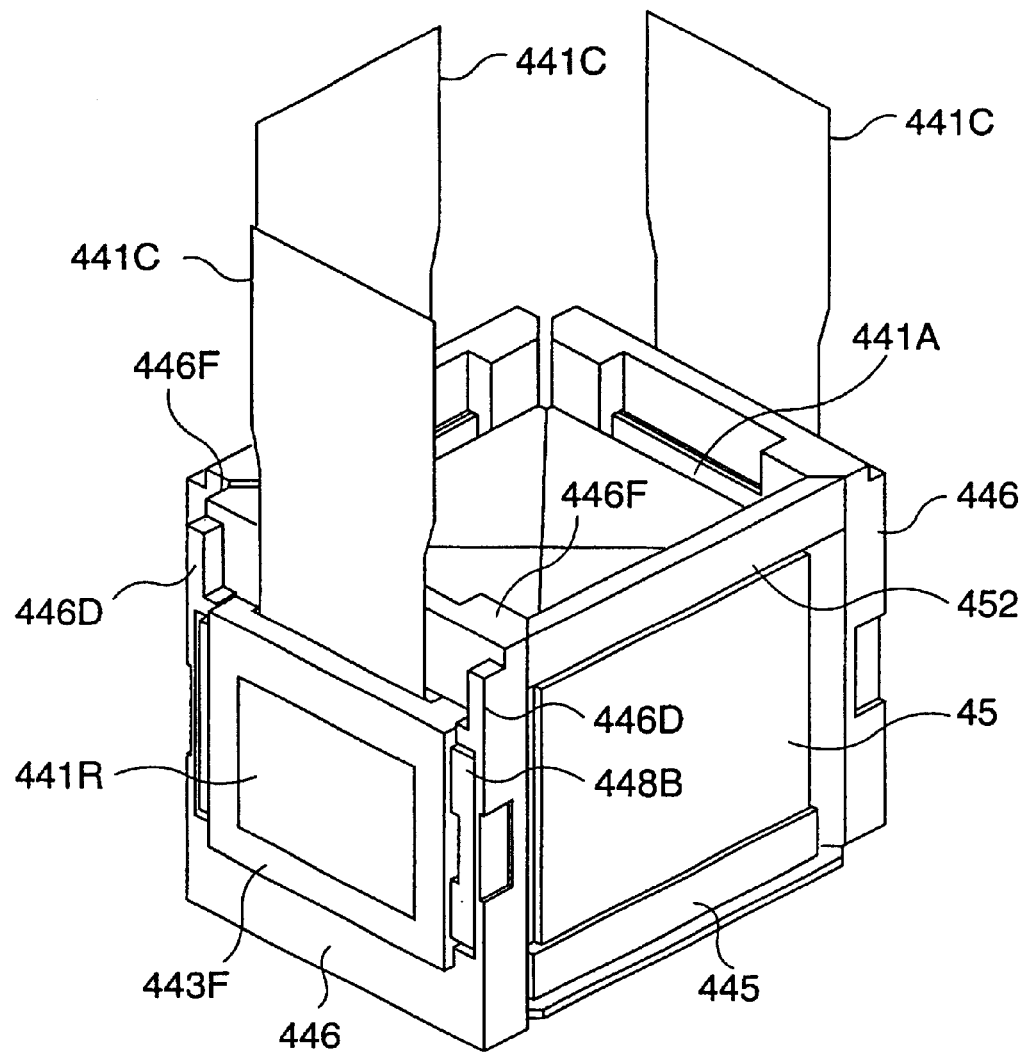
FIG. 42 is a perspective view representing the structure of the optical unit according to a fifteenth embodiment.
Figure 43:
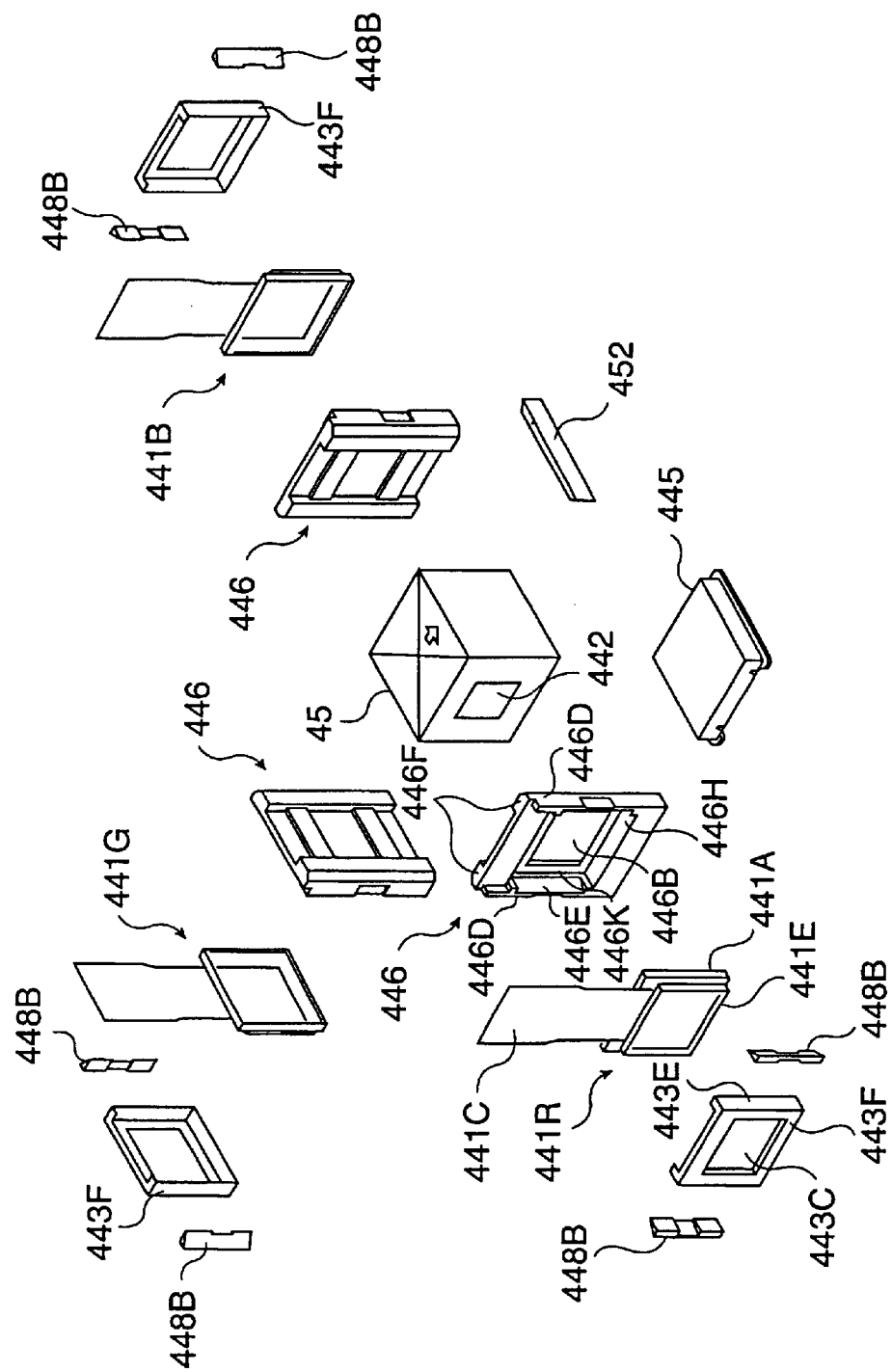
FIG. 43 is an exploded perspective view of FIG. 42.

Conversely, with the fifteenth embodiment, a holding frame 443F is configured of a recessed frame to support the light incident side of the liquid crystal panels 441R, 441G, and 441B, as shown in FIGS. 42 and 43. The light emitting side thereof is not pressed and fixed by the supporting plate 444B, but rather directly stored and held in storing space 446H of the holding member 446. Also, as shown in FIG. 38, a formed unit 470 where the base 445, holding members 446, and linking member 452, or two of these, are integrally formed, may be used with the present embodiment as well. Other configurations are the same as with the thirteenth embodiment.

Also, the manufacturing method of the optical device according to the present embodiment is the same as that described above with the thirteenth embodiment, except for the point that the light modulating device holding step in (c) ends with only storing the liquid crystal panels 441R, 441G, and 441B in the holding frame 443F configured of the recessed frame.

According to such a fifteenth embodiment, advantages the same as the twelfth embodiment can be obtained.

Also, the holding frame 443F is configured only with the recessed frame to support the light incident side of the liquid crystal panels 441R, 441G, and 441B, doing away with the need for the hook engaging portions to fix the supporting plate 444B as with the first through eighth embodiments described above, and a plate member thinner than the recessed frame member 444A can be used and formed into a simple shape. Further, the liquid crystal panels 441R, 441G, and 441B directly come into contact with the holding member 446. Accordingly, thermal transfer from the liquid crystal panels 441R, 441G, and 441B to the holding member 446 is further propagated, so the advantages of further enhanced heat dissipating properties can be obtained.

With the present embodiment, an arrangement may be made where the holding frame 443 and holding member 446 are fixed without using the spacers 448A. In this case, the erected pieces 446D of the holding member 446 and the perimeter of the holding frame 443F are made to face one another with a gap therebetween wherein focus adjustment is possible or a gap wherein both focus adjustment and alignment adjustment are possible, and following adjusting the liquid crystal panels 441R, 441G, and 441B, the holding member 446 and the holding frame 443 are fixed with adhesive agent. It is preferable that the adhesive agent is applied before adjusting the position of the liquid crystal panels 441R, 441G, and 441B, and positional adjustment is performed in a state that the adhesive agent is unhardened. Also, the adhesive agent may be applied following adjustment and be hardened.

Sixteenth Embodiment

The sixteenth embodiment according to the present invention will be described next.

In the following description, the same structures and the same parts as with the twelfth embodiment are denoted with the same reference numerals, and detailed description thereof will be omitted or simplified.

With the twelfth embodiment through the fourteenth embodiment, the holding frame 443 to hold the liquid crystal panels 441R, 441G, and 441B was configured of a recessed frame member 444A to store the liquid crystal panels 441R, 441G, and 441B, and a supporting plate 444B to press and fix the liquid crystal panels 441R, 441G, and 441B.

Figure 44:
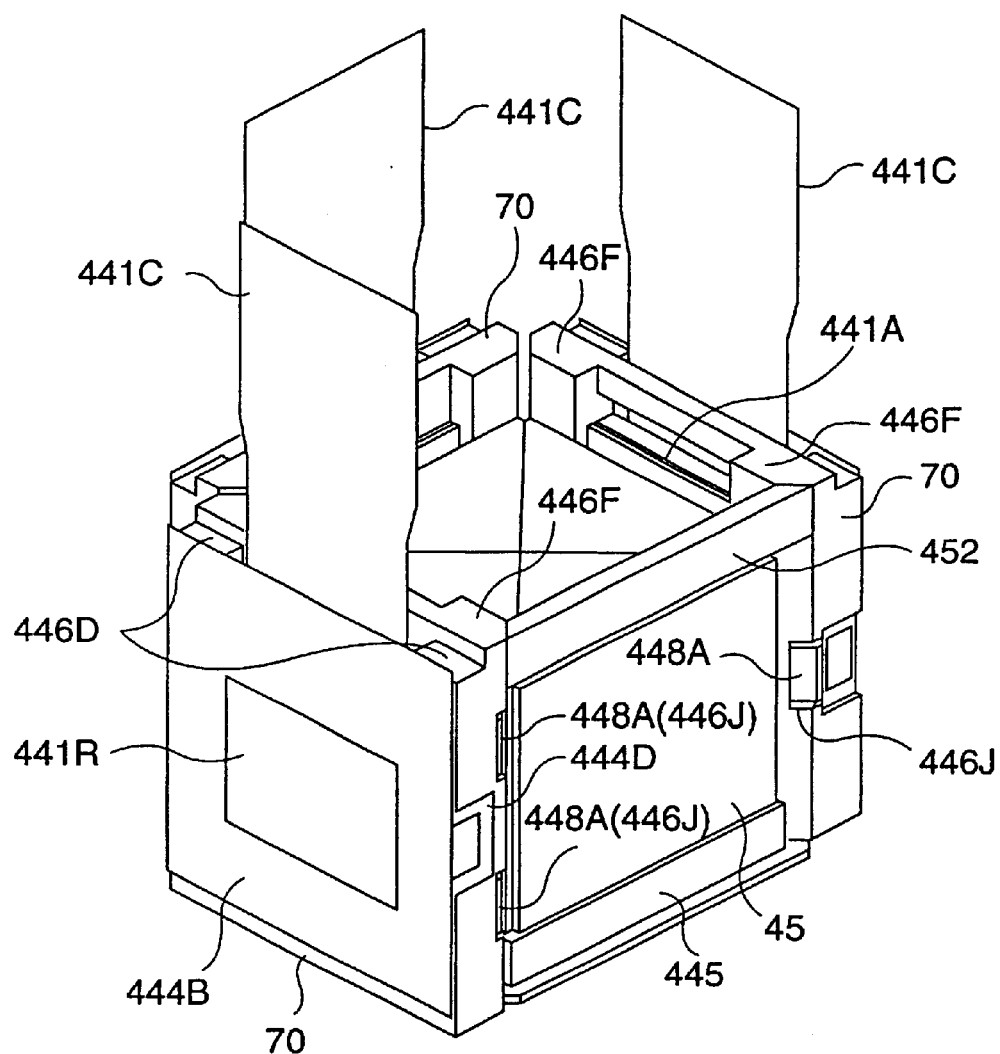
FIG. 44 is a perspective view representing the structure of the optical unit according to a sixteenth embodiment.
Figure 45:
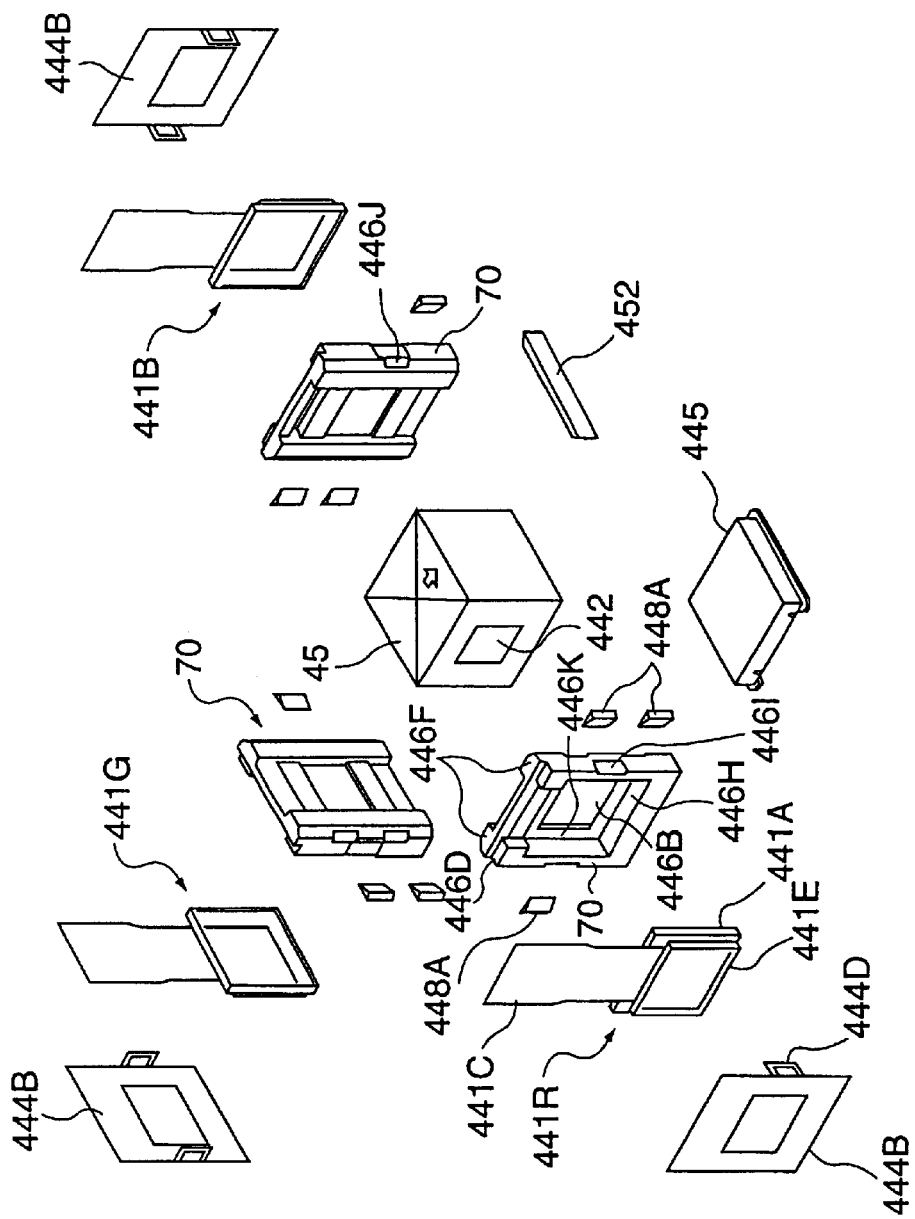
FIG. 45 is an exploded perspective view of FIG. 44.

Conversely, with the sixteenth embodiment, a holding frame 443G is configured of a supporting plate to support the light incident side of the liquid crystal panels 441R, 441G, and 441B, as shown in FIG. 44 or FIG. 45.

The liquid crystal panels 441R, 441G, and 441B are stored and held in storing space 446H of the holding member 446, and the light incident side of the liquid crystal panels 441R, 441G, and 441B is pressed and fixed by the holding frame 443G configured of the supporting plate. The holding frame 443G configured of the supporting plate, and the holding member 446, are fixed by engaging of hooks 444D provided on the holding frame 443G and hook engaging portions 446I provided on the holding member 446.

Further, the holding member 446 according to the twelfth embodiment had inclined faces 446E where the spacers 448A are inserted at the inner side of the erected pieces 446D (see FIG. 34), but the holding member 446 according to the present embodiment has no such inclined faces 446E. Instead, through holes 446J exposed on the left and right sides of the holding member 446 are provided on the erected pieces 446D of the holding member 446. The spacers 448A are inserted between the light emitting face of the liquid crystal panels 441R, 441G, and 441B, and the face of the holding member 446 at the side of the liquid crystal panels 441R, 441G, and 441B, from the outside of the holding member 446, through the through holes 446J. While three each of the spacers 448A and through holes 446J are provided, this may be two, four, or more, for example. Other configurations are the same as with the twelfth embodiment.

The manufacturing method for the optical device according to the present embodiment is carried out as follows.

(a) First, the polarizing plate 442 is fixed by adhesion to the light flux incident end face of the cross-dichroic prism 45 (polarizing plate fixing step).

(b) The cross-dichroic prism 45 with the polarizing plate 442 fixed thereto is fixed on the center of the upper face of the of the base 445 (base fixing step).

(c) Also, the holding members 446 are adhered to the three sides of the base 445, using the contact faces 446G of the protrusions 446F thereof (holding member adhesion step).

(d-1) Further, the frame linking member 452 is fixed by adhesion between holding members 446 at the synthesized light emitting side, using an adhesive agent having thermal conductivity (linking member fixing step).

(d-2) Also, the liquid crystal panels 441R, 441G, and 441B are stored in the storing space 446H of the holding member 446 (light modulating device holding step).

(e) The holding frame 443G configured of the supporting plate is attached from the light incident side of the liquid crystal panels 441R, 441G, and 441B, the hooks 444D are engaged with the hook engaging portions 446C on the holding member 446, and the liquid crystal panels 441R, 441G, and 441B are pressed and fixed (holding frame mounting step).

(f) Wedge-shaped spacers 448A are inserted into through holes 446J provided on the left and right side faces of the holding member 446, and moved while being brought into contact with both the face on the liquid crystal panels 441R, 441G, and 441B side of the holding member 446 and the light emitting face on the side of the liquid crystal panels 441R, 441G, and 441B, thereby adjusting the position of the liquid crystal panels 441R, 441G, and 441B (position adjusting step).

(g) Subsequently, the adhesive agent is hardened (adhesive agent hardening step).

The holding members 446 and frame linking member 452 may be mechanically fixed by screws or the like, instead of adhesive agent.

According to such a sixteenth embodiment, advantages the same as the twelfth embodiment can be obtained. Also, the liquid crystal panels 441R, 441G, and 441B directly come into contact with the holding member 446. Accordingly, thermal transfer from the liquid crystal panels 441R, 441G, and 441B to the holding member 446 is further propagated, so the advantages of further enhanced heat dissipating properties can be obtained.

Seventeenth Embodiment

The seventeenth embodiment according to the present invention will be described next.

In the following description, the same structures and the same parts as with the twelfth embodiment are denoted with the same reference numerals, and detailed description thereof will be omitted or simplified.

With the twelfth embodiment, the holding member 446 was fixed by adhesion directly to the light flux incident end face of the cross-dichroic prism 45. Conversely, with the seventeenth embodiment, a sapphire plate 451 with relatively high thermal conductivity is fixed by adhesion to the light flux incident end face of the cross-dichroic prism 45, and the holding member 446 is fixed by adhesion to the sides of the base 445 across the sapphire plate 451.

Figure 46:
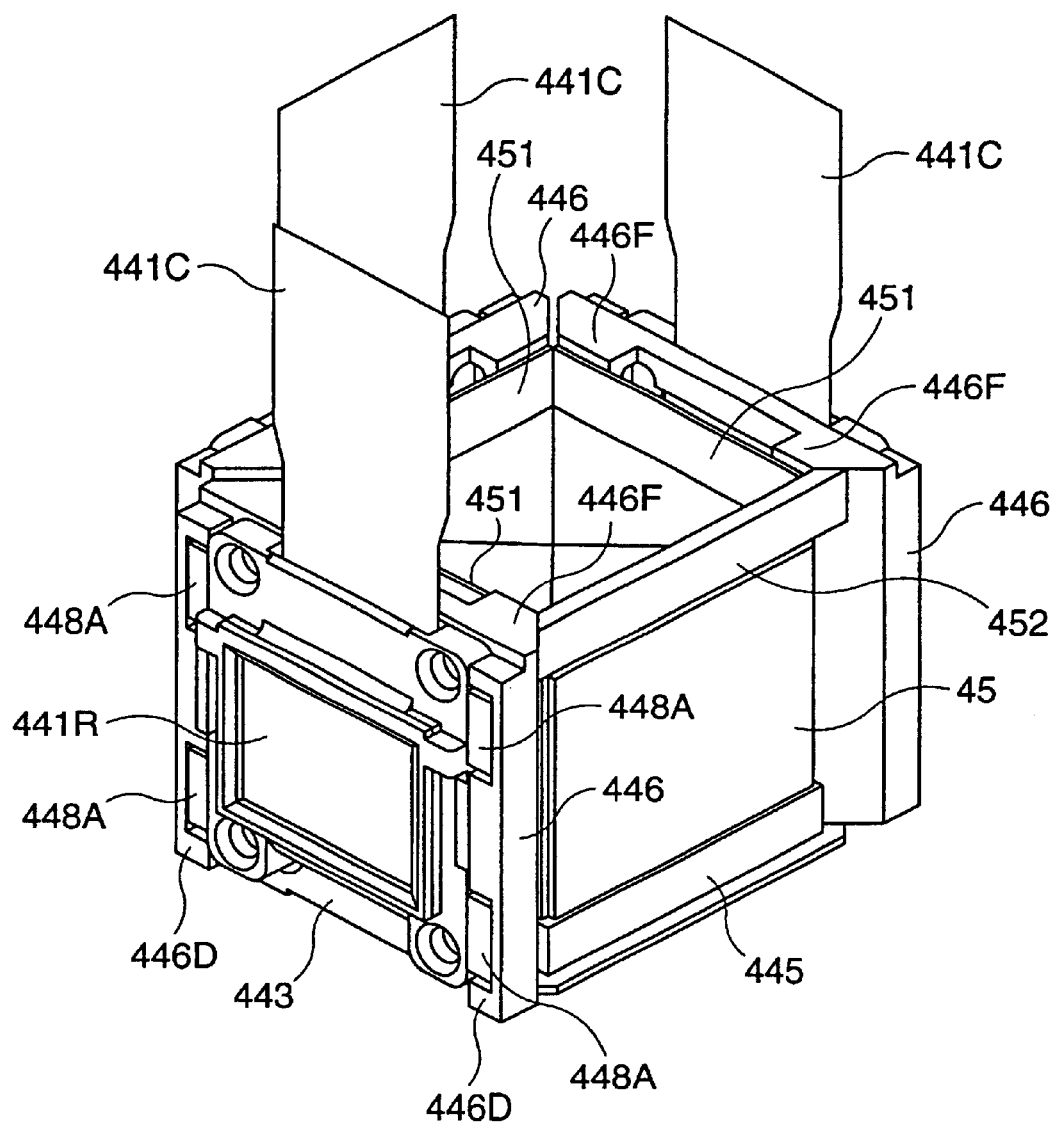
FIG. 46 is a perspective view representing the structure of the optical unit according to a seventeenth embodiment.
Figure 47:
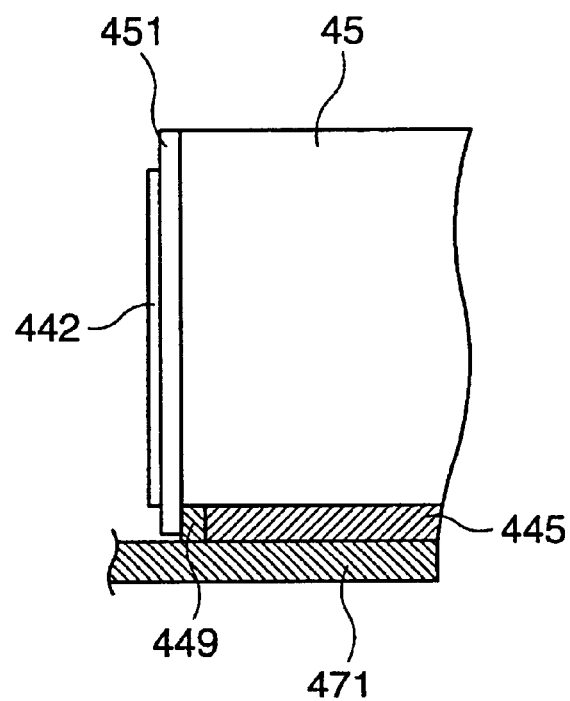
FIG. 47 is a schematic illustrating a sapphire plate and base applied to the prism.

Specifically, as shown in FIG. 46 and FIG. 47, a sapphire plate 451 is fixed by adhesion to almost the entire surface of the light flux incident end face of the cross-dichroic prism 45 using double-side tape or adhesive agent, and the polarizing plate 442 is applied to the liquid crystal panel corresponding face at the center portion of the sapphire plate 451 using double-side tape or adhesive agent. Also, the protrusions 446F of the holding member are fixed by adhesion to the sapphire plate 451.

Further, as shown in FIG. 47, an adhesive agent 449 having excellent thermal conductivity is filled in the gap between the sapphire plate 451 and the base 445, joining these in a thermally conductible manner. Other configurations are the same as with the twelfth embodiment.

Also, the manufacturing method for the optical device according to the present embodiment is the same as with the twelfth embodiment, except for the point that a sapphire plate 451 is fixed by adhesion to the light flux incident end face of the cross-dichroic prism 45 using double-side tape or adhesive agent, following which the polarizing plate 442 is applied to the sapphire plate 451 using double-side tape or adhesive agent, and the point that the holding member 446 is fixed by adhesion to the side face of the base 445 across the sapphire plate 451.

As for the adhesive agent for adhesion of the mutual interfaces of the base 445, sapphire plate 451, and holding member 446, an adhesive agent with excellent thermal conductivity as described in the first embodiment is used.

Also, for the configuration for joining the base 445 and the sapphire plate 451 so as to enable thermal conduction, an arrangement may be made wherein a thermal-conductive sheet with carbon mixed in, or spacer members or the like formed of thermal-conductive material are introduced so as to directly fix the sapphire plate 451 to the lower housing 471, instead of filling the adhesive agent with thermal conductivity between these. In this case, in addition to adhesive agent with thermal conductivity, mechanical fixing using screws or the like, can also be used for fixing the thermal-conducting sheet or spacer members.

Also, though omitted in the drawings, an arrangement may be made wherein the sapphire plate 451 is made smaller than the dimension between the protrusions 446F provided on the left and right edges of the holding member 446, so that the sapphire plate 451 is positioned between the protrusions of the holding member 446 at the time of fixing the holding member 446 to the base 445 side face.

According to such a seventeenth embodiment, the following advantages can be obtained, in addition to advantages the same as those of the twelfth embodiment.

In addition to cooling using the air path between the cross-dichroic prism 45 and the liquid crystal panels 441R, 441G, and 441B, the heat in the vicinity of the liquid crystal panels 441R, 441G, and 441B can be conducted and dissipated in the order of the holding frame 443, holding member 446, sapphire plate 451, base 445, and lower housing 471, so even in the event that the prism 45 is made of glass with a relatively low thermal conductivity such as BK7 or the like, the cooling capabilities of the liquid crystal panels 441R, 441G, and 441B can be greatly enhanced. Accordingly, even in the event that the luminance of the projector is raised, deterioration of the liquid crystal panel can be suppressed, and stable image quality can be maintained.

Also, the configuration according to the present embodiment where a sapphire plate 451 is used can also be applied to the first through third embodiments, and the twelfth through sixteenth embodiments. This enables advantages, such as enhanced cooling capabilities, suppression of deterioration of the liquid crystal panel, and maintaining stable image quality, to be obtained with the first through third embodiments and the twelfth through sixteenth embodiments, as well.

Though various embodiments of the present invention have been described, the present invention is not restricted to the above embodiments, but rather includes other configurations and the like capable of achieving advantages of the present invention. For example, the following exemplary modifications are also encompassed by the present invention.

Figure 48:
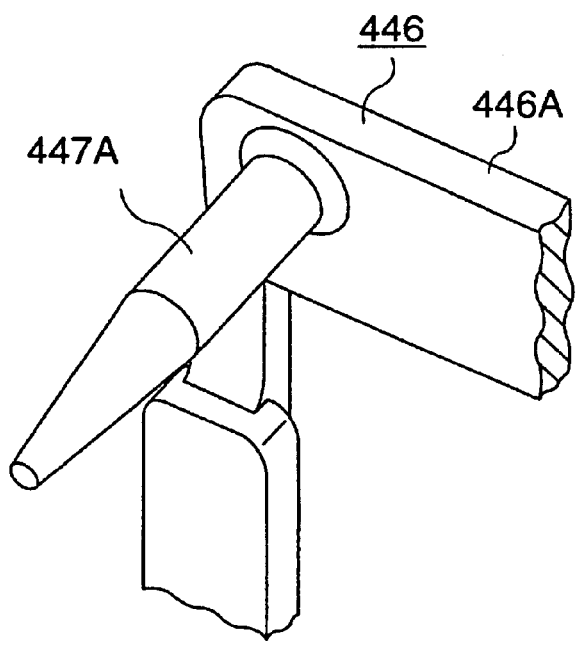
FIG. 48 is an enlarged perspective view illustrating a modification example of the shape of the pins of the holding member.

For example, in the first, fourth, fifth, eighth, and eleventh embodiments, the holding member 446 includes pins 447A erected from a rectangular plate-shaped member 446A, with the pins 447A having a generally column-like shape, but may have a form wherein the top side is smaller in diameter than the base. For example, as shown in FIG. 48, a generally conical structure which grows narrower from the base toward the tip may be assumed. With such a shape wherein the tip side of the pin 447A is smaller in diameter than the base, the holding member 446 and the holding frame 443 can be efficiently fixed in a short time and in a sure manner with a photo-curing adhesive agent, such as an ultraviolet effect adhesive agent or the like. The reason is that at the time of irradiating light from the tip portion of the pins 447A to harden the adhesive agent, the reflection and absorption of light at the tip portion of the pins 447A is reduced, and sufficient light is irradiated to the adhesive agent existing at the contact portion between the pins 447A and the holding frame 443. Such a structure is particularly preferable in the event that the holding member 446 is configured of metal.

Figure 49:
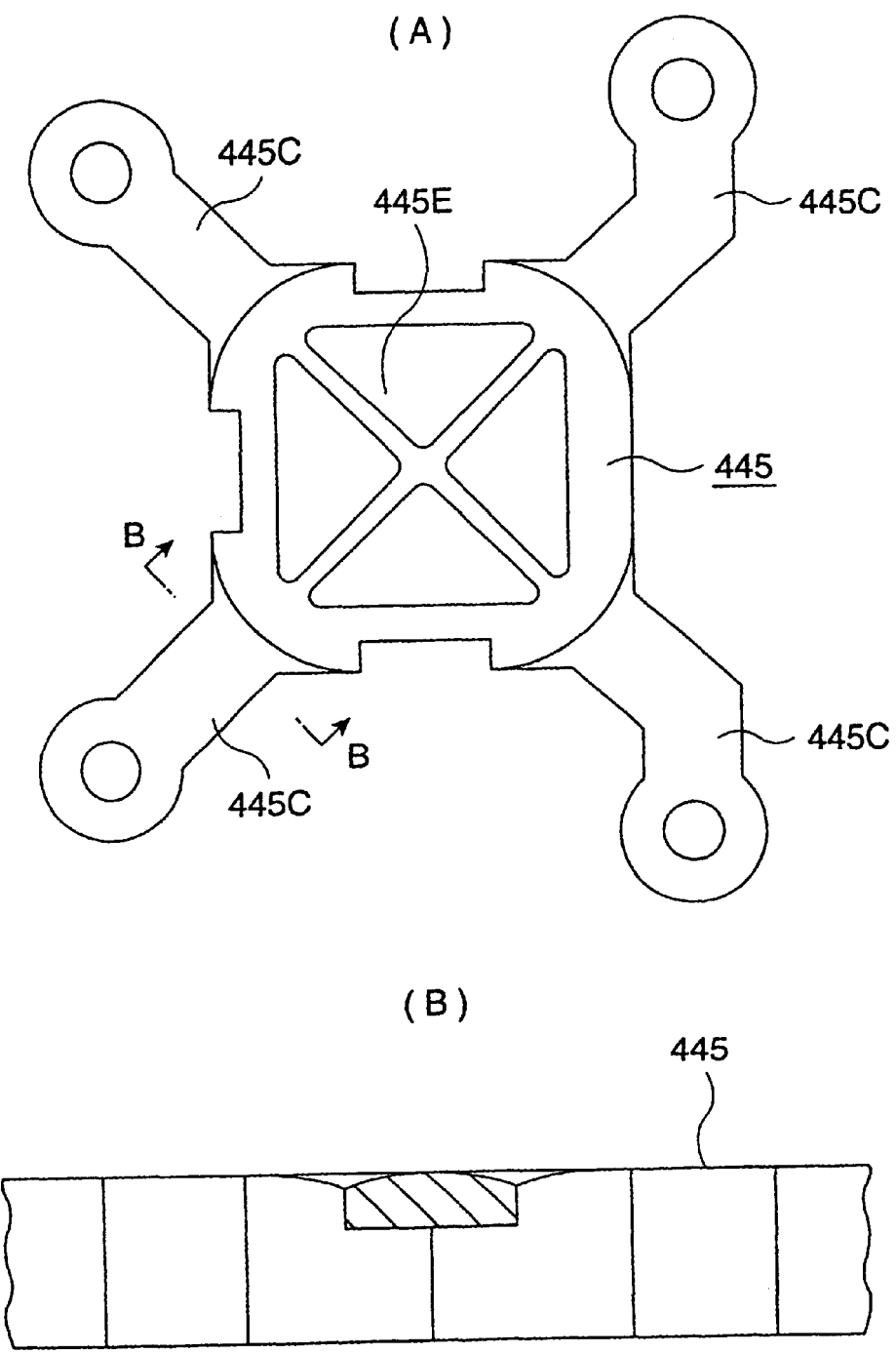
FIGS. 49(A) and 49(B) are a plan view and a cross-sectional view, respectively, illustrating an exemplary modification example of the shape of the base.

Also, the shape of the bases 445 according to the first embodiment through the third embodiment may be a tapered shape, as shown in FIGS. 49(A) and 49(B). FIG. 49(A) is a plan view of a base 445, and FIG. 49(B) is a cross-sectional view along plane B-B in FIG. 49(A). Due to the shape of the base 445 being formed thus, the holding member 446 and the holding frame 443 can be efficiently fixed in a short time and in a sure manner with a photo-curing adhesive agent, such as an ultraviolet curing adhesive agent or the like. The reason is that at the time of irradiating ultraviolet rays from above the base 445 to the gap between the base 445 and the holding member 446 to join the base 445 and the holding member 446, the reflection and absorption of light at the corners of the base 445 is reduced, and sufficient light is irradiated to the adhesive agent existing in the gap between the base 445 and the holding member 446. Now, while a case wherein light is irradiated from above the base 445 has been described here, in the event of irradiating light from below the base 445 fixed on the lower side of the cross-dichroic prism 45, the edges of the base 445 fixed below can be tapered. Also, the configuration where the corners of the base 445 is tapered can also be applied to the twelfth through seventeenth embodiments.

Also, in the first through fifth, eighth, eleventh, and fourteenth embodiments, the holding member 446 and holding frame 443 were fixed through pins 447A or erected pieces 447B with a general L-shape when viewed from the front, but the form of the pins 447A or erected pieces 447B are not restricted to forms, such as shown in FIGS. 8 and 9, 15, 16, and so forth. That is to say, anything will suffice for the shape of the pins 447A or erected pieces 447B, as long as the shape allows the holding member 446 and the holding frame 443 to be fixed.

Also, with regard to the shape of the engaging grooves 446C provided to the holding member 446 in the first through third embodiments, the shape is not restricted to that such as shown in FIGS. 9, 15, and 16. That is to say, anything will suffice for the shape so long as it is capable of supporting the polarizing plate 442.

Further, with regard to the position of the base 445 or the way of attaching the base 445 and the lower housing 471 as well, the present invention is not restricted to the configurations shown in the above embodiments.

For example, with the first through third embodiments, bases 445 are provided on the top and bottom faces of the cross-dichroic prism 45 (both of a pair of end faces intersecting the light flux incident end face), but this may be changed to a configuration using a base 445 and linking member 452, as with the twelfth through seventeenth embodiments. Conversely, the configuration of the twelfth through seventeenth embodiments using a base 445 and linking member 452 may be changed to the configuration wherein bases 445 are provided on the top and bottom faces of the prism 45 as with the first through third embodiments.

Also, with the first through third embodiments, the optical device is fixed to the lower housing 471 by a base 445 fixed to the upper face of the prism 45, but may be fixed to the lower housing 471 by a base fixed to the lower face of the prism 45, as with the other embodiments. Also, with the first through fourth embodiments, the attachment portion 445B to the lower housing 471 of the optical device was provided to the base 445 fixed to the upper face of the cross-dichroic prism 45, but this may be formed on the base 445 fixed to the lower face of the cross-dichroic prism 45. However, the arrangement wherein the attachment portion 445B is formed on the base 445 fixed to the upper face of the cross-dichroic prism 45 as with the embodiments is advantageous in that the optical device can be readily mounted to and detached from the lower housing 471. Also, the optical devices according to the fifth through seventeenth embodiments may be arranged so that fixation to the lower housing 471 is made by a base 445 fixed to the upper face of the prism 45, as with the first through fourth embodiments.

Further, with the first through fourth embodiments, the optical device was fixed on an attached portion 473 provided on bosses 476 on the lower housing 471, but the structure of attaching the optical device is not restricted to this. That is to say, the position, form, etc., for attachment of the optical device can be arbitrarily decided. Also, the form of the attaching portion 445B provided to the base 445 can also be arbitrarily decided, and is not restricted to the shaped in the embodiments described above. Also, the bosses 476 of the lower housing 471 were integrally provided with the head portion 49 and holding pieces 477, but each may be provided individually.

With the fourth embodiment, a partial gap was not formed between the cross-dichroic prism 45 and the holding member 446, but a partial gap may be formed between the cross-dichroic prism 45 and the holding member 446 as with the sixth through seventeenth embodiments. Assuming such a configuration allows the advantages described with the sixth embodiment (23) to be obtained.

Also, in the twelfth through sixteenth embodiments, thermal-conductive adhesive agent may be filled in the gap formed between the cross-dichroic prism 45 and the holding member 446. In this case, a heat conducting path from the holding member 446 to the cross-dichroic prism 45 and to the base 445 is formed, so cooling of the liquid crystal panels 441R, 441G, and 441B is further promoted.

In the above embodiments, the cross-dichroic prism 45 was configured of a prism of a material, such as optical glass, crystal, sapphire, etc., and dielectric substance multi-layer films, but the configuration of the prism 45 is not restricted to these. For example, a configuration may be used where cross-mirrors are placed in a generally cubic or a cubic container formed of glass or the like, and the container is filled with a fluid. That is to say, any configuration will suffice for the prism 45 as long as it has functions to synthesize color light, and light flux incident side faces to attach light modulating devices.

Further, with the embodiments, an example has been given of a projector using three light modulating devices, but the present invention is also applicable to a projector using one light modulating device, a projector using two light modulating devices, or a projector using four or more light modulating devices, for example.

Also, with the above embodiments, liquid crystal panels were used as light modulating devices, but light modulating devices other than liquid crystal may be used, such as devices using micro-mirrors, for example.

Further, with the present embodiment, transmission type light modulating devices where the light incident face and the light emitting face are different were used, but reflection type light modulating devices wherein the light incident face and the light emitting face are the same may be used, for example.

Moreover, with the present embodiment, only an example of front-type projector wherein projection is performed from the side of observation of the screen has been given, but the present invention is also applicable to rear-type projectors where projection is performed from the opposite side from the side of observation of the screen, for example.

With the liquid crystal panel attaching structure according to the present invention, in addition to cooling of the liquid crystal panel using fans, the heat of the liquid crystal panel can be thermally conducted through the holding frame, holding members, etc., in an effective manner, and dissipated, so the cooling capabilities of the liquid crystal panel can be greatly enhanced.

Also, with the projector according to the present invention using the above optical device, higher luminance, higher reliability, and extended lifetime, of the device can be achieved due to the enhanced cooling capabilities thereof, while the fans and power source used to cool can be omitted or reduced in size, thereby enabling reduced size and low noise of the device.

What is claimed is:

1. A projector including an optical device integrally provided with a plurality of light modulating devices to modulate a plurality of color lights for each color light according to image information, and a color synthesizing optical element to synthesize each color light modulated at the light modulating devices, comprising:

a holding frame to hold the light modulating devices, having an opening for a portion corresponding to an image formation region of said light modulating devices;

a base fixed to at least one end of a pair of end faces intersecting with an optical flux incident end face of said color synthesizing optical element; and a holding member disposed between said holding frame and a side face of said base;

said base and said holding member being formed of at least one of a thermal-conductive metal and a thermal-conductive resin; and said light modulating devices being fixed to a side face of said base by said holding frame and said holding member.

2. The projector according to claim 1;

the thermal conductivity of said at least one of the thermal-conductive metal and the thermal-conductive resin being 3 W/(m·K) or higher.

3. The projector according to claim 1, holes being formed indat least two places of said holding frame; and said holding member including a rectangular plate-shaped member with an opening formed at a position corresponding to the opening of said holding frame, and protruding portions to be inserted into said holes in said holding frame, provided protruding from said rectangular plate-shaped member.

4. The projector according to claim 1, said holding member including a rectangular plate-shaped member with an opening formed at a position correspnding to the opening of said holding frame, and erected pieces with a general L-shape when viewed from a front of the device, which are positioned at the corner portions of said rectangular plate-shaped member and erected along the edge of said rectangular plate-shaped member, and holds the perimeter of said holding frame.

5. The projector according to claim 4, said erected pieces being erected at the four corners of said rectangular plate-shaped member.

6. The projector according to claim 4, said erected pieces being provided along at a pair of mutually parallel sides of said rectangular plate-shaped member, having generally the same length as said sides of said rectangular plate-shaped member.

7. The projector according to claim 1, said holding member including an engaging groove to engage with a plate-shaped optical element.

8. The projector according to claim 1, said holding member including a supporting face to fix an optical element.

9. The projector according to claim 1, a first supporting face to fix a first optical element and a second supporting face to fix a second optical element being fanned on said holding member, and said first supporting face and said second supporting face being configured so that the out-of-plane directional positions differ one from another.

10. The projector according to claim 1, said base having a recessed portion formed at a portion of an end face where said holding member is fixed by adhesion.

11. The projector according to claim 1, said holding frame, said holding member, and said base, being fixed by an adhesive agent having thermal conductivity.

12. The projector according to claim 11, said adhesive agent being constituted containing a metal material.

13. The projector according to claim 1,
said base being fixed to only one of a pair of end faces intersecting with an optical flux incident end face of said color synthesizing optical element;
a linking member to link said holding members facing one another being provided near the other of said end faces; and
said linking member being configured of a thermal-conductive metal or thermal-conductive resin.

14. The projector according to claim 13,
at least two of said base, said holding member, and said linking member being formed integrally.

15. The projector according to claim 1,
said holding frame being formed of at least one of a thermal-conductive metal and thermal-conductive resin.

16. The projector according to claim 1,
said holding frame including a recessed frame member to store said light modulating devices, and a supporting plate to press and fix the stored light modulating devices.

17. The projector according to claim 1, said light modulating devices including a pair of substrates, and a light-transmitting dust-proof plate fixed to at least one of said pair of substrates;
the thermal conductivity of said light-transmitting dust-proof plate being higher than the thermal conductivity of said substrate.

18. The projector according to claim 1,
a light-transmitting plate with higher thermal conductivity than that of material forming said color synthesizing optical element being provided between said holding member and said base side face, and said light-transmitting plate and said base being joined in a thermally-conductible manner.

19. The projector according to claim 1,
said base being connected to a heat dissipating device to perform forced cooling.

20. A optical device, comprising:
the projector according to claim 1, and
a projecting lens to project images formed by said projected.

21. The optical device according to claim 20,
further comprising an optical parts housing to store a plurality of optical elements making up an optical system;
said optical parts housing being configured of thermal-conductive material; and
said base being fixed to said optical parts housing.

22. The optical device according to claim 21,
said optical device and said optical parts housing being stored in an external case;
said external case being configured of thermal-conductive material; and
said optical parts housing being joined with said external case in a thermally-conductible manner.

23. An optical device integrally provided with a plurality of light modulating devices to modulate a plurality of color lights for each color light according to image information, and a color syntfrsizing optical element to synthesize each color light modulated at the light modulating deivices, comprising:
a holding frame to hold the light modulating devices, having an opening for a portion corresponding to an image formation region of said light modulating devices;
a holding member directly fixed to an optical flux incident end face of said color synthesizing optical element; and
a base fixed to at least one end of a pair of end faces intersecting with an optical flux incident end face of said color synthesizing optical element;
said base and said holding member being formed of at least one of a thermal-conductive metal and a thermal-conductive resin; and
said holding frame being directly fixed to said holding member.

24. The optical device according to claim 23;
the thermal conductivity of said at least one of the thermal-conductive metal and the thermal-conductive resin being 3 W/(m·K) or higher.

25. The optical device according to claim 23,
holes being formed in at least two places of said holding frame; and
said holding member including a rectangular plate-shaped member with an opening formed at a position corresponding to the opening of said holding frame, and protruding portions to be inserted into said holes in said holding frame, provided protruding from said rectangular plate-shaped ember.

26. The optical device according to claim 23,
said holding member including a rectangular plate-shaped member with an opening formed at a position corresppnding to the opening of said holding frame, and erected pieces with a general L-shape when viewed from a front of the device, which are positioned at the corner portions of said rectangular plate-shaped member and erected along the edge of said rectangular plate-shaped member, and holds the perimeter of said holding frame.

27. The optical device according to claim 26,
said erected pieces being erected at the four corners of said rectangular plate-shaped member.

28. The optical device according to claim 26,
said erected pieces being provided along at a pair of mutually parallel sides of said rectangular plate-shaped member, having generally the same length as said sides of said rectangular plate-shaped member.

29. The optical device according to claim 23,
said holding member including a supporting face to fix an optical element.

30. The optical device according to claim 23,
a first supporting face to fix a first optical element and a second supporting face to fix a second optical clement being formed on said holding member, and said first supporting face and said second supporting face being configured so that the out-of-plane directional positions differ one from another.

31. The optical device according to claim 23,
said color light synthesizing optical element and said base being fixed by a thermal-conductive adhesive agent.

32. The optical devie according to claim 23,
said color light synthesizing optical element and said holding member being fixed by a thermal-conductive adhesive agent.

33. The optical device according to claim 23,
said holding member and said holding frame being fixed by a thermal-conductive adhesive agent.

34. The optical device according to claim 31,
said adhesive agent being constituted containing a metal material.

35. The optical device according to claim 23,
said holding frame being formed of at least one of a thermal-conductive metal and a thermal-conductive resin.

36. The optical device according to claim 23,
said holding frame inc)uding a recessed frame member to store said light modulating devices, and a supporting plate to press and fixing the stored light modulating devices.

37. The optical device according to claim 23,
said light modulating devices including a pair of substrates, and a light-transmitting dust-proof plate fixed to at least one of said pair of substrates; and
the thermal conductivity of said light-transmitting dust-proof plate being higher than the thermal conductivity of said substrate.

38. The optical device according to claim 23,
a light-transmitting plate with higher thermal conductivity than that of the material forming said color synthesizing optical element being provided on the light incident end face of said color synthesizing optical element, and said light-transmitting plate and said base being joined in a thermally-conductable manner.

39. The optical device according to claim 23,
said base being connected to a heat dissipating device to perform forced cooling.

40. A projector, comprising:
the optical device according to claim 23; and
a projecting lens to project images formed by said optical device.

41. The projector according to claim 40,
further comprising an optical parts housing to store a plurality of optical elements making up an optical system;
said optical parts housing being configured of thermal-conductive material; and
said base being fixed to said optical parts housing.

42. The projector according to claim 41,
said optical device and said optical parts housing being stored in an external case;
said external case being configured of thermal-conductive material; and
said optical parts hoising being joined with said external case in a thermally-conductible manner.

43. A projector including an optical device integrally provided with a plurality of light modulating devices to modulate a plurality of color lights for each color light according to image information, and a color synthesizing optical element to synthesize each color light modulated at the light modulating devices, comprising:
a holding frame to hoild the light modulating devices, having an opening for a portion corresponding to an image formation region of said light modulating devices;
a holding member directly fixed to an optical flux incident end face of said color synthesizing optical element having erected pieces formed so as to cover the side edge of said holding frame, and supporting pieces to support the face of said holding frame at said color synthesizing optical element side;
spacers disposed between said holding frame and said erected piece of said holding member; and
a base fixed to at least one end of a pair of end faces intersecting with an optical flux incident end face of said color synthesizing optical element;
said base and said holding member being formed of at least one of a thermal-conductive metal and a thermal-conductive resin;
said holding frame being fixed to said holding member by said spacers.

44. The projector according to claim 43;
the thermal conductivity of said at least one of the thermal-conductive metal and the thermal-conductive resin being 3 W/(m·K) or higher.

45. The projector according to claim 43,
said holding member including a protruding portion at a face of contact with said color synthesizing optical element, and a partial gap being formed between said color synthesizing optical element and said holding member by said color synthesizing optical element and said protruding portion.

46. The projector according to claim 43,
said color light synthesizing optical element and said base being fixed by a thermal-conductive adhesive agent.

47. The projector according to claim 43,
said color light synthesizing optical element and said holding member being fixed by a thermal-conductive adhesive agent.

48. The projector according to claim 43,
said holding member and said holding frame being fixed by a thermal-conductive adhesive agent.

49. The projector according to claim 48, the gap between said erected piece and said holding frame being filled with a thermal-conductive adhesive agent.

50. The projector according to claim 46,
said adhesive agent being constituted containing a metal material.

51. The projector according to claim 43,
said holding frame being configured of a thermal-conductive metal or thermal-conductive resin.

52. The projector according to claim 43,
said holding frame including a recessed frame member to store said light modulating devices, and a supporting plate to press and fixing the stored light modulating devices.

53. The projector according to claim 43,
said light modulating devices including a pair of substrates, and a light-transmitting dust-proof plate fixed to at least one of said pair of substrates; and
the thermal conductivity of said light-transmitting dust-proof plate being higher than the thermal conductivity of said substrate.

54. The projector according to claim 43,
a light-transmitting plate with higher thermal conductivity than that of the material forming said color synthesizing optical element being provided on the light incident end face of said color synthesizing optical element, and said light-transmitting plate and said base being joined in a thermally-conductible manner.

55. The projector according to claim 43,
said base being connected to a heat dissipating device to perform forced cooling.

56. The projector according to claim 43 further comprising a projecting lens to project images formed by said optical device.

57. The projector according to claim 56,
further comprising an optical parts housing to store a plurality of optical elements;
said optical parts housing being configured of thermal-conductive material; and
said base being fixed to said optical parts housing.

58. The projector according to claim 57, said optical device and said optical parts housing being stored in an external case;

said external case being configured of thermal-conductive material; and said optical parts housing being joined with said external case in a thermally-conductible manner.

59. A projecor including an optical device integrally provided with a plurality of light modulating devices to modulate a plurality of color lights for each color light according to image information, and a color synthesizing optical element to synthesize each color light modulated at the light modulating devices, comprising:

a holding frame to hold the light modulating devices, having an opening for a portion corresponding to an image formation region of said light modulating devices;

a base fixed to at least one end of a pair of end faces intersecting with an optical flux incident end face of said color synthesizing optical element;

a holding member directly fixed to said base, having an erected piece formed so as to cover the side edge of said holding frame, and a supporting piece to support the face of said holding frame at the side of side color synthesizing optical element; and spacers disposed between said holding frame and said erected piece of said holding member;

said base and said holding member being formed of at least one of a thermal-conductive metal and a thermal-conductive resin; and said holding frame being fixed to said holding member by said spacers.

60. The projector according to claim 59;

the thermal conductivity of said at least one of the thermal-conductive metal and the thermal-conductive resin being 3 W/(m·K) or higher.

61. The projector according to claim 59, said base having a recessed portion formed at a portion of an end face where said holding member is fixed by adhesion.

62. The projector according to claim 59, said holding frame, said holding member, and said base, being fixed by a thermal-conductive adhesive agent.

63. The projector according to claim 62, the gap between said erected piece and said holding frame being filled with a thermal-conductive adhesive agent.

64. The projector according to claim 62, said adhesive agent being constituted containing a metal material.

65. The projector according to claim 59, said base being fixed to only one of a pair of end faces intersecting with an optical flux incident end face of said color synthesizing optical element;

a linking member to link said holding members facing one another is provided near the other of said end faces; and said linking member being configured of a thermal-conductive metal or thermal-conductive resin.

66. The projector according to claim 65, at least two of said base, said holding member, and said linking member, being formed integrally.

67. The projector according to claim 59, said holding frame including a recessed frame member to store said light modulating devices, and a supporting plate to press and fix stored light modulating devices.

68. The projector according to claim 59, said light modulating devices including a pair of substrates, and a light-transmitting dust-proof plate fixed tp at least one of said pair of substrates; and the thermal conductivity of said light-transmitting dust-proof plate being higher than the thermal conductivity of said substrate.

69. The projector according to claim 59, a light-transmitting plate with higher thermal conductivity than that of the material forming said color synthesizing optical element being provided on the light incident end face of said color synthesizing optical element, and said light-transmitting plate and said base being joined in a thermally-conductible manner.

70. The projector according to claim 59, said base being connected to a heat dissipating device to perform forced cooling.

71. The projector according to claim 59 further comprising a projecting lens to project images formed by said optical device.

72. The projector according to claim 71, further comprising optical parts housing to store a plurality of optical elements;

said optical parts housing being configured of thermal-conductive material; and said base being fixed to said optical parts housing.

73. The projector according to claim 72, said optical device and said optical parts housing being stored in an external case;

said external case being configured of thermal-conductive material; and said optical parts hosing being joined with said external case in a thermally-conductible manner.

* * * * *